(12) United States Patent
Spruce

(10) Patent No.: US 12,297,779 B2
(45) Date of Patent: May 13, 2025

(54) GEARED GAS TURBINE ENGINE

(71) Applicant: ROLLS-ROYCE plc, London (GB)

(72) Inventor: Mark Spruce, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/433,932

(22) Filed: Feb. 6, 2024

(65) Prior Publication Data

US 2025/0035050 A1  Jan. 30, 2025

Related U.S. Application Data

(63) Continuation-in-part of application No. 17/244,091, filed on Apr. 29, 2021, now abandoned, which is a
(Continued)

(30) Foreign Application Priority Data

Dec. 5, 2019 (GB) ..................... 1917769

(51) Int. Cl.
| | |
|---|---|
| *F02C 7/36* | (2006.01) |
| *F02K 3/06* | (2006.01) |
| *F16H 57/025* | (2012.01) |
| *F16H 57/08* | (2006.01) |

(Continued)

(52) U.S. Cl.
CPC .............. *F02C 7/36* (2013.01); *F02K 3/06* (2013.01); *F16H 57/025* (2013.01); *F16H 57/08* (2013.01);
(Continued)

(58) Field of Classification Search
CPC .......... F02C 7/36; F16H 57/025; F16H 57/08; F16H 2057/02043; F05D 2260/40311
See application file for complete search history.

(56) References Cited

U.S. PATENT DOCUMENTS

| 8,297,916 B1 | 10/2012 | McCune et al. |
| 8,297,917 B1 | 10/2012 | McCune et al. |
| (Continued) | | |

FOREIGN PATENT DOCUMENTS

EP   0 924 381 A2   6/1999

*Primary Examiner* — Lorne E Meade
(74) *Attorney, Agent, or Firm* — Oliff PLC

(57) ABSTRACT

Gas turbine engine for aircraft includes: an engine core including a turbine, compressor, and core shaft connecting the turbine to the compressor; a fan located upstream of the core; a gearbox; and a gearbox support arranged to at least partially support the gearbox. The fan has a mass in a range of 150 kg to 1200 kg. A moment of inertia of the fan is greater than or equal to $7.40 \times 10^7$ kgmm². A radial bending stiffness to moment of inertia ratio of:

$$\frac{\text{the radial bending stiffness of at least one of the fan shaft at the output of the gearbox and the gearbox support}}{\text{the moment of inertia of the fan}}$$

may be greater than or equal to $2.5 \times 10^{-2}$ Nkg$^{-1}$m$^{-1}$mm$^{-2}$. A tilt stiffness to moment of inertia ratio of:

$$\frac{\text{the tilt stiffness of at least one of the fan shaft at the output of the gearbox and the gearbox support}}{\text{the moment of inertia of the fan}}$$

may be greater than or equal to $4.0 \times 10^{-4}$ Nmrad$^{-1}$kg$^{-1}$mm$^{-2}$.

20 Claims, 8 Drawing Sheets

Related U.S. Application Data continuation of application No. 16/820,903, filed on Mar. 17, 2020, now Pat. No. 11,022,044.

(51) Int. Cl.
*F02C 3/107* (2006.01)
*F16H 57/02* (2012.01)

(52) U.S. Cl.
CPC .... *F02C 3/107* (2013.01); *F05D 2260/40311* (2013.01); *F16H 2057/02043* (2013.01)

(56) References Cited

U.S. PATENT DOCUMENTS

| | | | |
|---|---|---|---|
| 8,747,055 B2 * | 6/2014 | McCune | F02C 7/36 415/122.1 |
| 9,133,729 B1 | 9/2015 | McCune et al. | |
| 9,239,012 B2 | 1/2016 | McCune et al. | |
| 9,863,509 B2 * | 1/2018 | Torii | F16H 57/04 |
| 10,274,017 B2 * | 4/2019 | Ganiger | F01D 21/045 |
| 10,436,035 B1 | 10/2019 | Baralon et al. | |
| 10,830,154 B1 | 11/2020 | Spruce | |
| 10,837,370 B1 | 11/2020 | Spruce | |
| 10,851,715 B1 | 12/2020 | Spruce | |
| 10,859,001 B1 | 12/2020 | Spruce | |
| 11,022,044 B1 | 6/2021 | Spruce | |
| 11,131,214 B2 * | 9/2021 | Menczykalski | F01D 25/20 |
| 11,261,753 B2 * | 3/2022 | Yadav | F16D 1/10 |
| 2013/0336791 A1 | 12/2013 | McCune et al. | |
| 2016/0356364 A1 | 12/2016 | Torii et al. | |
| 2017/0342858 A1 | 11/2017 | McCune et al. | |
| 2018/0112672 A1 | 4/2018 | Ganiger et al. | |
| 2019/0170012 A1 | 6/2019 | Yadav et al. | |
| 2019/0316488 A1 | 10/2019 | Menczykalski et al. | |

* cited by examiner

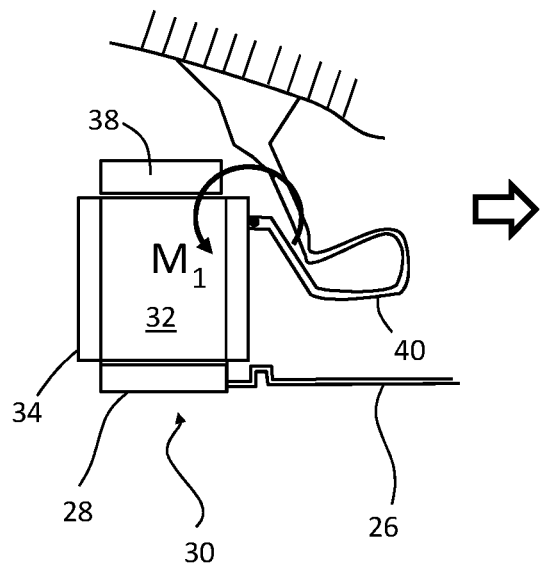
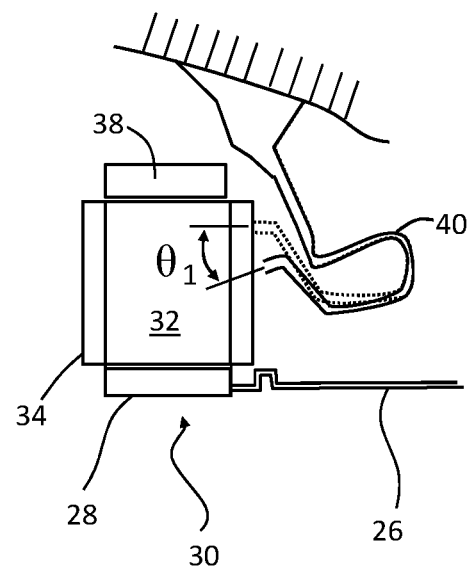
FIG. 10          FIG. 11
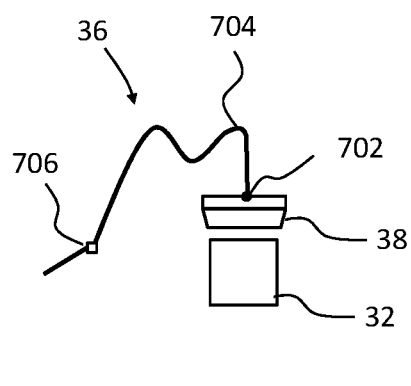
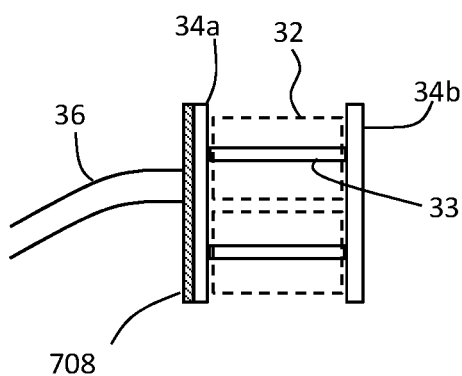
FIG. 12          FIG. 13

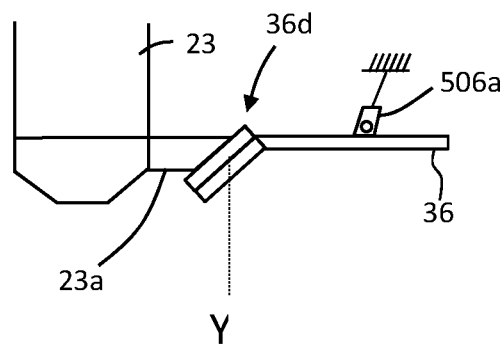
FIG. 14
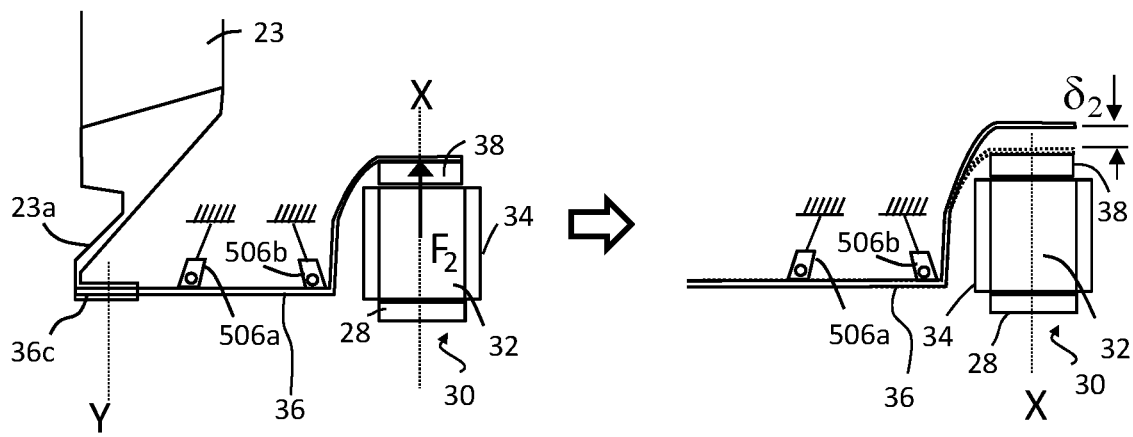
FIG. 15
FIG. 16

GEARED GAS TURBINE ENGINE

This is a Continuation-in-Part Application of application Ser. No. 17/244,091, filed Apr. 29, 2021, which in turn is a Continuation of application Ser. No. 16/820,903 filed Mar. 17, 2020, which in turn claims the benefit of priority of GB 1917769.0 filed Dec. 5, 2019. The disclosure of the prior applications is hereby incorporated by reference herein in its entirety.

TECHNICAL FIELD

The present disclosure relates to gas turbine engines, specifically gas turbine engines for aircraft. Aspects of the present disclosure also relate to an aircraft comprising the gas turbine engine, and a method of operating the gas turbine engine.

BACKGROUND

Gas turbine engines for aircraft propulsion have many design factors that affect the overall efficiency and power output or thrust. A general aim for a gas turbine engine is to provide low specific fuel consumption (SFC). To enable a higher thrust at a high efficiency, a larger diameter fan may be used. In order to facilitate use of a larger fan size, a gearbox is provided having an output to a fan shaft via which the fan is driven. The gearbox receives drive from a core shaft connected to a turbine system of the engine core. The gearbox allows the fan to operate at a reduced rotational speed compared to if a direct drive were used.

SUMMARY

When making an engine having a larger fan diameter however, the inventor has discovered that simply scaling up components of a known engine type may not lead to an efficient design. For example, there may be problems associated with mounting the gearbox and the fan shaft within the engine. Consideration of the properties of components used to mount the gearbox and the properties of the fan shaft are therefore required.

According to a first aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft via an output of the gearbox so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, wherein: the moment of inertia of the fan is greater than or equal to $7.40\times10^7$ kgmm$^2$; and a radial bending stiffness to moment of inertia ratio of:

$$\frac{\text{the radial bending stiffness of at least one of the fan shaft at the output of the gearbox and the gearbox support}}{\text{the moment of inertia of the fan}}$$

is greater than or equal to $2.5\times10^{-2}$ Nkg$^{-1}$m$^{-1}$mm$^{-2}$. The radial bending stiffness to moment of inertia ratio may be greater than or equal to $0.05$ Nkg$^{-1}$m$^{-1}$mm$^{-2}$. The radial bending stiffness to moment of inertia ratio may be in the range from $2.5\times10^{-2}$ Nkg$^{-1}$m$^{-1}$mm$^{-2}$ to $6.0$ Nkg$^{-1}$m$^{-1}$mm$^{-2}$. The radial bending stiffness to moment of inertia ratio may be in the range from $0.05$ Nkg$^{-1}$m$^{-1}$mm$^{-2}$ to $3.0$ Nkg$^{-1}$m$^{-1}$mm$^{-2}$. The radial bending stiffness to moment of inertia ratio may be in the range from $0.05$ Nkg$^{-1}$m$^{-1}$mm$^{-2}$ to $0.6$ Nkg$^{-1}$m$^{-1}$mm$^{-2}$.

A ratio of the radial bending stiffness of the fan shaft at the output of the gearbox to the moment of inertia of the fan may be greater than or equal to $2.5\times10^{-2}$ Nkg$^{-1}$m$^{-1}$mm$^{-2}$, greater than or equal to $0.05$ Nkg$^{-1}$m$^{-1}$mm$^{-2}$, in the range from $2.5\times10^{-2}$ Nkg$^{-1}$m$^{-1}$mm$^{-2}$ to $6.0$ Nkg$^{-1}$m$^{-1}$mm$^{-2}$, in the range from $0.05$ Nkg$^{-1}$m$^{-1}$mm$^{-2}$ to $3.0$ Nkg$^{-1}$m$^{-1}$mm$^{-2}$, or in the range from $0.05$ Nkg$^{-1}$m$^{-1}$mm$^{-2}$ to $0.6$ Nkg$^{-1}$m$^{-1}$mm$^{-2}$.

A ratio of the radial bending stiffness of the gearbox support to the moment of inertia of the fan may be greater than or equal to $3.0\times10^{-2}$ Nkg$^{-1}$m$^{-1}$mm$^2$, greater than or equal to $0.06$ Nkg$^{-1}$m$^{-1}$mm$^{-2}$, in the range from $3.0\times10^{-2}$ Nkg$^{-1}$m$^{-1}$mm$^2$ to $4.0$ Nkg$^{-1}$m$^{-1}$mm$^2$, in the range from $0.06$ Nkg$^{-1}$m$^{-1}$mm$^2$ to $2.0$ Nkg$^{-1}$m$^{-1}$mm$^{-2}$, or in the range from $0.06$ Nkg$^{-1}$m$^{-1}$mm$^{-2}$ to $0.48$ Nkg$^{-1}$m$^{-1}$mm$^{-2}$. The radial bending stiffness of the fan shaft at the output of the gearbox may be greater than or equal to $4.00\times10^6$ N/m. The radial bending stiffness of the fan shaft at the output of the gearbox may be greater than or equal to $3.7\times10^7$ N/m. The radial bending stiffness of the fan shaft at the output of the gearbox may be in the range from $4.00\times10^6$ N/m to $1.50\times10^9$ N/m. The radial bending stiffness of the fan shaft at the output of the gearbox may be in the range from $3.7\times10^7$ N/m to $1.0\times10^9$ N/m.

The radial bending stiffness of the gearbox support may be greater than or equal to $1.0\times10^7$ N/m. The radial bending stiffness of the gearbox support may be greater than or equal to $2.0\times10^7$ N/m. The radial bending stiffness of the gearbox support may be greater than or equal to $3.0\times10^7$ N/m. The radial bending stiffness of the gearbox support may be in the range from $1.0\times10^7$ N/m to $4.0\times10^8$ N/m. The radial bending stiffness of the gearbox support may be in the range from $2.0\times10^7$ N/m to $3.0\times10^8$ N/m. The radial bending stiffness of the gearbox support may be in the range from $3.0\times10^7$ N/m to $2.0\times10^8$ N/m.

The diameter of the fan may be in the range from 240 cm to 280 cm. In such an embodiment, the radial bending stiffness to moment of inertia ratio may be greater than or equal to $0.05$ Nkg$^{-1}$m$^{-1}$mm$^{-2}$ or in the range from $0.05$ Nkg$^{-1}$m$^{-1}$mm$^{-2}$ to $4.0$ Nkg$^{-1}$m$^{-1}$mm$^{-2}$.

Alternatively, the diameter of the fan may be in the range from 330 cm to 380 cm. In such an embodiment, the radial bending stiffness to moment of inertia ratio may be greater than or equal to $0.025$ Nkg$^{-1}$m$^{-1}$mm$^{-2}$ or in the range from $0.025$ Nkg$^{-1}$m$^{-1}$mm$^{-2}$ to $2.0$ Nkg$^{-1}$m$^{-1}$mm$^{-2}$.

A product (e.g. a radial bending stiffness moment of inertia product) of:

$$(\text{the radial bending stiffness of at least one of the fan shaft at the output of the gearbox and the gearbox support})\times(\text{the moment of inertia of the fan})$$

may be greater than or equal to $2.0\times10^{14}$ Nkgmm$^2$m$^{-1}$, greater than or equal to $4.0\times10^{14}$ Nkgmm$^2$m$^{-1}$, greater than or equal to $2.0\times10^{15}$ Nkgmm$^2$m$^{-1}$, in the range from $2.0\times10^{14}$ Nkgmm$^2$m$^{-1}$ to $1.4\times10^{18}$ Nkgmm$^2$m$^{-1}$, in the range from $4.0\times10^{14}$ Nkgmm$^2$m$^{-1}$ to $7.0\times10^{17}$ Nkgmm$^2$m$^{-1}$, or in the range from $2.0\times10^{15}$ Nkgmm$^2$m$^{-1}$ to $7.0\times10^{17}$ Nkgmm$^2$m$^{-1}$.

A tilt stiffness to moment of inertia ratio of:

$$\frac{\text{the tilt stiffness of at least one of the fan shaft at the output of the gearbox and the gearbox support}}{\text{the moment of inertia of the fan}}$$

may be greater than or equal to $4.0 \times 10^{-4}$ Nmrad$^{-1}$kg$^{-1}$mm$^{-2}$. The tilt stiffness to moment of inertia ratio may be greater than or equal to $1.0 \times 10^{-3}$ Nmrad$^{-1}$kg$^{-1}$mm$^{-2}$. The tilt stiffness to moment of inertia ratio may be in the range from $4.0 \times 10^{-4}$ Nmrad$^{-1}$kg$^{-1}$mm$^{-2}$ to $2.7 \times 10^{-1}$ Nmrad$^{-1}$kg$^{-1}$mm$^{-2}$. The tilt stiffness to moment of inertia ratio may be in the range from $1.0 \times 10^{-3}$ Nmrad$^{-1}$kg$^{-1}$mm$^{-2}$ to $0.1$ Nmrad$^{-1}$kg$^{-1}$mm$^{-2}$. The tilt stiffness to moment of inertia ratio may be in the range from $1.0 \times 10^{-3}$ Nmrad$^{-1}$kg$^{-1}$mm$^{-2}$ to $1.5 \times 10^{-2}$ Nmrad$^{-1}$kg$^{-1}$mm$^{-2}$ According to a second aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft via an output of the gearbox so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, wherein: the moment of inertia of the fan is greater than or equal to $7.40 \times 10^7$ kgmm$^2$; and a tilt stiffness to moment of inertia ratio of:

$$\frac{\text{the tilt stiffness of at least one of the fan shaft at the output of the gearbox and the gearbox support}}{\text{the moment of inertia of the fan}}$$

is greater than or equal to $4.0 \times 10^{-4}$ Nmrad$^{-1}$kg$^{-1}$mm$^{-2}$.

The tilt stiffness to moment of inertia ratio may be greater than or equal to $1.0 \times 10^{-3}$ Nmrad$^{-1}$kg$^{-1}$mm$^{-2}$. The tilt stiffness to moment of inertia ratio may be in the range from $4.0 \times 10^{-4}$ Nmrad$^{-1}$kg$^{-1}$mm$^{-2}$ to $2.7 \times 10^{-1}$ Nmrad$^{-1}$kg$^{-1}$mm$^{-2}$. The tilt stiffness to moment of inertia ratio may be in the range from $1.0 \times 10^{-3}$ Nmrad$^{-1}$kg$^{-1}$mm$^{-2}$ to $0.1$ Nmrad$^{-1}$kg$^{-1}$mm$^{-2}$. The tilt stiffness to moment of inertia ratio may be in the range from $1.0 \times 10^{-3}$ Nmrad$^{-1}$kg$^{-1}$mm$^{-2}$ to $1.5 \times 10^{-2}$ Nmrad$^{-1}$kg$^{-1}$mm$^{-2}$.

A ratio of the tilt stiffness of the fan shaft at the output of the gearbox to the moment of inertia of the fan may be greater than or equal to $4.0 \times 10^{-4}$ Nmrad$^{-1}$kg$^{-1}$mm$^{-2}$, greater than or equal to $1.0 \times 10^{-3}$ Nmrad$^{-1}$kg$^{-1}$mm$^{-2}$, in the range from $4.0 \times 10^{-4}$ Nmrad$^{-1}$kg$^{-1}$mm$^{-2}$ to $2.7 \times 10^{-1}$ Nmrad$^{-1}$kg$^{-1}$mm$^{-2}$, in the range from $1.0 \times 10^{-3}$ Nmrad$^{-1}$kg$^{-1}$mm$^{-2}$ to $0.1$ Nmrad$^{-1}$kg$^{-1}$mm$^{-2}$, or in the range from $1.0 \times 10^{-3}$ Nmrad$^{-1}$kg$^{-1}$mm$^{-2}$ to $1.5 \times 10^{-2}$ Nmrad$^{-1}$kg$^{-1}$mm$^{-2}$.

A ratio of the tilt stiffness of the gearbox support to the moment of inertia of the fan may be greater than or equal to $1.0 \times 10^3$ Nmrad$^{-1}$kg$^{-1}$mm$^{-2}$, greater than or equal to $2.0 \times 10^{-3}$ Nmrad$^{-1}$kg$^{-1}$mm$^{-2}$, in the range from $1.0 \times 10^{-1}$Nmrad$^{-1}$kg$^{-1}$mm$^2$ to $7.0 \times 10^{-2}$ Nmrad$^{-1}$kg$^{-1}$mm$^2$, in the range from $2.0 \times 10^{-3}$ Nmrad$^{-1}$kg$^{-1}$mm$^2$ to $3.0 \times 10^{-2}$ Nmrad$^{-1}$kg$^{-1}$mm$^{-2}$, or in the range from $2.0 \times 10^{-3}$ Nmrad$^{-1}$kg$^{-1}$mm$^{-2}$ to $7.0 \times 10^{-3}$ Nmrad$^{-1}$kg$^{-1}$mm$^{-2}$.

The tilt stiffness of the fan shaft at the output of the gearbox may be greater than or equal to $7.00 \times 10^4$ Nm/rad. The tilt stiffness of the fan shaft at the output of the gearbox may be greater than or equal to $9.5 \times 10^5$ Nm/rad. The tilt stiffness of the fan shaft at the output of the gearbox may be in the range from $7.00 \times 10^4$ Nm/rad to $7.00 \times 10^7$ Nm/rad. The tilt stiffness of the fan shaft at the output of the gearbox may be in the range from $9.5 \times 10^5$ Nm/rad to $3.5 \times 10^7$ Nm/rad.

The tilt stiffness of the gearbox support may be greater than or equal to $1.2 \times 10^5$ Nm/rad. The tilt stiffness of the gearbox support may be greater than or equal to $2.4 \times 10^5$ Nm/rad. The tilt stiffness of the gearbox support may be greater than or equal to $3.9 \times 10^5$ Nm/rad. The tilt stiffness of the gearbox support may be in the range from $1.2 \times 10^5$ Nm/rad to $2.1 \times 10^7$ Nm/rad. The tilt stiffness of the gearbox support may be in the range from $2.4 \times 10^5$ Nm/rad to $1.6 \times 10^7$ Nm/rad. The tilt stiffness of the gearbox support may be in the range from $3.9 \times 10^5$ Nm/rad to $9.0 \times 10^6$ Nm/rad.

A radial bending stiffness to moment of inertia ratio of:

$$\frac{\text{the radial bending stiffness of at least one of the fan shaft at the output of the gearbox and the gearbox support}}{\text{the moment of inertia of the fan}}$$

may be greater than or equal to $2.5 \times 10^{-2}$ Nkg$^{-1}$m$^{-1}$mm$^{-2}$. The radial bending stiffness to moment of inertia ratio may be greater than or equal to $0.05$ Nkg$^{-1}$m$^{-1}$mm$^{-2}$. The radial bending stiffness to moment of inertia ratio may be in the range from $2.5 \times 10^{-2}$ Nkg$^{-1}$m$^{-1}$mm$^2$ to $6.0$ Nkg$^{-1}$m$^{-1}$mm$^{-2}$. The radial bending stiffness to moment of inertia ratio may be in the range from $0.05$ Nkg$^{-1}$m$^{-1}$mm$^{-2}$ to $3.0$ Nkg$^{-1}$m$^{-1}$mm$^{-2}$. The radial bending stiffness to moment of inertia ratio may be in the range from $0.05$ Nkg$^{-1}$m$^{-1}$mm$^{-2}$ to $0.6$ Nkg$^{-1}$m$^{-1}$mm$^{-2}$ The diameter of the fan may be in the range from 240 cm to 28 cm. In such an example, the tilt stiffness to moment of inertia ratio greater may be than or equal to $1.0 \times 10^{-3}$ Nmrad$^{-1}$kg$^{-1}$mm$^2$ or in the range from $1.0 \times 10^{-3}$ Nmrad$^{-1}$kg$^{-1}$mm$^{-2}$ to $1.45 \times 10^{-2}$ Nmrad$^{-1}$kgmm$^{-2}$.

Alternatively, the diameter of the fan may be in the range from 330 cm to 380 cm. In such an embodiment the tilt stiffness to moment of inertia ratio may be greater than or equal to $4.0 \times 10^{-4}$ Nmrad$^{-1}$kg$^{-1}$mm$^{-2}$ or in the range from $4.0 \times 10^{-4}$ Nmrad$^{-1}$kg$^{-1}$mm$^{-2}$ to $3.0 \times 10^{-2}$ Nmrad$^{-1}$kg$^{-1}$mm$^{-2}$.

A product (e.g. the tilt stiffness moment of inertia product) of:

(the tilt stiffness of at least one of the fan shaft at the output of the gearbox and the gearbox support)×(the moment of inertia of the fan)

may be greater than or equal to $3.0 \times 10^{12}$ Nmrad$^{-1}$kgmm$^2$, greater than or equal to $6.0 \times 10^{12}$ Nmrad$^{-1}$kgmm$^2$, greater than or equal to $2.5 \times 10^{13}$ Nmrad$^{-1}$kgmm$^2$, in the range from $3.0 \times 10^{12}$ Nmrad$^{-1}$kgmm$^2$ to $6.0 \times 10^{16}$ Nmrad$^{-1}$kgmm$^2$, in the range from $6.0 \times 10^{12}$ Nmrad$^{-1}$kgmm$^2$ to $3.0 \times 10^{16}$ Nmrad$^{-1}$kgmm$^2$, or in the range from $2.5 \times 10^{13}$ Nmrad$^{-1}$kgmm$^2$ to $3.0 \times 10^{16}$ Nmrad$^{-1}$kgmm$^2$.

One or more of the following features may apply to either or both of the first and second aspects above:

The moment of inertia of the fan may be greater than or equal to $8.3 \times 10^7$ kgmm$^2$. The moment of inertia of the fan may be in the range from $7.40 \times 10^7$ kgmm$^2$ to $9.00 \times 10^8$ kgmm$^2$. The moment of inertia of the fan may be in the range from $8.3 \times 10^7$ kgmm$^2$ to $6.5 \times 10^8$ kgmm$^2$.

The fan blades may be formed from a metallic material. The fan blades may be formed from titanium or an aluminium-lithium alloy with a titanium leading edge.

The fan blades may be formed at least partly from an organic matrix composite. The fan blades may have a carbon composite body with a metallic leading edge.

The fan shaft may connect the output of the gearbox to the fan. A gearbox output position may be defined as the point of connection between the fan shaft and the gearbox. The fan may have an axial centreline. A fan-gearbox axial distance may be defined as the axial distance between the axial position of the gearbox output position and the fan axial centreline. The fan-gearbox axial distance multiplied by the moment of inertia of the fan may be greater than or equal to $1.9 \times 10^7$ kgmm²m, greater than or equal to $2.9 \times 10^7$ kgmm²m, in the range from $1.9 \times 10^7$ kgmm²m to $6.2 \times 10^8$ kgmm²m, or in the range from $2.9 \times 10^7$ kgmm²m to $3.9 \times 10^8$ kgmm²m.

The fan shaft may be defined as the torque transfer component extending from the output of the gearbox to the input to the fan. The fan shaft may comprise at least part of a gearbox output shaft and at least part of a fan input shaft.

The gearbox may be in a star configuration and the output of the gearbox may be a gearbox output position defined as the point of connection between the ring gear and the fan shaft. Alternatively, the gearbox may be in a planetary configuration and the output of the gearbox may be a gearbox output position at the interface between the fan shaft and the planet carrier.

According to a third aspect there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft via an output of the gearbox so as to drive the fan at a lower rotational speed than the core shaft; a gearbox support arranged to at least partially support the gearbox within the propulsor, and wherein: the moment of inertia of the fan is greater than or equal to $7.40 \times 10^7$ kgmm²; and a radial bending stiffness to moment of inertia ratio of:

$$\frac{\text{the radial bending stiffness of at least one of the fan shaft at the output of the gearbox and the gearbox support}}{\text{the moment of inertia of the fan}}$$

is greater than or equal to $2.5 \times 10^{-2}$ Nkg⁻¹m⁻¹mm⁻².

The propulsor of the third aspect may have some or all of the features described above with respect to the gas turbine engine of the first aspect, and may be a gas turbine engine in some embodiments.

According to a fourth aspect there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft via an output of the gearbox so as to drive the fan at a lower rotational speed than the core shaft; and a gearbox support arranged to at least partially support the gearbox within the propulsor, and wherein: the moment of inertia of the fan is greater than or equal to $7.40 \times 10^7$ kgmm²; and a tilt stiffness to moment of inertia ratio of:

$$\frac{\text{the tilt stiffness of at least one of the fan shaft at the output of the gearbox and the gearbox support}}{\text{the moment of inertia of the fan}}$$

is greater than or equal to $4.0 \times 10^{-4}$ Nmrad⁻¹kg⁻¹mm⁻².

The propulsor of the fourth aspect may have some or all of the features described above with respect to the gas turbine engine of the second aspect, and may be a gas turbine engine in some embodiments.

The third and fourth aspects may be combined. According to a fifth aspect there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft via an output of the gearbox so as to drive the fan at a lower rotational speed than the core shaft; and a gearbox support arranged to at least partially support the gearbox within the propulsor, and wherein the moment of inertia of the fan is greater than or equal to $7.40 \times 10^7$ kgmm²; and wherein:

a) a radial bending stiffness to moment of inertia ratio of:

$$\frac{\text{the radial bending stiffness of at least one of the fan shaft at the output of the gearbox and the gearbox support}}{\text{the moment of inertia of the fan}}$$

is greater than or equal to $2.5 \times 10^{-2}$ Nkg⁻¹m⁻¹mm⁻²; and/or b) a tilt stiffness to moment of inertia ratio of:

$$\frac{\text{the tilt stiffness of at least one of the fan shaft at the output of the gearbox and the gearbox support}}{\text{the moment of inertia of the fan}}$$

is greater than or equal to $4.0 \times 10^{-4}$ Nmrad⁻¹kg⁻¹mm⁻².

The propulsor of the fifth aspect may have some or all of the features described above with respect to the gas turbine engine of the first or second aspect, and may be a gas turbine engine in some embodiments.

According to a sixth aspect there is provided a method of operating a gas turbine engine for an aircraft, the gas turbine engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft via an output of the gearbox so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, wherein: the moment of inertia of the fan is greater than or equal to $7.40 \times 10^7$ kgmm²; and a radial bending stiffness to moment of inertia ratio of:

$$\frac{\text{the radial bending stiffness of at least one of the fan shaft at the output of the gearbox and the gearbox support}}{\text{the moment of inertia of the fan}}$$

is greater than or equal to $2.5 \times 10^{-2}$ Nkg⁻¹m⁻¹mm⁻², the method comprises operating the gas turbine engine to provide propulsion for the aircraft under cruise conditions.

The method of the sixth aspect may be a method of operating the gas turbine engine or the propulsor of the first aspect or third aspect respectively. Any of the features, ratios and parameters introduced above in connection with the first or third aspect may also therefore apply to the sixth aspect According to a seventh aspect there is provided a method of operating a gas turbine engine for an aircraft, the gas turbine engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft via an output of the gearbox so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, wherein the moment of inertia of the fan is greater than or equal to $7.40 \times 10^7$ kgmm$^2$; and a tilt stiffness to moment of inertia ratio of:

$$\frac{\text{the tilt stiffness of at least one of the fan shaft at the output of the gearbox and the gearbox support}}{\text{the moment of inertia of the fan}}$$

is greater than or equal to $4.0 \times 10^{-4}$ Nmrad$^{-1}$kg$^{-1}$mm$^2$, the method comprising operating the gas turbine engine to provide propulsion for the aircraft under cruise conditions.

The method of the seventh aspect may be a method of operating the gas turbine engine or the propulsor of the second aspect or fourth aspect respectively. Any of the features, ratios and parameters introduced above in connection with the second aspect or fourth aspect may also therefore apply to the seventh aspect.

The sixth and seventh aspects may be combined. According to an eighth aspect there is provided a method of operating a gas turbine engine for an aircraft, the gas turbine engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft via an output of the gearbox so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, wherein the moment of inertia of the fan is greater than or equal to $7.40 \times 10^7$ kgmm$^2$, and wherein: a radial bending stiffness to moment of inertia ratio of:

$$\frac{\text{the radial bending stiffness of at least one of the fan shaft at the output of the gearbox and the gearbox support}}{\text{the moment of inertia of the fan}}$$

is greater than or equal to $2.5 \times 10^{-2}$ Nkg$^{-1}$m$^{-1}$mm$^2$; and/or b) a tilt stiffness to moment of inertia ratio of:

$$\frac{\text{the tilt stiffness of at least one of the fan shaft at the output of the gearbox and the gearbox support}}{\text{the moment of inertia of the fan}}$$

is greater than or equal to $4.0 \times 10^{-4}$ Nmrad$^{-1}$kg$^{-1}$mm$^2$, the method comprising operating the gas turbine engine to provide propulsion for the aircraft under cruise conditions.

The method of the eighth aspect may be a method of operating the gas turbine engine or the propulsor of the first, second or fifth aspect. Any of the features, ratios and parameters introduced above in connection with the first, second or fifth aspect may also therefore apply to the eighth aspect.

The inventor has discovered that either the radial bending/tilt stiffness of one or both of the fan shaft at the gearbox output and the gearbox support need to be low enough for a given moment of inertia of the fan to isolate the gearbox from the transmission of loads from the fan. Rotation of the fan will cause a gyroscopic effect meaning that the fan shaft will tend to maintain a steady direction of its axis of rotation. During manoeuvring of the aircraft to which the gas turbine engine is mounted the orientation of the axis of rotation of the fan shaft will however change. The inventor has found that gyroscopic effects will result in loads being transmitted to the gearbox. The inventor has discovered that by using a fan shaft and/or gearbox support having a radial bending/tilt stiffness so that the radial bending/stilt stiffness to moment of inertia ratio defined above is within the specified range the problem of load from the fan being transmitted to the gearbox can be addressed. The inventor has found that if the radial bending/tilt stiffness of the fan shaft or the gearbox support shaft is increased so that the ratio is outside of the defined range there is inadequate isolation of the gearbox. The inventor has also found that if the fan shaft/gearbox support stiffness were to be decreased so that the ratio is outside of the range above excessive vibration at low modal frequencies would result.

In other aspects, value ranges for the product of the components of the radial bending stiffness to moment of inertia ratio and the tilt stiffness to moment of inertia ratio may be specified instead of, or as well as, value ranges for the ratios.

According to one such aspect, the first aspect introduced above may be formulated as an aspect providing a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft via an output of the gearbox so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, wherein: the moment of inertia of the fan is greater than or equal to $7.40 \times 10^7$ kgmm$^2$; and a product of:

$$(\text{the radial bending stiffness of at least one of the fan shaft at the output of the gearbox and the gearbox support}) \times (\text{the moment of inertia of the fan})$$

is greater than or equal to $2.0 \times 10^{14}$ Nkgmm$^2$m$^{-1}$, greater than or equal to $4.0 \times 10^{14}$ Nkgmm$^2$m$^{-1}$, greater than or equal to $2.0 \times 10^{15}$ Nkgmm$^2$m$^{-1}$, in the range from $2.0 \times 10^{14}$ Nkgmm$^2$m- to $1.4 \times 10^{18}$ Nkgmm$^2$m$^{-1}$, in the range from $4.0 \times 10^{14}$ Nkgmm$^2$m- to $7.0 \times 10^{17}$ Nkgmm$^2$m$^{-1}$, or in the range from $2.0 \times 10^{15}$ Nkgmm$^2$m$^{-1}$ to $7.0 \times 10^{17}$ Nkgmm$^2$m$^{-1}$.

According to another such aspect, the second aspect introduced above may be formulated as an aspect providing a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft via an output of the gearbox so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, wherein: the moment of inertia of the fan is greater than or equal to $7.40 \times 10^7$ kgmm²; and a product of:

(the tilt stiffness of at least one of the fan shaft at the output of the gearbox and the gearbox support)×(the moment of inertia of the fan)

is greater than or equal to $3.0 \times 10^{12}$ Nmrad⁻¹kgmm², greater than or equal to $6.0 \times 10^{12}$ Nmrad⁻¹kgmm², greater than or equal to $2.5 \times 10^{13}$ Nmrad⁻¹kgmm², in the range from $3.0 \times 10^{12}$ Nmrad⁻¹kgmm² to $6.0 \times 10^{16}$ Nmrad⁻¹kgmm², in the range from $6.0 \times 10^{12}$ Nmrad⁻¹kgmm² to $3.0 \times 10^{16}$ Nmrad⁻¹kgmm², or in the range from $2.5 \times 10^{13}$ Nmrad⁻¹kgmm² to $3.0 \times 10^{16}$ Nmrad⁻¹kgmm².

The skilled person will appreciate that method and propulsor aspects may be formulated accordingly.

According to a ninth aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, wherein: the gearbox has a cross sectional area, the cross sectional area being greater than or equal to $2.4 \times 10^{-1}$ m²; and a first gearbox support strength ratio of:

$$\frac{\text{the torsional strength of the gearbox support}}{\text{the radial bending stiffness of the gearbox support} \times \text{the cross sectional area of the gearbox}}$$

is greater than or equal to $7.0 \times 10^{-3}$.

The first gearbox support strength ratio may be greater than or equal to $1.0 \times 10^{-2}$. The first gearbox support strength ratio may be greater than or equal to $7.0 \times 10^{-3}$. The first gearbox support strength ratio may be greater than or equal to $2.0 \times 10^{-2}$. The first gearbox support strength ratio may be in the range from $7.0 \times 10^{-3}$ to $2.5 \times 10^{-1}$. The first gearbox support strength ratio may be in the range from $1.0 \times 10^{-2}$ to $1.0 \times 10^{-1}$. The first gearbox support strength ratio may be in the range from $7.0 \times 10^{-3}$ to $2.0 \times 10^{-2}$. The first gearbox support strength ratio may be in the range from $2.0 \times 10^{-2}$ to $2.5 \times 10^{-1}$.

The radial bending stiffness of the gearbox support may be greater than or equal to $1.0 \times 10^7$ N/m. The radial bending stiffness of the gearbox support may be greater than or equal to $2.0 \times 10^7$ N/m. The radial bending stiffness of the gearbox support may be greater than or equal to $3.0 \times 10^7$ N/m. The radial bending stiffness of the gearbox support may be in the range from $1.0 \times 10^7$ N/m to $4.0 \times 10^8$ N/m. The radial bending stiffness of the gearbox support may be in the range from $2.0 \times 10^7$ N/m to $3.0 \times 10^8$ N/m. The radial bending stiffness of the gearbox support may be in the range from $3.0 \times 10^7$ N/m to $2.0 \times 10^8$ N/m.

The torsional strength of the gearbox support may be greater than or equal to $1.60 \times 10^5$ Nm. The torsional strength of the gearbox support may be greater than or equal to $1.8 \times 10^5$ Nm. The torsional strength of the gearbox support may be in the range from $1.60 \times 10^5$ Nm to $2.00 \times 10^7$ Nm. The torsional strength of the gearbox support may be in the range from $1.8 \times 10^5$ Nm to $1.5 \times 10^6$ Nm.

A planet gear spacing angle in radians may be defined as $2\pi/N$, where N is the number of planet gears.

A second gearbox support strength ratio of:

$$\frac{\text{the torsional strength of the gearbox support}}{\text{the tilt stiffness of the gearbox support} \times \text{the planet gear spacing angle}}$$

may be greater than or equal to $1.0 \times 10^{-1}$. The second gearbox support strength ratio may be greater than or equal to $1.5 \times 10^{-1}$. The second gearbox support strength ratio may be greater than or equal to $1.0 \times 10^{-1}$. The second gearbox support strength ratio may be greater than or equal to $2.5 \times 10^{-1}$. The second gearbox support strength ratio may be in the range from $1.0 \times 10^{-1}$ to 3.5. The second gearbox support strength ratio may be in the range from $1.5 \times 10^{-1}$ to 1.7. The second gearbox support strength ratio may be in the range from $1.0 \times 10^{-1}$ to $2.5 \times 10^{-1}$. The second gearbox support strength ratio may be in the range from $2.5 \times 10^{-1}$ to 3.5.

According to a tenth aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, wherein: a planet gear spacing angle in radians is defined as $2\pi/N$, where N is the number of planet gears; the gearbox has a cross sectional area, the cross sectional area being greater than or equal to $2.4 \times 10^{-1}$ m²; and a second gearbox support strength ratio of:

$$\frac{\text{the torsional strength of the gearbox support}}{\text{the tilt stiffness of the gearbox support} \times \text{the planet gear spacing angle}}$$

is greater than or equal to $1.0 \times 10^{-1}$.

The second gearbox support strength ratio may be greater than or equal to $1.5 \times 10^{-1}$. The second gearbox support strength ratio may be greater than or equal to $2.5 \times 10^{-1}$. The second gearbox support strength ratio may be in the range from $1.0 \times 10^{-1}$ to 3.5. The second gearbox support strength ratio may be in the range from $1.5 \times 10^{-1}$ to 1.7. The second gearbox support strength ratio may be in the range from $1.0 \times 10^{-1}$ to $2.5 \times 10^{-1}$. The second gearbox support strength ratio may be in the range from $2.5 \times 10^{-1}$ to 3.5.

The tilt stiffness of the gearbox support may be greater than or equal to $1.2 \times 10^5$ Nm/rad. The tilt stiffness of the gearbox support may be greater than or equal to $2.4 \times 10^5$ Nm/rad. The tilt stiffness of the gearbox support may be greater than or equal to $3.9 \times 10^5$ Nm/rad. The tilt stiffness of the gearbox support may be in the range from $1.2 \times 10^5$ Nm/rad to $2.1 \times 10^7$ Nm/rad. The tilt stiffness of the gearbox support may be in the range from $2.4 \times 10^5$ Nm/rad to $1.6 \times 10^7$ Nm/rad. The tilt stiffness of the gearbox support may be in the range from $3.9 \times 10^5$ Nm/rad to $9.0 \times 10^6$ Nm/rad.

The torsional strength of the gearbox support may be greater than or equal to $1.60 \times 10^5$ Nm. The torsional strength of the gearbox support may be greater than or equal to $1.8 \times 10^5$ Nm. The torsional strength of the gearbox support may be in the range from $1.60 \times 10^5$ Nm to $2.00 \times 10^7$ Nm. The torsional strength of the gearbox support may be in the range from $1.8 \times 10^5$ Nm to $1.5 \times 10^6$ Nm.

A first gearbox support strength ratio of:

$$\frac{\text{the torsional strength of the gearbox support}}{\text{the radial bending stiffness of the gearbox support} \times \text{the cross sectional area of the gearbox}}$$

may be greater than or equal to $7.0 \times 10^{-3}$. The first gearbox support strength ratio may be greater than or equal to $1.0 \times 10^{-2}$. The first gearbox support strength ratio may be greater than or equal to $2.0 \times 10^{-2}$. The first gearbox support strength ratio may be in the range from $7.0 \times 10^{-3}$ to $2.5 \times 10^{-1}$. The first gearbox support strength ratio may be in the range from $1.0 \times 10^{-2}$ to $1.0 \times 10^{-1}$. The first gearbox support strength ratio may be in the range from $7.0 \times 10^{-3}$ to $2.0 \times 10$. The first gearbox support strength ratio may be in the range from $2.0 \times 10^{-2}$ to $2.5 \times 10^{-1}$.

One or more of the following features may apply to either or both of the ninth and tenth aspects above:

The gearbox may be in a star configuration.

The planet gear spacing angle may be greater than or equal to $9.0 \times 10^{-1}$ rad. The planet gear spacing angle may be in the range between $9.0 \times 10^{-1}$ rad to 2.1 rad.

The cross sectional area of the gearbox may be greater than or equal to $2.6 \times 10^{-1}$ m². The cross sectional area of the gearbox may be in the range from $2.4 \times 10^{-1}$ m² to 1.10 m². The cross sectional area of the gearbox may be in the range from $2.6 \times 10^{-1}$ m² to $9.0 \times 10^{-1}$ m². The cross sectional area (CSA) of the gearbox may be defined as the area of the pitch circle of the ring gear.

A torsional shear stress of the gearbox support, at maximum take-off conditions, may be less than or equal to $4.90 \times 10^8$ N/m², less than or equal to $3.5 \times 10^8$ N/m², in the range from $1.40 \times 10^8$ N/m² to $4.90 \times 10^8$ N/m², or in the range from $2.0 \times 10^8$ N/m² to $3.5 \times 10^8$ N/m².

A first gearbox support shear stress ratio of:

$$\frac{\text{the torsional shear stress of the gearbox support at maximum take off conditions}}{\text{the radial bending stiffness of the gearbox support}}$$

may be less than or equal to $4.9 \times 10^{-1}$ m⁻¹, less than or equal to 20 m⁻¹, in the range from $3.5 \times 10^{-1}$ m⁻¹ to $4.9 \times 10^{1}$ m⁻¹, or in the range from 0.70 m⁻¹ to 20 m⁻¹.

A second gearbox support shear stress ratio of:

$$\frac{\text{the torsional shear stress of the gearbox support at maximum take off conditions}}{\text{the tilt stiffness of the gearbox support}}$$

may be less than or equal to $4.1 \times 10^3$ rad/m³, less than or equal to $1.4 \times 10^3$ rad/m³, in the range from 6.6 rad/m³ to $4.1 \times 10^3$ rad/m³, or in the range from $1.25 \times 10^1$ rad/m³ to $1.4 \times 10^3$ rad/m³.

According to an eleventh aspect there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the propulsor, wherein: the gearbox has a cross sectional area, the cross sectional area being greater than or equal to $2.4 \times 10^{-1}$ m²; a first gearbox support strength ratio of:

$$\frac{\text{the torsional strength of the gearbox support}}{\text{the radial bending stiffness of the gearbox support} \times \text{the cross sectional area of the gearbox}}$$

is greater than or equal to $7.0 \times 10^{-3}$.

The propulsor of the eleventh aspect may have some or all of the features described above with respect to the gas turbine engine of the ninth aspect, and may be a gas turbine engine in some embodiments.

According to an twelfth aspect there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the propulsor, wherein: the gearbox has a cross sectional area, the cross sectional area being greater than or equal to $2.4 \times 10^{-1}$ m²; and a planet gear spacing angle in radians is defined as $2\pi/N$, where N is the number of planet gears; and a second gearbox support strength ratio of:

$$\frac{\text{the torsional strength of the gearbox support}}{\text{the tilt stiffness of the gearbox support} \times \text{the planet gear spacing angle}}$$

is greater than or equal to $1.0 \times 10^{-1}$.

The propulsor of the twelfth aspect may have some or all of the features described above with respect to the gas turbine engine of the tenth aspect, and may be a gas turbine engine in some embodiments.

The eleventh and twelfth aspects may be combined. According to a thirteenth aspect there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the propulsor, wherein the gearbox has a cross sectional area, the cross sectional area being greater than or equal to $2.4 \times 10^{-1}$ m$^2$, and wherein: a first gearbox support strength ratio of:

$$\frac{\text{the torsional strength of the gearbox support}}{\substack{\text{the radial bending stiffness of} \\ \text{the gearbox support} \times \\ \text{the cross sectional area of the gearbox}}}$$

is greater than or equal to $7.0 \times 10^{-3}$; and/or
b) a planet gear spacing angle in radians is defined as $2\pi/N$, where N is the number of planet gears; and a second gearbox support strength ratio of:

$$\frac{\text{the torsional strength of the gearbox support}}{\substack{\text{the tilt stiffness of the gearbox support} \times \\ \text{the planet gear spacing angle}}}$$

is greater than or equal to $1.0 \times 10^{-1}$.

The propulsor of the thirteenth aspect may have some or all of the features described above with respect to the gas turbine engine of the ninth aspect and tenth aspects, and may be a gas turbine engine in some embodiments.

According to a fourteenth aspect there is provided a method of operating a gas turbine engine for an aircraft, the gas turbine engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, wherein: the gearbox has a cross sectional area, the cross sectional area being greater than or equal to $2.4 \times 10^{-1}$ m$^2$; and a first gearbox support strength ratio of:

$$\frac{\text{the torsional strength of the gearbox support}}{\substack{\text{the radial bending stiffness of} \\ \text{the gearbox support} \times \\ \text{the cross sectional area of the gearbox}}}$$

is greater than or equal to $7.0 \times 10^{-3}$, the method comprising operating the gas turbine engine to provide propulsion for the aircraft under cruise conditions.

The method of the fourteenth aspect may be a method of operating the gas turbine engine or the propulsor of the ninth aspect or eleventh aspect respectively. Any of the features, ratios and parameters introduced above in connection with the ninth aspect or eleventh aspect may also therefore apply to the fourteenth aspect.

According to a fifteenth aspect there is provided a method of operating a gas turbine engine for an aircraft, the gas turbine engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, wherein: the gearbox has a cross sectional area, the cross sectional area being greater than or equal to $2.4 \times 10^{-1}$ m$^2$; and a planet gear spacing angle in radians is defined as $2\pi/N$, where N is the number of planet gears; and a second gearbox support strength ratio of:

$$\frac{\text{the torsional strength of the gearbox support}}{\substack{\text{the tilt stiffness of the gearbox support} \times \\ \text{the planet gear spacing angle}}}$$

is greater than or equal to $1.0 \times 10^{-1}$, the method comprising operating the gas turbine engine to provide propulsion for the aircraft under cruise conditions.

The method of the fifteenth aspect may be a method of operating the gas turbine engine or the propulsor of the tenth aspect or twelfth aspect respectively. Any of the features, ratios and parameters introduced above in connection with the tenth aspect or twelfth aspect may also therefore apply to the fifteenth aspect.

The fourteenth and fifteenth aspects may be combined. According to a sixteenth aspect there is provided a method of operating a gas turbine engine for an aircraft, the gas turbine engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, wherein the gearbox has a cross sectional area, the cross sectional area being greater than or equal to $2.4 \times 10^{-1}$ m$^2$, and
a) a first gearbox support strength ratio of:

$$\frac{\text{the torsional strength of the gearbox support}}{\substack{\text{the radial bending stiffness of} \\ \text{the gearbox support} \times \\ \text{the cross sectional area of the gearbox}}}$$

is greater than or equal to $7.0 \times 10^{-3}$; and/or
b) a planet gear spacing angle in radians is defined as $2\pi/N$, where N is the number of planet gears; and a second gearbox support strength ratio of:

$$\frac{\text{the torsional strength of the gearbox support}}{\text{the tilt stiffness of the gearbox support} \times \text{the planet gear spacing angle}}$$

is greater than or equal to $1.0 \times 10^{-1}$, the method comprising operating the gas turbine engine to provide propulsion for the aircraft under cruise conditions.

The method of the sixteenth aspect may be a method of operating the gas turbine engine or the propulsor of the ninth, tenth or thirteenth aspect. Any of the features, ratios and parameters introduced above in connection with the ninth, tenth or thirteenth aspect may also therefore apply to the sixteenth aspect.

The inventor has discovered that by designing the gearbox support so that the ratio of its torsional strength to its radial bending stiffness and cross sectional area (i.e. the first gearbox support strength ratio) is within the specified range sufficient strength of the support is provided so that the engine is reliable with sufficient stiffness provided to minimise misalignment of the gears in the gearbox and avoid vibration. The inventor has found that a similar consideration applies to the ratio of the torsional strength to the tilt stiffness and planet gear spacing angle (i.e. the second gearbox support strength ratio).

According to a seventeenth aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, wherein: a first gearbox support shear stress ratio of:

$$\frac{\text{the torsional shear stress of the gearbox support at maximum take off conditions}}{\text{the radial bending stiffness of the gearbox support}}$$

is less than or equal to $4.9 \times 10^1$ m$^{-1}$.

The first gearbox support shear stress ratio may be less than or equal to 20 m$^{-1}$. The first gearbox support shear stress ratio may be in the range from $3.5 \times 10^{-1}$ m$^{-1}$ to $4.9 \times 10^1$ m$^{-1}$. The first gearbox support shear stress ratio may be in the range from 0.70 m$^{-1}$ to 20 m$^{-1}$.

The radial bending stiffness of the gearbox support may be greater than or equal to $1.0 \times 10^7$ N/m. The radial bending stiffness of the gearbox support may be greater than or equal to $2.0 \times 10^7$ N/m. The radial bending stiffness of the gearbox support may be greater than or equal to $3.0 \times 10^7$ N/m. The radial bending stiffness of the gearbox support may be in the range from $1.0 \times 10^7$ N/m to $4.0 \times 10^8$ N/m. The radial bending stiffness of the gearbox support may be in the range from $2.0 \times 10^7$ N/m to $3 \times 10^8$ N/m. The radial bending stiffness of the gearbox support may be in the range from $3.0 \times 10^7$ N/m to $2.0 \times 10^8$ N/m.

The torsional shear stress of the gearbox support, at maximum take-off conditions, may be less than or equal to $4.90 \times 10^8$ N/m$^2$. The torsional shear stress of the gearbox support, at maximum take-off conditions, may be less than or equal to $3.5 \times 10^8$ N/m$^2$. The torsional shear stress of the gearbox support, at maximum take-off conditions, may be in the range from $1.40 \times 10^8$ N/m$^2$ to $4.90 \times 10^8$ N/m$^2$. The torsional shear stress of the gearbox support, at maximum take-off conditions, may be in the range from $2.0 \times 10^8$ N/m$^2$ to $3.5 \times 10^8$ N/m$^2$.

The diameter of the fan may be in the range from 240 cm to 280 cm. In such an embodiment, the first gearbox support shear stress ratio may be less than or equal to 35 m$^{-1}$, or in the range from 0.70 m$^{-1}$ to 35 m$^{-1}$.

Alternatively, the diameter of the fan may be in the range from 330 cm to 380 cm. In such an embodiment the first gearbox support shear stress ratio may be less than or equal to 12 m$^{-1}$, or in the range from 0.50 m$^{-1}$ to 12 m$^{-1}$.

A second gearbox support shear stress ratio of:

$$\frac{\text{the torsional shear stress of the gearbox support at maximum take off conditions}}{\text{the tilt stiffness of the gearbox support}}$$

may be less than or equal to $4.1 \times 10^3$ rad/m$^3$. The second gearbox support shear stress ratio may be less than or equal to $1.4 \times 10^3$ rad/m$^3$. The second gearbox support shear stress ratio may be in the range from 6.6 rad/m$^3$ to $4.1 \times 10^3$ rad/m$^3$. The second gearbox support shear stress ratio may be in the range from $1.25 \times 10^1$ rad/m$^3$ to $1.4 \times 10^3$ rad/m$^3$.

According to an eighteenth aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox arranged to at least partially support the gearbox within the engine, and: a second gearbox support shear stress ratio of:

$$\frac{\text{the torsional shear stress of the gearbox support at maximum take off conditions}}{\text{tilt stiffness of the gearbox support}}$$

is less than or equal to $4.1 \times 10^3$ rad/m$^3$.

The second gearbox support shear stress ratio may be less than or equal to $1.4 \times 10^3$ rad/m$^3$. The second gearbox support shear stress ratio may be in the range from 6.6 rad/m$^3$ to $4.1 \times 10^3$ rad/m$^3$. The second gearbox support shear stress ratio may be in the range from $1.25 \times 10^1$ rad/m$^3$ to $1.4 \times 10^3$ rad/m$^3$.

The tilt stiffness of the gearbox support may be greater than or equal to $1.2 \times 10^5$ Nm/rad. The tilt stiffness of the gearbox support may be greater than or equal to $2.4 \times 10^5$ Nm/rad. The tilt stiffness of the gearbox support may be greater than or equal to $3.9 \times 10^5$ Nm/rad. The tilt stiffness of the gearbox support may be in the range from $1.2 \times 10^5$ Nm/rad to $2.1 \times 10^7$ Nm/rad. The tilt stiffness of the gearbox support may be in the range from $2.4 \times 10^5$ Nm/rad to $1.6 \times 10^7$ Nm/rad. The tilt stiffness of the gearbox support may be in the range from $3.9 \times 10^5$ Nm/rad to $9.0 \times 10^6$ Nm/rad.

The torsional shear stress of the gearbox support, at maximum take-off conditions, may be less than or equal to $4.90 \times 10^8$ N/m². The torsional shear stress of the gearbox support, at maximum take-off conditions, may be less than or equal to $3.5 \times 10^8$ N/m². The torsional shear stress of the gearbox support, at maximum take-off conditions, may be in the range from $1.40 \times 10^8$ N/m² to $4.90 \times 10^8$ N/m². The torsional shear stress of the gearbox support, at maximum take-off conditions, may be in the range from $2.0 \times 10^8$ N/m² to $3.5 \times 10^8$ N/m².

The diameter of the fan may be in the range from 240 cm to 280 cm. In such an embodiment, the second gearbox support shear stress ratio may be less than or equal to $2.9 \times 10^3$ rad/m³, or in the range from $2.9 \times 10^1$ rad/m³ to $2.9 \times 10^3$ rad/m³.

Alternatively, the diameter of the fan may be in the range from 330 cm to 380 cm. In such an embodiment, the second gearbox support shear stress ratio may be less than or equal to $7.0 \times 10^2$ rad/m³ or in the range from $1.0 \times 10^1$ rad/m³ to $7.0 \times 10^2$ rad/m³.

A first gearbox support shear stress ratio of:

$$\frac{\text{the torsional shear stress of the gearbox support at maximum take off conditions}}{\text{radial bending stiffness of the gearbox support}}$$

may be less than or equal to $4.9 \times 10^1$ m⁻¹. The first gearbox support shear stress ratio may be less than or equal to 20 m⁻¹. The first gearbox support shear stress ratio may be in the range from $3.5 \times 10^{-1}$ m⁻¹ to $4.9 \times 10^1$ m⁻¹. The first gearbox support shear stress ratio may be in the range from 0.70 m⁻¹ to 20 m⁻¹.

One or more of the following features may apply to either or both of the seventeenth and eighteenth aspects above:

The torsional strength of the gearbox support may be greater than or equal to $1.60 \times 10^5$ Nm. The torsional strength of the gearbox support may be greater than or equal to $1.8 \times 10^5$ Nm. The torsional strength of the gearbox support may be in the range from $1.60 \times 10^5$ Nm to $2.00 \times 10^7$ Nm. The torsional strength of the gearbox support may be in the range from $1.8 \times 10^5$ Nm to $1.5 \times 10^6$ Nm.

The cross sectional area of the gearbox may be greater than or equal to $2.4 \times 10^{-1}$ m². The cross sectional area of the gearbox may be greater than or equal to $2.6 \times 10^{-1}$ m². The cross sectional area of the gearbox may be in the range from $2.4 \times 10^{-1}$ m² to 1.10 m². The cross sectional area of the gearbox may be in the range from $2.6 \times 10^{-1}$ m² to $9.0 \times 10^{-1}$ m².

A planet gear spacing angle in radians may be defined as $2\pi/N$, where N is the number of planet gears. The planet gear spacing angle may be greater than or equal to $9.0 \times 10^{-1}$ rad. The planet gear spacing angle may be in the range between $9.0 \times 10^{-1}$ rad to 2.1 rad.

A first gearbox support strength ratio of:

$$\frac{\text{the torsional strength of the gearbox support}}{\text{the radial bending stiffness of the gearbox support} \times \text{the cross sectional area of the gearbox}}$$

may be greater than or equal to $7.0 \times 10^{-3}$. The first gearbox support strength ratio may be greater than or equal to $1.0 \times 10^{-2}$. The first gearbox support strength ratio may be greater than or equal to $2.0 \times 10^{-2}$. The first gearbox support strength ratio may be in the range from $7.0 \times 10^{-3}$ to $2.5 \times 10^{-1}$. The first gearbox support strength ratio may be in the range from $1.0 \times 10^{-2}$ to $1.0 \times 10^{-1}$. The first gearbox support strength ratio may be in the range from $7.0 \times 10^{-3}$ to $2.0 \times 10^{-2}$. The first gearbox support strength ratio may be in the range from $2.0 \times 10^{-2}$ to $2.5 \times 10^{-1}$.

A second gearbox support strength ratio of:

$$\frac{\text{the torsional strength of the gearbox support}}{\text{the tilt stiffness of the gearbox support} \times \text{the planet gear spacing angle}}$$

may be greater than or equal to $1.0 \times 10^{-1}$. The second gearbox support strength ratio may be greater than or equal to $1.5 \times 10^{-1}$. The second gearbox support strength ratio may be greater than or equal to $2.5 \times 10^{-1}$. The second gearbox support strength ratio may be in the range from $1.0 \times 10^{-1}$ to 3.5. The second gearbox support strength ratio may be in the range from $1.5 \times 10^{-1}$ to 1.7. The second gearbox support strength ratio may be in the range from $1.0 \times 10^{-1}$ to $2.5 \times 10^{-1}$. The second gearbox support strength ratio may be in the range from $2.5 \times 10^{-1}$ to 3.5.

The torque transmitted through the gearbox support, at maximum take-off conditions, may be greater than or equal to $6.00 \times 10^4$ Nm, greater than or equal to $7.2 \times 10^4$ Nm, in the range from $6.00 \times 10^4$ Nm to $5.00 \times 10^5$ Nm, or in the range from $7.2 \times 10^4$ Nm to $4.2 \times 10^5$ Nm.

The gearbox may be in a planetary configuration. In such an embodiment, the torque transmitted through the gearbox support, at maximum take-off conditions, may be greater than or equal to $6.00 \times 10^4$ Nm, greater than or equal to $7.2 \times 10^4$ Nm, in the range from $6.00 \times 10^4$ Nm to $3.00 \times 10^5$ Nm, or in the range from $7.2 \times 10^4$ Nm to $2.6 \times 10^5$ Nm.

Alternatively, the gearbox may be in a star configuration. In such an embodiment the torque transmitted through the gearbox support, at maximum take-off conditions, may be greater than or equal to $1.10 \times 10^5$ Nm, greater than or equal to $1.3 \times 10^5$ Nm, in the range from $1.10 \times 10^5$ Nm to $5.00 \times 10^5$ Nm, or in the range from $1.3 \times 10^5$ Nm to $4.2 \times 10^5$ Nm.

The maximum take-off conditions may be as defined anywhere herein, for example may be defined as operating at maximum take-off thrust for the engine at ISA sea level pressure and temperature +15° C. with a fan inlet velocity of between 0.25 and 0.27 Mn, and optionally at 0.25 Mn.

According to a nineteenth aspect there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the propulsor, wherein: a first gearbox support shear stress ratio of:

$$\frac{\text{the torsional shear stress of the gearbox support at maximum take off conditions}}{\text{the radial bending stiffness of the gearbox support}}$$

is less than or equal to $4.9 \times 10^1$ m⁻¹.

The propulsor of the nineteenth aspect may have some or all of the features described above with respect to the gas turbine engine of the seventeenth aspect, and may be a gas turbine engine in some embodiments.

According to a twentieth aspect there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the propulsor, wherein: a second gearbox support shear stress ratio of:

$$\frac{\text{the torsional shear stress of the gearbox support at maximum take off conditions}}{\text{the tilt stiffness of the gearbox support}}$$

is less than or equal to $4.1 \times 10^3$ rad/m³.

The propulsor of the twentieth aspect may have some or all of the features described above with respect to the gas turbine engine of the eighteenth aspect, and may be a gas turbine engine in some embodiments.

The nineteenth and twentieth aspects may be combined. According to a twenty-first aspect there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft so as to drive the fan at a lower rotational speed than the core shaft, the gearbox being an epicyclic gearbox comprising a sun gear, a plurality of planet gears, a ring gear, and a planet carrier arranged to have a plurality of planet gears mounted thereon; and a gearbox support arranged to at least partially support the gearbox within the propulsor, wherein:

a) a first gearbox support shear stress ratio of:

$$\frac{\text{the torsional shear stress of the gearbox support at maximum take off conditions}}{\text{the radial bending stiffness of the gearbox support}}$$

is less than or equal to $4.9 \times 10^1$; and/or
b) a second gearbox support shear stress ratio of:

$$\frac{\text{the torsional shear stress of the gearbox support at maximum take off conditions}}{\text{the tilt stiffness of the gearbox support}}$$

is less than or equal to $4.1 \times 10^3$ rad/m³.

The propulsor of the twenty-first aspect may have some or all of the features described above with respect to the gas turbine engine of the seventeenth aspect and eighteenth aspects, and may be a gas turbine engine in some embodiments.

According to a twenty-second aspect there is provided a method of operating a gas turbine engine, the gas turbine engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, and wherein the method comprises: operating the gas turbine engine such that, at maximum take-off conditions, a first gearbox support shear stress ratio of:

$$\frac{\text{the torsional shear stress of the gearbox support}}{\text{radial bending stiffness of the gearbox support}}$$

is less than or equal to $4.9 \times 10^1$ m$^{-1}$.

The method of the twenty-second aspect may be a method of operating the gas turbine engine or the propulsor of the seventeenth aspect or the nineteenth aspect respectively. Any of the features, ratios and parameters introduced above in connection with the seventeenth aspect or nineteenth aspect may also therefore apply to the twenty-second aspect.

According to a twenty-third aspect there is provided a method of operating a gas turbine engine, the gas turbine engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, and wherein the method comprises: operating the gas turbine engine such that, at maximum take-off conditions, a second gearbox support shear stress ratio of:

$$\frac{\text{the torsional shear stress of the gearbox support}}{\text{the tilt stiffness of the gearbox support}}$$

is less than or equal to $4.1 \times 10^3$ rad/m³.

The method of the twenty-third aspect may be a method of operating the gas turbine engine or the propulsor of the eighteenth aspect or the twentieth aspect respectively. Any of the features, ratios and parameters introduced above in connection with the eighteenth aspect or twentieth aspect may also therefore apply to the twenty-second aspect.

In another aspect, the twenty-second and twenty-third aspects may be combined. In such an aspect, there is provided a method of operating a gas turbine engine, the gas turbine engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, and wherein the method comprises: operating the gas turbine engine such that, at maximum take-off conditions:

a) a first gearbox support shear stress ratio of:

$$\frac{\text{the torsional shear stress of the gearbox support}}{\text{radial bending stiffness of the gearbox support}}$$

is less than or equal to $4.9 \times 10^1$ m$^{-1}$; and/or b) a second gearbox support shear stress ratio of:

$$\frac{\text{the torsional shear stress of the gearbox support}}{\text{the tilt stiffness of the gearbox support}}$$

is less than or equal to $4.1 \times 10^3$ rad/m$^3$.

The method of the previous aspect may be a method of operating the gas turbine engine or the propulsor of the seventeenth, eighteenth or twenty-first aspect. Any of the features, ratios and parameters introduced above in connection with the seventeenth, eighteenth or twenty-first aspect may also therefore apply to this aspect.

The inventor has discovered that by designing the gearbox support so that the ratio of its torsional shear stress at max take-off to its stiffness (radial bending or tilt stiffness) is within the specified range sufficient margin of strength of the support is provided at the highest load point in the engine operating cycle while the stiffness is suitable to ensure a suitable load share factor.

According to a twenty-fourth aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, and wherein:

a flight cycle ratio of:

$$\frac{\text{the torsional shear stress of the gearbox support at maximum take off (\textit{MTO}) conditions}}{\text{the torsional shear stress of the gearbox support at cruise conditions}}$$

is less than or equal to 3.20.

The flight cycle ratio may be less than or equal to 2.95. The flight cycle ratio may be less than or equal to 2.9. The flight cycle ratio may be less than or equal to 2.90. The flight cycle ratio may be less than or equal to 2.85. The flight cycle ratio may be less than or equal to 2.75. The flight cycle ratio may be in the range from 2.10 to 3.20. The flight cycle ratio may be in the range from 2.3 to 2.9.

The torsional shear stress of the gearbox support at maximum take-off conditions may be less than or equal to $4.90 \times 10^8$ N/m$^2$. The torsional shear stress of the gearbox support at maximum take-off conditions may be less than or equal to $2.0 \times 10^8$ N/m$^2$. The torsional shear stress of the gearbox support at maximum take-off conditions may be in the range from $1.40 \times 10^8$ N/m$^2$ to $4.9 \times 10^8$ N/m$^2$. The torsional shear stress of the gearbox support at maximum take-off conditions may be in the range from $2.0 \times 10^8$ N/m$^2$ to $3.5 \times 10^8$ N/m$^2$.

The torsional shear stress of the gearbox support at cruise conditions may be greater than or equal to $7.00 \times 10^7$ N/m$^2$. The torsional shear stress of the gearbox support at cruise conditions may be greater than or equal to $8.2 \times 10^7$ N/m$^2$. The torsional shear stress of the gearbox support at cruise conditions may be in the range from $7.00 \times 10^7$ N/m$^2$ to $1.90 \times 10^8$ N/m$^2$. The torsional shear stress of the gearbox support at cruise conditions may be in the range from $8.2 \times 10^7$ N/m$^2$ to $1.5 \times 10^8$ N/m$^2$.

The diameter of the fan may be in the range from 240 cm to 280 cm. In such an embodiment, the flight cycle ratio may be less than or equal to 3.2 or in the range from 2.3 to 3.2.

Alternatively, the diameter of the fan may be in the range from 330 cm to 380 cm. In such an embodiment the flight cycle ratio may be less than or equal to 2.8 or in the range from 2.1 to 2.8.

A product of:

$$\text{the torsional shear stress of the gearbox support at maximum take off conditions} \times \text{the torsional shear stress of the gearbox support at cruise conditions}$$

may be greater than or equal to $1.00 \times 10^{16}$ (N/m$^2$)$^2$, greater than or equal to $2.05 \times 10^{16}$ (N/m$^2$)$^2$, in the range from $1.00 \times 10^{16}$ (N/m$^2$)$^2$ to $7.50 \times 10^{16}$ (N/m$^2$)$^2$, or in the range from $2.05 \times 10^{16}$ (N/m$^2$)$^2$ to $4.9 \times 10^{16}$ (N/m$^2$)$^2$. In such embodiments, the gearbox may, for example, be in a star configuration.

A first torque transmission ratio of:

$$\frac{\text{the torque transmitted through the gearbox at maximum take off conditions}}{\text{the torque transmitted through the gearbox at cruise conditions}}$$

may be less than or equal to 3.2. The first torque transmission ratio may be less than or equal to 2.95. The first torque transmission ratio may be less than or equal to 2.9. The first torque transmission ratio may be less than or equal to 2.90. The first torque transmission ratio may be less than or equal to 2.85. The first torque transmission ratio may be less than or equal to 2.75. The first torque transmission ratio may be in the range from 2.1 to 3.2. The first torque transmission ratio may be in the range from 2.3 to 2.9.

A second torque transmission ratio of:

$$\frac{\text{the torque transmitted through the gearbox at maximum take off conditions}}{\text{the torque transmitted through the gearbox support at cruise conditions}}$$

may be less than or equal to 3.2. The second torque transmission ratio may be less than or equal to 2.95. The second torque transmission ratio may be less than or equal to 2.9. The second torque transmission ratio may be less than or equal to 2.90. The second torque transmission ratio may be less than or equal to 2.85. The second torque transmission ratio may be less than or equal to 2.75. The second torque transmission ratio may be in the range from 2.1 to 3.2. The second torque transmission ratio may be in the range from 2.3 to 2.9.

The torsional strength of the gearbox support may be greater than or equal to $1.60 \times 10^5$ Nm. The torsional strength of the gearbox support may be greater than or equal to 1.8×10⁵ Nm. The torsional strength of the gearbox support may be in the range from 1.60×10⁵ Nm to 2.00×10⁷ Nm. The torsional strength of the gearbox support may be in the range from 1.8×10⁵ Nm to 1.5×10⁶ Nm.

The gearbox may have a cross sectional area, and a first gearbox support strength ratio of:

$$\frac{\text{the torsional strength of the gearbox support}}{\text{the radial bending stiffnesss of the gearbox} \times \text{the cross sectional area of the gearbox}}$$

may be greater than or equal to 7.0×10⁻³. The first gearbox support strength ratio may be greater than or equal to 1.0×10⁻². The first gearbox support strength ratio may be greater than or equal to 2.0×10⁻². The first gearbox support strength ratio may be in the range from 7.0×10⁻³ to 2.5× 10⁻¹. The first gearbox support strength ratio may be in the range from 1.0×10⁻² to 1.0×10⁻¹. The first gearbox support strength ratio may be in the range from 7.0×10³ to 2.0×10². The first gearbox support strength ratio may be in the range from 2.0×10⁻² to 2.5×10⁻¹.

A planet gear spacing angle in radians may be defined as 2π/N, where N is the number of planet gears. A second gearbox support strength ratio of:

$$\frac{\text{the torsional strength of the gearbox support}}{\text{the tilt stiffness of the gearbox} \times \text{the planet gear spacing angle}}$$

may be greater than or equal to 1.0×10⁻¹. The second gearbox support strength ratio may be greater than or equal to 1.5×10⁻¹. The second gearbox support strength ratio may be greater than or equal to 2.5×10⁻¹. The second gearbox support strength ratio may be in the range from 1.0×10⁻¹ to 3.5. The second gearbox support strength ratio may be in the range from 1.5×10⁻¹ to 1.7. The second gearbox support strength ratio may be in the range from 1.0×10⁻¹ to 2.5× 10⁻¹. The second gearbox support strength ratio may be in the range from 2.5×10⁻¹ to 3.5.

The cross sectional area of the gearbox may be greater than or equal to 2.4×10⁻¹ m². The cross sectional area of the gearbox may be greater than or equal to 2.6×10⁻¹ m². The cross sectional area of the gearbox may be in the range from 2.4×10⁻¹ m² to 1.10 m². The cross sectional area of the gearbox may be in the range from 2.6×10⁻¹ m² to 9.0×10⁻¹ m².

The planet gear spacing angle may be greater than or equal to 9.0×10⁻¹ rad. The planet gear spacing angle may be in the range between 9.0×10⁻¹ rad to 2.1 rad.

The radial bending stiffness of the gearbox support may be greater than or equal to 1.0×10⁷ N/m. The radial bending stiffness of the gearbox support may be greater than or equal to 2.0×10⁷ N/m. The radial bending stiffness of the gearbox support may be greater than or equal to 3.0×10⁷ N/m. The radial bending stiffness of the gearbox support may be in the range from 1.0×10⁷ N/m to 4.0×10⁸ N/m. The radial bending stiffness of the gearbox support may be in the range from 2.0×10⁷ N/m to 3×10⁸ N/m. The radial bending stiffness of the gearbox support may be in the range from 3.0×10⁷ N/m to 2.0×10⁸ N/m.

The tilt stiffness of the gearbox support may be greater than or equal to 1.2×10⁵ Nm/rad. The tilt stiffness of the gearbox support may be greater than or equal to 2.4×10⁵ Nm/rad. The tilt stiffness of the gearbox support may be greater than or equal to 3.9×10⁵ Nm/rad. The tilt stiffness of the gearbox support may be in the range from 1.2×10⁵ Nm/rad to 2.1×10⁷ Nm/rad. The tilt stiffness of the gearbox support may be in the range from 2.4×10⁵ Nm/rad to 1.6×10⁷ Nm/rad. The tilt stiffness of the gearbox support may be in the range from 3.9×10⁵ Nm/rad to 9.0×10⁶ Nm/rad.

The gearbox may be in a star configuration.

The maximum take-off conditions may be as defined anywhere herein, for example as operating at maximum take-off thrust for the engine at ISA sea level pressure and temperature +15° C. with a fan inlet velocity of between 0.25 and 0.27 Mn, and optionally at 0.25 Mn.

The cruise conditions may be as defined anywhere herein. The cruise conditions may mean the conditions at mid-cruise of an aircraft to which the engine is attached. The cruise conditions may be conditions experienced by the aircraft and engine at the midpoint between top of climb and start of decent.

The forward speed of the gas turbine engine at the cruise conditions may be in the range of from Mn 0.75 to Mn 0.85. The forward speed of the gas turbine engine at the cruise conditions may be Mn 0.8.

The cruise conditions may correspond to atmospheric conditions defined by the International Standard Atmosphere at an altitude of 11582 m and a forward Mach Number of 0.8.

The cruise conditions may correspond to atmospheric conditions defined by the International Standard Atmosphere at an altitude of 10668 m and a forward Mach Number of 0.85.

The cruise conditions may correspond to atmospheric conditions at an altitude that is in the range of from 10500 m to 11600 m, and optionally at an altitude of 11000 m.

According to a twenty-fifth aspect there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the propulsor, wherein:

a flight cycle ratio of:

$$\frac{\text{the torsional shear stress of the gearbox support at maximum take off conditions}}{\text{the torsional shear stress of the gearbox support at the cruise conditions}}$$

is less than or equal to 3.20.

The propulsor of the twenty-fifth aspect may have some or all of the features described above with respect to the gas turbine engine of the twenty-fourth aspect, and may be a gas turbine engine in some embodiments.

According to another aspect, there is provided an aircraft comprising the gas turbine engine or the propulsor of the twenty-fourth aspect or the twenty-fifth aspect mounted thereon, wherein the aircraft has a maximum take-off operating condition and a cruise condition.

According to a twenty-sixth aspect there is provided a method of operating a gas turbine engine, the gas turbine engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, and wherein the method comprises:

operating the gas turbine engine such that a flight cycle ratio of:

$$\frac{\text{the torsional shear stress of the gearbox support at maxmium takeoff conditions}}{\text{the torsional shear stress of the gearbox support at cruise conditions}}$$

is less than or equal to 3.20.

The method of the twenty-sixth aspect may be a method of operating the gas turbine engine or the propulsor of the twenty-fourth aspect or twenty-fifth aspect respectively. Any of the features, ratios and parameters introduced above in connection with the twenty-fourth aspect or twenty-fifth aspect may also therefore apply to the twenty-sixth aspect. The method of the twenty-fifth aspect may comprise operating the gas turbine engine to provide propulsion for the aircraft to which it is mounted under maximum take-off conditions. The method may further comprise operating the gas turbine engine to provide propulsion during cruise conditions. Cruise conditions and max-take off conditions are as defined elsewhere herein.

Through consideration of a range of gearbox failure modes—including tooth root bending, tooth surface scuffing, tooth surface macro and micro pitting and gearbox vibration—and the extent to which those failure modes have an impact at maximum take-off (MTO) and cruise, the inventor has discovered that providing torsional shear stresses of the gearbox support structure within the specified range provides a low weight gearbox capable of successfully transmitting the largest loads at MTO for limited durations while providing sufficient integrity against other failure mechanisms at cruise for extended durations.

In other aspects, value ranges for the product of the components of the flight cycle ratio may be specified instead of, or as well as, value ranges for the ratio.

According to one such aspect, the twenty-fourth aspect introduced above may be formulated as an aspect providing a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, and wherein: a product (e.g. a flight cycle product) of:

the torsional shear stress of the gearbox support at maximum take off conditions×the torsional shear stress of the gearbox support at cruise conditions is greater than or equal to $1.00 \times 10^{16}$ $(N/m^2)^2$, greater than or equal to $2.05 \times 10^{16}$ $(N/m^2)^2$, in the range from $1.00 \times 10^{16}$ $(N/m^2)^2$ to $7.50 \times 10^{16}$ $(N/m^2)^2$, or in the range from $2.05 \times 10^{16}$ $(N/m^2)^2$ to $4.9 \times 10^{16}$ $(N/m^2)^2$. In any of these embodiments, the gearbox may be in a star configuration.

The skilled person will appreciate that method and propulsor aspects may be formulated accordingly.

In any of the preceding aspects, any one or more of the following may apply as applicable:

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The gearbox may have a gear ratio in any range disclosed herein, for example a gear ratio in the range from 3.2 to 4.5, and optionally from 3.2 to 4.0.

The gas turbine engine may have a specific thrust in any range disclosed herein, for example a specific thrust in the range from 70 to 90 $NKg^{-1}$.

The gas turbine engine may have a bypass ratio at cruise conditions in any range disclosed herein, for example in the range from 12.5 to 18, and optionally from 13 to 16.

The fan may have a fan diameter greater than 240 cm and less than or equal to 380 cm. The fan may have a fan diameter greater than 300 cm and less than or equal to 380 cm.

The diameter of the fan may be in the range from 240 cm to 280 cm. The diameter of the fan may be in the range from 330 cm to 380 cm.

The cross sectional area (CSA) of the gearbox may be defined as the area of the pitch circle of the ring gear.

The method of any of the aspects defined above may further comprise driving the gearbox with an input torque of:
  i) greater than or equal to 10,000 Nm, and optionally of 10,000 to 50,000 Nm at cruise; and/or
  ii) greater than or equal to 28,000 Nm, and optionally of 28,000 to 135,000 Nm at max-take off conditions.

For any parameter or ratio of parameters X claimed or disclosed herein, a limit on the values that X can take that is expressed as "X is greater than or equal to Y" can alternatively be expressed as "1/X is less than or equal to 1/Y". Any of the ratios or parameters defined in the aspects and statements above may therefore be expressed as "1/X is less than or equal to 1/Y" rather than "X is greater than or equal to Y". In such cases, zero can be taken as a lower bound.

Various parameters of the gearbox and its mounting structure, and/or of the engine more generally, may be adjusted to allow the engine to meet the specifications of the various aspects summarised above. Comments on various such parameters are provided below.

Regarding the stiffness (radial bending and/or tilt) of the gearbox support the inventor has found that a relatively low stiffness may be provided to isolate the gearbox from damaging loads being transmitted into it. The inventor has found that if the stiffness of the gearbox support is decreased outside of the ranges specified herein there are resulting problems with dynamic effects such as lateral vibrations—in particular, a stiffness less that is within ranges defined herein has been found to allow vibrations at low modal frequencies to be reduced or avoided (the skilled person would appreciate that the lower modal vibrations have larger amplitudes/deflections than the higher modes, and so are more important to avoid). This may be a function of the size of the gearbox and its configuration. The inventor has also found that the maximum stiffnesses provided by the ranges defined herein allows the reduction or avoidance of damaging loads being transmitted to the gearbox from the fan. This may similarly vary according to size and gearbox configuration.

The inventor has found that decreasing the radial bending and/or tilt stiffness of the fan shaft (at the input to the fan or the output of the gearbox) outside of the ranges defined herein would lead to undesirable dynamic effects such as lateral vibration. In particular, the minimum stiffness defined by the ranged specified herein allows vibrations at low modal frequencies to be reduced or avoided (the skilled person would appreciate that the lower modal vibrations have larger amplitudes/deflections than the higher modes, and so are more important to avoid). This may be a function of the size of the gearbox and its configuration.

The inventor has also found that an upper limit of the fan shaft radial bending and/or tilt stiffness is affected by the fundamental properties of the material or materials from which it is made. For example, a maximum stiffness is affected by the engineering limit of the material from which it is made. The materials from which the fan shaft is made (often steels) may, for example, have a Young's modulus in the range from 100 to 250 GPa, or 105 to 215 GPa, and optionally around 210 GPa—different grades of steel, or other types of metal, may be selected to achieve different stiffnesses for the same size and geometry. For example, steels with a Young's modulus in the range 190 to 215 GPa, titanium alloys with a Young's modulus in the range 105 to 120 GPa, or a metal such as titanium with a Young's modulus of around 110 GPa may be used in various embodiments. The inventor has found increasing the stiffness outside of the ranges defined herein using materials such as these would lead to excessive weight with no practical gain in performance.

The inventor has discovered that the range of the torsional strength of the gearbox support defined herein provides a desired level of torque capacity to provide sufficient reliability, while not being so great as to add excessive weight to the engine with no practical performance gain.

Regarding the other properties of the gearbox support such as its torsional shear stress, the inventor has found that the ranges specified herein provide the improvements in performance described above, but without leading to excessive increases in overall engine weight.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

The gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The output from the gearbox may be directly to a fan shaft, or indirectly to the fan shaft, for example via a spur shaft and/or gear.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

In some arrangements, a fan pressure ratio, defined as the ratio of the mean total pressure of the flow at the fan exit to the mean total pressure of the flow at the fan inlet, may be no greater than 1.5 at cruise conditions, for example no greater than 1.45, 1.4 or 1.35. The fan pressure ratio may be in the range of from 1.40 to 1.43, for example on the order of 1.40.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, a maximum take-off (MTO) condition has the conventional meaning. Maximum take-off conditions may be defined as operating the engine at International Standard Atmosphere (ISA) sea level pressure and temperature conditions +15° C. at maximum take-off thrust at end of runway, which is typically defined at an aircraft speed of around 0.25Mn, or between around 0.24 and 0.27 Mn. Maximum take-off conditions for the engine may therefore be defined as operating the engine at a maximum take-off thrust (for example maximum throttle) for the engine at ISA sea level pressure and temperature +15° C. with a fan inlet velocity of 0.25 Mn.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

Whilst in the arrangements described herein the source of drive for the propulsive fan is provided by a gas turbine engine, the skilled person will appreciate the applicability of the gearbox configurations disclosed herein to other forms of aircraft propulsor comprising alternative drive types. For example, the above-mentioned gearbox arrangements may be utilised in aircraft propulsors comprising a propulsive fan driven by an electric motor. In such circumstances, the electric motor may be configured to operate at higher rotational speeds and thus may have a lower rotor diameter and may be more power-dense. The gearbox configurations of the aforesaid aspects may be employed to reduce the rotational input speed for the fan or propeller to allow it to operate in a more favourable efficiency regime. Thus, according to an aspect, there is provided an electric propulsion unit for an aircraft, comprising an electric machine configured to drive a propulsive fan via a gearbox, the gearbox and/or its inputs/outputs/supports/and/or the structure by which the fan shaft driving the fan is supported being as described and/or claimed herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

As used herein, a range "from value X to value Y" or "between value X and value Y", or the like, denotes an inclusive range; including the bounding values of X and Y. As used herein, the term "axial plane" denotes a plane extending along the length of an engine, parallel to and containing an axial centreline of the engine, and the term "radial plane" denotes a plane extending perpendicular to the axial centreline of the engine, so including all radial lines at the axial position of the radial plane. Axial planes may also be referred to as longitudinal planes, as they extend along the length of the engine. A radial distance or an axial distance is therefore a distance in a radial or axial plane, respectively.

BRIEF DESCRIPTION OF THE DRAWINGS

Embodiments will now be described by way of example only, with reference to the Figures, in which:

FIGS. 10 and 11 are schematic diagrams illustrating how the tilt stiffness of a gearbox support may be defined;

FIG. 12 shows a schematic sectional view of a gearbox support used with a gearbox in a star configuration;

FIG. 13 shows a schematic sectional view of a gearbox support used with a gearbox in a planetary configuration;

FIG. 14 is a schematic diagram illustrating an alternative interface between a fan shaft and fan;

FIGS. 15 and 16 are schematic diagrams illustrating how fan shaft end radial bending stiffnesses may be defined;

DETAILED DESCRIPTION

Figure 1:
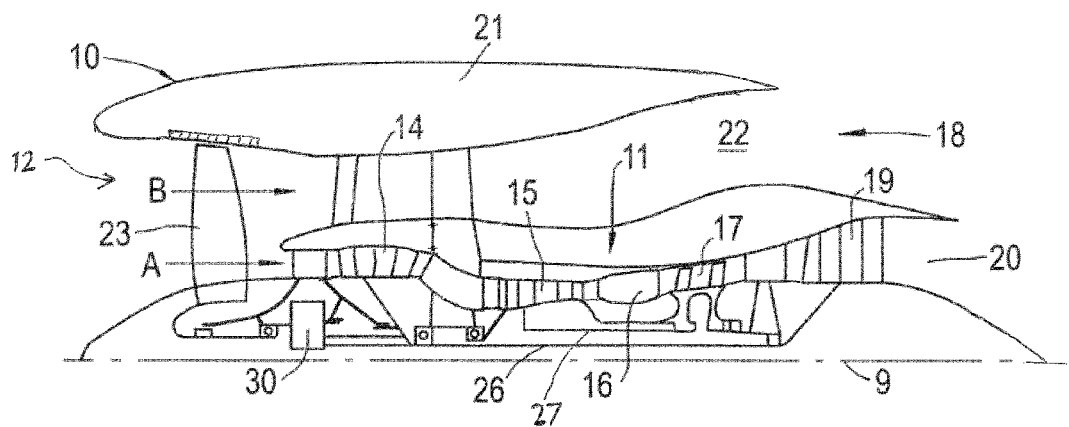
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
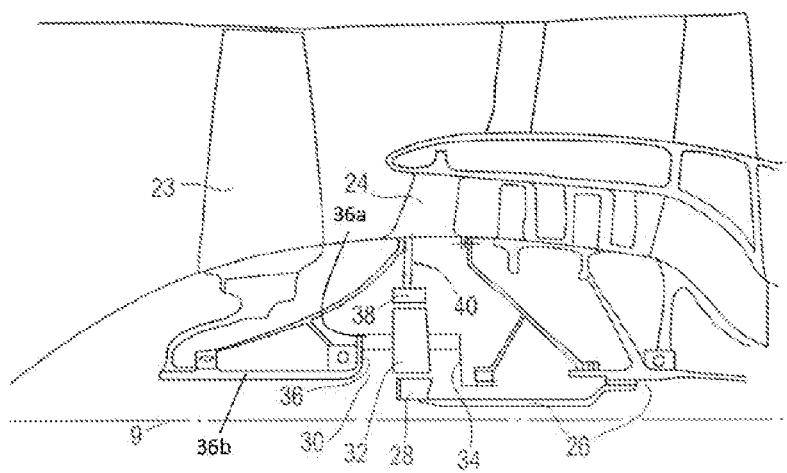
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

The linkages 36 may be referred to as a fan shaft 36, the fan shaft 36 optionally comprising two or more shaft portions coupled together. For example, the fan shaft 36 may comprise a gearbox output shaft portion 36a extending from the gearbox 30 and a fan portion 36b extending between the gearbox output shaft portion and the fan 23. In the embodiment shown in FIGS. 1 and 2, the gearbox 30 is a planetary gearbox and the gearbox output shaft portion 36a is connected to the planet carrier 34—it may therefore be referred to as a carrier output shaft 36a. In star gearboxes 30, the gearbox output shaft portion 36a may be connected to the ring gear 38—it may therefore be referred to as a ring output shaft 36a. In the embodiment shown in FIGS. 1 and 2, the fan portion 36b of the fan shaft 36 connects the gearbox output shaft portion 36a to the fan 23. The output of the gearbox 30 is therefore transferred to the fan 23, to rotate the fan, via the fan shaft 36. In alternative embodiments, the fan shaft 36 may comprise a single component, or more than two components. Unless otherwise indicated or apparent to the skilled person, anything described with respect to an engine 10 with a star gearbox 30 may equally be applied to an engine with a planetary gearbox 30, and vice versa.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
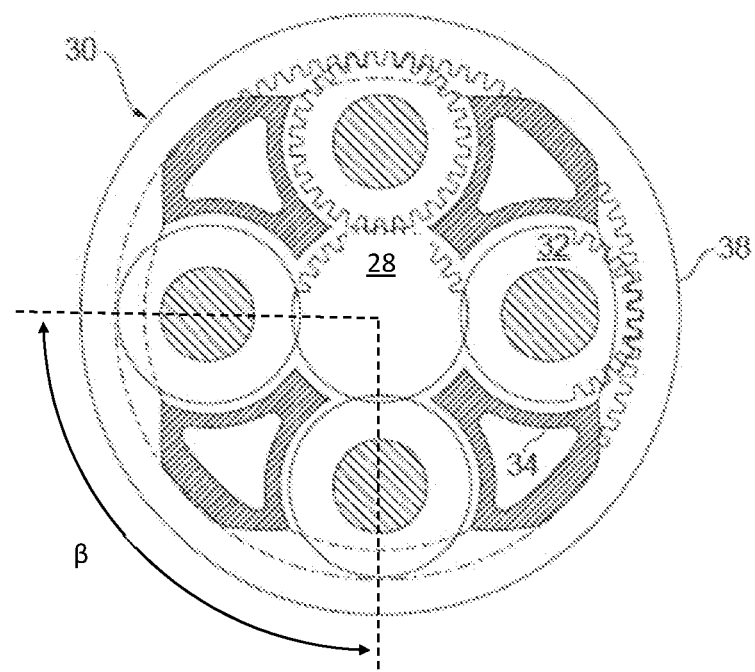
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears.

However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility as defined or claimed elsewhere herein. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2 (for example as described in connection with other embodiments disclosed herein which have a star gearbox arrangement).

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The following general definitions of stiffnesses may be used herein:

Radial Bending Stiffness

Figure 4:
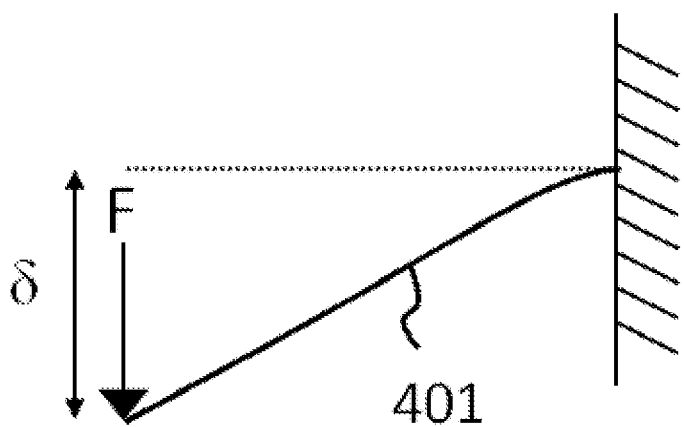
FIG. 4 is a schematic diagram illustrating the radial bending stiffness of a cantilevered beam.

A radial bending stiffness is a measure of deformation for a given force applied in any one selected radial direction (i.e. any direction perpendicular to and passing through the engine axis). The radial bending stiffness is defined with reference to FIG. 4 in terms of the deformation of a cantilevered beam 401. As illustrated in FIG. 4, a force, F, applied at the free end of the beam in a direction perpendicular to the longitudinal axis of the beam causes a linear perpendicular deformation, δ. The radial bending stiffness is the force applied for a given linear deformation i.e. F/δ. In the present application, the radial bending stiffness is taken relative to the rotational axis of the engine 9, and so relates to the resistance to linear deformation in a radial direction of the engine caused by a radial force. The beam, or equivalent cantilevered component, extends along the axis of rotation of the engine, the force, F, is applied perpendicular to the axis of rotation of the engine, along any radial direction, and the displacement δ is measured perpendicular to the axis of rotation, along the line of action of the force. The radial bending stiffness as defined herein has SI units of N/m. In the present application, unless otherwise stated, the radial bending stiffness is taken to be a free-body stiffness i.e. stiffness measured for a component in isolation in a cantilever configuration, without other components present which may affect its stiffness.

When the force is applied perpendicular to the cantilevered beam, and at the free end of the beam, the resultant curvature is not constant but rather increases towards the fixed end of the beam.

Tilt Stiffness

Figure 5:
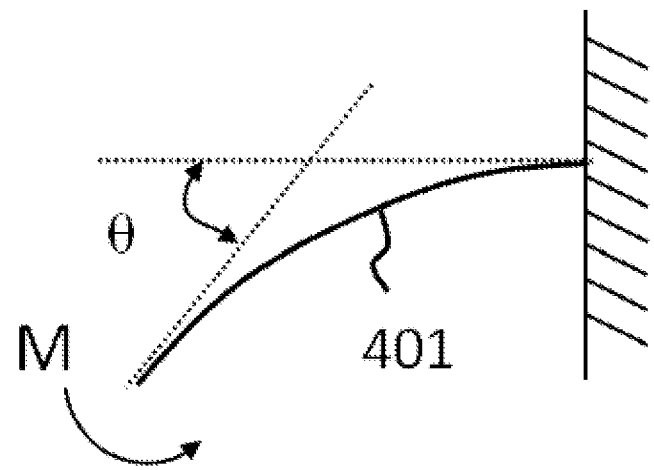
FIG. 5 is a schematic diagram illustrating the tilt stiffness of a cantilevered beam.

A tilt stiffness is defined with reference to FIG. 5, which shows the resulting deformation of a cantilevered beam 401 under a moment M applied at its free end. The tilt stiffness is a measure of the resistance to rotation of a point on the component at which a moment is applied. As can be seen in FIG. 5, an applied moment at the free end of the cantilevered beam induces a constant curvature along the length of the beam between its free and fixed ends. The applied moment M causes a rotation θ of the point at which it is applied. For any component of constant section (like the beam), the angle θ is constant along the length of the component. The tilt stiffness as defined herein therefore has SI units of Nm/rad.

Torsional Stiffness

Figure 6:
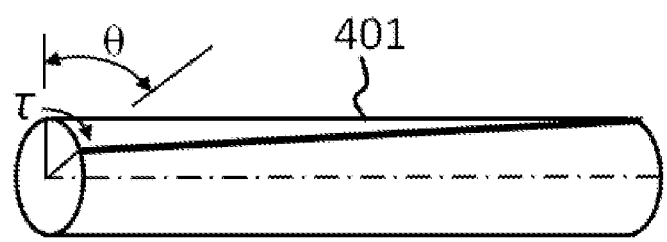
FIG. 6 is a schematic diagram illustrating the torsional stiffness of a shaft.

Torsional stiffness is a measure of deformation for a given torque. FIG. 6 illustrates the definition of the torsional stiffness of a shaft 401 or other body. A torque, τ, applied to the free end of the beam causes a rotational deformation, θ (e.g. twist) along the length of the beam. The torsional stiffness is the torque applied for a given angle of twist i.e. τ/θ. The torsional stiffness has SI units of Nm/rad.

The following general definitions of other parameters may also be used herein:

Torque

Torque, which may also be referred to as moment, is the rotational equivalent of linear force, and can be thought of as a twist to an object. The magnitude, τ, of torque, τ, of a body depends on three quantities: the force applied (F), the lever arm vector connecting the origin to the point of force application (r), and the angle (A) between the force and lever arm vectors:

$$\tau = r \times F$$

$$\tau = |\tau| = |r \times F| = |r||F|\sin A$$

where

τ is the torque vector and τ is the magnitude of the torque;
r is the position vector or "lever arm" vector (a vector from the selected point on the body to the point where the force is applied);
F is the force vector;
× denotes the cross product; and
A is the angle between the force vector and the lever arm vector (sin(A) is therefore one when the force vector is perpendicular to the position vector, such that τ=rF, i.e. magnitude of the force multiplied by distance between the selected point on the body and the point of application of the force).

Torque has dimensions of [force]×[distance] and may be expressed in units of Newton metres (N·m).

The net torque on a body determines the rate of change of the body's angular momentum.

Moment of Inertia

Moment of inertia, otherwise known as angular mass or rotational inertia, is a quantity that determines the torque needed for a desired angular acceleration of a body about a rotational axis—this is substantially equivalent to how mass determines the force needed for a particular acceleration.

Moment of inertia depends on the body's mass distribution and the axis chosen, with larger moments requiring more torque to change the body's rotation rate. Moment of inertia has dimensions of [mass]×[distance]$^2$ and may be expressed in units of kilogram millimeter squared (kgmm$^2$). Moment of inertia I is defined as the ratio of the net angular momentum L of a body to its angular velocity ω around a principal axis:

$$I = \frac{L}{\omega}$$

Provided that the shape of the body does not change, its moment of inertia appears in Newton's law of motion as the ratio of an applied torque τ on a body to the angular acceleration α around the principal axis:

$$\tau = I\alpha$$

For bodies constrained to rotate in a plane, only the moment of inertia about an axis perpendicular to the plane matters, and I can therefore be represented as a scalar value. The skilled person would appreciate that a fan of a gas turbine engine (and more generally a fan rotor of the gas turbine engine comprising the fan disc and blades, and optionally also the fan shaft and/or other related components) is constrained to rotate in only one plane—a plane perpendicular to the engine axis—and that the fan's moment of inertia can therefore be defined by a single, scaler, value.

The fan's moment of inertia about the engine axis can therefore be measured or defined using any standard methodology Torsional Shear Stress Shear stress is the component of stress coplanar with a material cross section; the stress tending to produce shear. Shear stress arises from a force vector component parallel to the cross section of the material. Shear stress may be defined as the external force acting on an object or surface parallel to the slope or plane in which it lies.

When a shaft or other body is subjected to a torque, or twisting, a shearing stress is produced in the body—the shearing stress may be referred to as a torsional shear stress as it results from a torque. The shear stress varies from zero along the axis of the torque rotation to a maximum at the part of the body furthest from the axis; a radial distance from the axis at which the shear stress is to be measured is therefore selected. In the arrangements being described, a mid-height of the component of which the torsional shear stress is being measured is selected. For example, if the component has an outer radius of 20 cm, a mid-height position of 10 cm from the axis 9 is selected.

Torsional shear stress has dimensions of [force]/[distance]$^2$ and may be expressed in units of Pascals (Pa) or Newtons/metre squared (N/m$^2$).

Shear Strength

Shear strength is the strength of a body against the body failing in shear—Shear strength is a material's ability to resist forces that can cause the internal structure of the material to slide against itself. A shear load is a force that tends to produce a sliding failure on a material along a plane that is parallel to the direction of the force.

The ultimate shear strength of a material is the maximum shear stress that may be sustained before the material will rupture. The proof strength of a material is the stress at which a particular degree of permanent deformation occurs—for example, a 0.2% proof strength is the stress at which a 0.2% permanent deformation occurs.

The strength of the body against shearing when a rotational, or twisting, shear load is applied may be referred to as torsional shear strength. The skilled person would appreciate that the shear strength of a component is important for selecting the dimensions and materials to be used for the manufacture or construction of the component. Shear strength has the same units as torsional shear stress, as it is a maximum supportable shear stress; it may therefore be expressed in units of Pa or N/m$^2$.

As used herein, the listed shear strength of a material is the 0.2% proof shear strength of the material unless otherwise specified. The skilled person would appreciate that this is lower than the ultimate shear strength.

Shear strength of a material generally varies with temperature. The shear strength as used herein may be defined at room temperature.

For metals (including metal alloys), shear strength generally decreases gradually with increasing temperature until a threshold temperature is reached, beyond which the material strength decreases rapidly. The shear strength may therefore be approximately constant below the threshold temperature. The threshold temperature may be around 400-500° C. for various steel grades. As the temperatures in and around the gearbox 30 generally do not exceed 120° C., well below the threshold temperature for likely materials for gearbox, gearbox support structure, and shaft construction, the shear strength may not be significantly different from the room temperature shear strength—the choice of a specific temperature for strength assessment may therefore have little effect.

Torsional Strength

The torsional strength of a specific component is defined as the ability of a component to withstand an applied torque without failure (i.e. without yield or structural failure). The torsional strength is therefore a measure of the torque capacity of a component. The torsional strength may be measured by applying a varying torque to a component and determining the torque at which the component fails. The torsional strength can be considered as the torque applied to the component at the point where the shear strength of that component is reached causing it to fail. The torsional strength as defined herein has dimensions of [force]×[distance] and may be expressed in units of Nm.

More specific definitions of stiffnesses and other parameters relating to embodiments described herein are provided below for ease of understanding.

Gearbox Support Stiffness

Figure 7:
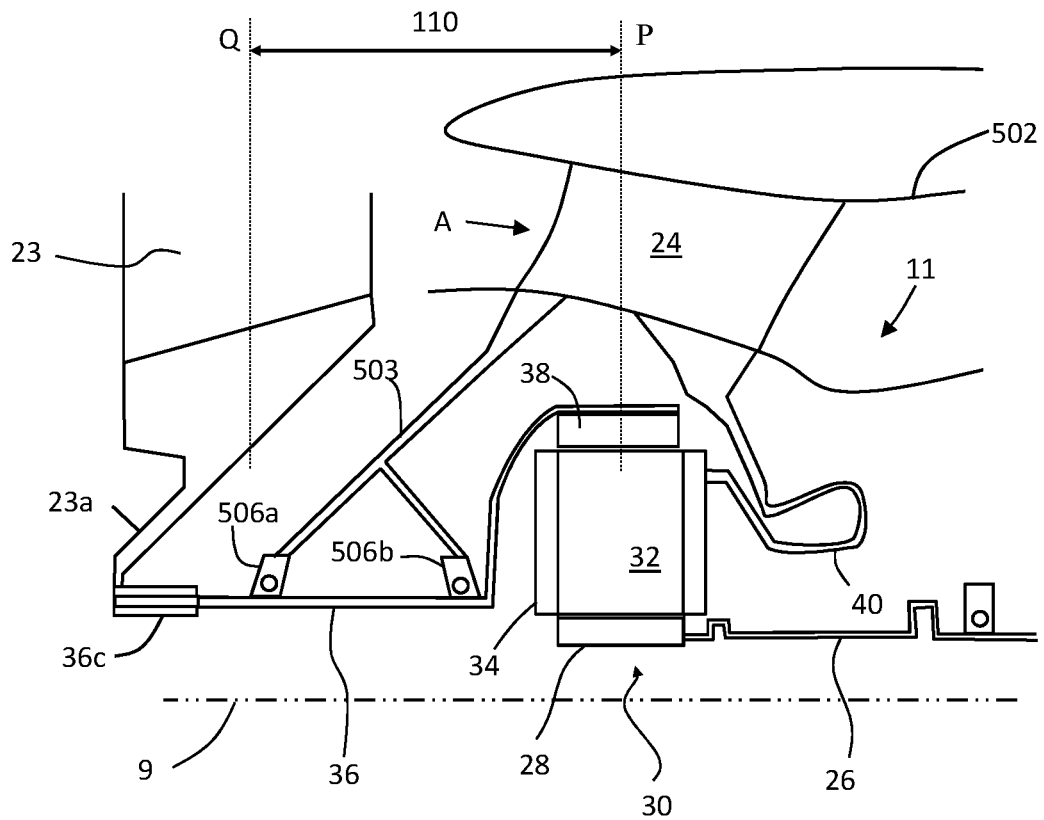
FIG. 7 is a close up sectional view of the region of a gas turbine engine around its gearbox.

FIG. 7 shows a region of the engine core 11 around the gearbox in close up. The same reference numbers have been used for components corresponding to those shown in FIGS. 1 to 3. In the arrangement shown in FIG. 7 the gearbox 30 has a star arrangement, in which the ring gear 38 is coupled to the fan shaft 36 and the carrier 34 is held in a fixed position relative to the static structure of the engine core (e.g. relative to the stationary supporting structure 24).

The fan shaft 36 is mounted within the engine by a fan shaft mounting structure 503. The fan shaft mounting structure 503 comprises at least two bearings connected to or otherwise in engagement with the fan shaft at points spaced apart axially along the length of the engine. The fan shaft mounting structure 503 may take a number of different forms, and may comprise one or more separate supporting structures provided to support the fan shaft. It may also include other structures provided to support the fan shaft such as inter-shaft bearings. It therefore includes any supporting structure that extends between a bearing in contact with the fan shaft and a stationary structure of the engine (e.g. of the engine core).

In the arrangement shown in FIG. 7, the fan shaft mounting structure 503 comprises two bearings, a first supporting bearing 506a and a second supporting bearing 506b, via which it is coupled to the fan shaft 36. The supporting bearings 506a, 506a are spaced apart along the axial length of the fan shaft 36. In the described arrangement, both supporting bearings 506a, 506b are provided at positions that are forward of the gearbox 30. In other arrangements, one of the two supporting bearing 506a, 506b used to support the fan shaft 36 may be located at a position rearward of the gearbox 30. In yet other arrangements, more than two supporting bearings may be provided as part of the fan shaft mounting structure or fan shaft mounting structure.

The engine core 11 comprises a gearbox support 40 (corresponding to the linkage described with reference to FIG. 2) arranged to support or mount (e.g. to at least partially support or mount) the gearbox 30 in a fixed position within the engine. The gearbox support is coupled at a first end to the stationary supporting structure 24 which extends across the core duct 502 carrying the core airflow A as illustrated in FIG. 7. In the presently described arrangement, the stationary support structure 24 is an engine section stator (ESS) that acts as both a structural component to provide a stationary mounting for core components such as the gearbox support, and as a guide vane provided to direct airflow from the fan 23. In other embodiments, the stationary supporting structure 24 may comprise a strut extending across the core gas flow path and a separate stator vane provided to direct airflow. In the presently described arrangement, the gearbox support 40 is coupled at a second end to the planet carrier 34. The gearbox support 40 therefore acts against rotation of the planet carrier 34 relative to the static structure of the engine core (e.g. relative to the stationary supporting structure 24).

In embodiments where the gearbox 30 is in a planetary arrangement, the gearbox support 40 is coupled to the ring gear 38 so as to resist its rotation relative to the static structure of the engine core (e.g. relative to the stationary supporting structure 24).

The gearbox support 40 is defined between the point at which it connects to the gearbox (e.g. to the planet carrier in the presently described arrangement) and a point at which it connects to the stationary supporting structure 24. The gearbox support may be formed by any number of separate components providing a coupling between those two points.

The gearbox support 40 has a degree of flexibility characterized by its radial bending stiffness and its tilt stiffness.

Figure 8:
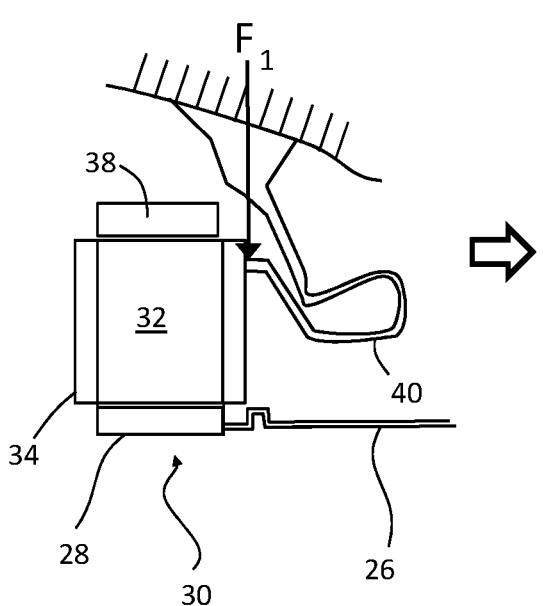
FIGS. 8 and 9 are schematic diagrams illustrating how the radial bending stiffness of a gearbox support may be defined.
Figure 9:
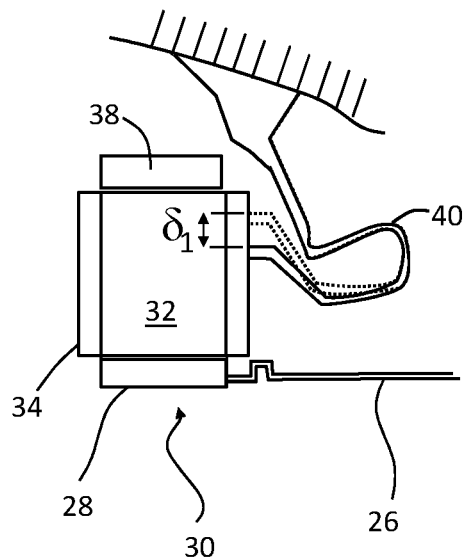

Gearbox Support Radial Bending Stiffness:

The radial bending stiffness of the gearbox support 40 is defined with reference to FIGS. 8 and 9. The radial bending stiffness can be considered to represent the resistance of the gearbox support to a force applied to it in a radial direction of the engine. The radial bending stiffness is determined by treating the gearbox support 40 as a free body that is fixed at its point of connection with the stationary supporting structure 24 of the engine, and which has a radial force $F_1$ applied at its point of connection with the gearbox 30 as illustrated in FIG. 8. Deformation of the gearbox support 40 caused by the applied force $F_1$ is illustrated in FIG. 9, with the shape of the support with no force applied shown in broken lines for comparison. The radial bending stiffness is defined in terms of the radial displacement, $\delta_1$, of the gearbox support at the position at which the force $F_1$ is applied. The force, $F_1$, is shown radially towards the engine axis 9 in FIG. 8, but could equivalently be a force radially away from the engine axis 9. The radial bending stiffness of the gearbox support 40 is therefore given by $F_1/\delta_1$. The gearbox 30 is shown for reference in FIG. 9 remaining in a stationary position despite the deformation of the gearbox support 40 to which it is connected—this is for illustration purposes only and reflects the gearbox support 40 being treated as a free body in order to determine the stiffness.

In various embodiments, the radial bending stiffness of the gearbox support may be greater than or equal to $1.0 \times 10^7$ N/m, and optionally greater than or equal to $2.0 \times 10^7$ N/m or greater than or equal to $3.0 \times 10^7$ N/m.

In some embodiments, for example in embodiments in which the fan diameter is in the range from 240 to 280 cm, the radial bending stiffness of the gearbox support may be greater than or equal to $1.0 \times 10^7$ N/m or greater than or equal to $2.7 \times 10^7$ N/m. In some embodiments, for example in embodiments in which the fan diameter is in the range from 330 to 380 cm, the radial bending stiffness of the gearbox support may be greater than or equal to $3.2 \times 10^7$ N/m or greater than or equal to $4.0 \times 10^7$ N/m In various embodiments, the radial bending stiffness of the gearbox support may be in the range from $1.0 \times 10^7$ N/m to $4.0 \times 10^8$ N/m, and optionally in the range from $2.0 \times 10^7$ N/m to $3 \times 10^8$ N/m or further optionally in the range from $3.0 \times 10^7$ N/m to $2.0 \times 10^8$ N/m.

In some embodiments, for example in embodiments in which the fan diameter is in the range from 240 to 280 cm, the radial bending stiffness of the gearbox support may be in the range from $1.0 \times 10^7$ N/m to $3.1 \times 10^8$ N/m and optionally in the range from $2.7 \times 10^7$ N/m to $3.7 \times 10^7$ N/m (and may be equal to $3.2 \times 10^7$ N/m).

In some embodiments, for example in embodiments in which the fan diameter is in the range from 330 to 380 cm, the radial bending stiffness of the gearbox support may be in the range from $3.2 \times 10^7$ N/m to $4.0 \times 10^8$ N/m, and optionally in the range from $4.0 \times 10^7$ N/m to $5.0 \times 10^7$ N/m (and may be equal to $4.5 \times 10^7$ N/m).

Gearbox Support Tilt Stiffness:

The tilt stiffness of the gearbox support 40 is defined with reference to FIGS. 10 and 11. The tilt stiffness can be considered to represent the resistance of the gearbox support to an applied moment. The tilt stiffness is determined by treating the gearbox support 40 as a free body that is fixed at its point of connection with the stationary supporting structure 24. In order to measure the tilt stiffness, a moment $M_1$ is applied at the point of connection between the gearbox support 40 and the gearbox 30 as illustrated in FIG. 10. Deformation of the gearbox support 40 caused by the applied moment $M_1$ is illustrated in FIG. 11, with the shape of the support with no moment applied shown in broken lines. The tilt stiffness is defined in terms of the angular displacement, $\theta_1$, of the gearbox support 40 at the position at which the moment $M_1$ is applied. The tilt stiffness is therefore given by $M_1/\theta_1$. The gearbox 30 is again shown for reference in FIG. 11 remaining in a stationary position despite the deformation of the gearbox support 40 to which it is connected.

In various embodiments, the tilt stiffness of the gearbox support may be greater than or equal to $1.2 \times 10^5$ Nm/rad, and optionally greater than or equal to $2.4 \times 10^5$ Nm/rad or optionally greater than or equal to $3.9 \times 10^5$ Nm/rad.

In some embodiments, for example in embodiments in which the fan diameter is in the range from 240 to 280 cm, the tilt stiffness of the gearbox support may be greater than or equal to $1.2 \times 10^5$ Nm/rad or greater than or equal to $4.5 \times 10^5$ Nm/rad. In some embodiments, for example in embodiments in which the fan diameter is in the range from 330 to 380 cm, the tilt stiffness of the gearbox support may be greater than or equal to $5.0 \times 10^5$ Nm/rad or greater than or equal to $6.0 \times 10^5$ Nm/rad.

In various embodiments, the tilt stiffness of the gearbox support may be in the range from $1.2 \times 10^5$ Nm/rad to $2.1 \times 10^7$ Nm/rad, and optionally in the range from $2.4 \times 10^5$ Nm/rad to $1.6 \times 10^7$ Nm/rad, and further optionally in the range from $3.9 \times 10^5$ Nm/rad to $9.0 \times 10^6$ Nm/rad.

In some embodiments, for example in embodiments in which the fan diameter is in the range from 240 to 280 cm, the tilt stiffness of the gearbox support may be in the range from $1.2 \times 10^5$ Nm/rad to $7.0 \times 10^6$ Nm/rad and optionally in the range from $4.5 \times 10^5$ Nm/rad to $6.5 \times 10^5$ Nm/rad (and may be equal to $5.5 \times 10^5$ Nm/rad).

In some embodiments, for example in embodiments in which the fan diameter is in the range from 330 to 380 cm, the tilt stiffness of the gearbox support may be in the range from $5.0 \times 10^5$ Nm/rad to $2.1 \times 10^7$ Nm/rad, and optionally in the range from $6.0 \times 10^5$ Nm/rad to $2.6 \times 10^6$ Nm/rad (and may be equal to $1.6 \times 10^6$ Nm/rad).

Gearbox Support Torsional Shear Stress and Torsional Strength

As described elsewhere herein the gearbox support is provided to locate the gearbox within the engine. In order to resist relative rotation of the gearbox compared to the stationary structure of the engine a torque is transmitted through the gearbox support. This varies over the operating cycle of the engine as different levels of torque are transmitted through the gearbox (as defined elsewhere herein) at different stages of the flight cycle of the aircraft to which the engine is mounted.

The torque transmitted through the gearbox support is defined as the torque at the point of connection between the gearbox support 40 and the gearbox 30.

The torsional strength of the gearbox support 40 is defined as the level of torque applied at the point of connection between the gearbox support 40 and the gearbox 20 that would result in failure of the gearbox support.

When measuring the torsional strength or torque transmitted through the gearbox support 40 the gearbox support is considered to be a free body that is fixed at its point of connection with the stationary supporting structure 24 of the engine with a torque applied at the point of connection to the gearbox (i.e. in a similar manner as the application of the force or moment used to determine the radial bending stiffness and tilt stiffness of the gearbox support).

In the arrangement illustrated in FIG. 7, the point of connection between the gearbox support 40 and the gearbox 30 is the point of connection to the planet carrier 34 of the gearbox. Where the gearbox is in a planetary configuration, this point of connection would be between the gearbox support 40 and the ring gear 38.

In various embodiments, the torsional strength of the gearbox support may be greater than or equal to $1.60\times10^5$ Nm, and optionally greater than or equal to $1.8\times10^5$ Nm.

In some embodiments, for example in embodiments in which the fan diameter is in the range from 240 to 280 cm, the torsional strength of the gearbox support may be greater than or equal to $1.8\times10^5$ Nm. In some embodiments, for example in embodiments in which the fan diameter is in the range from 330 to 380 cm, the torsional strength of the gearbox support may be greater than or equal to $4.0\times10^5$ Nm or greater than or equal to $5.5\times10^5$ Nm.

In various embodiments, the torsional strength of the gearbox support may be in the range from $1.60\times10^5$ Nm to $2.00\times10^7$ Nm, and optionally in the range from $1.8\times10^5$ Nm to $1.5\times10^6$ Nm.

In some embodiments, for example in embodiments in which the fan diameter is in the range from 240 to 280 cm, the torsional strength of the gearbox support may be in the range from $1.8\times10^5$ Nm to $7.0\times10^5$ Nm and optionally in the range from $1.8\times10^5$ Nm to $2.6\times10^5$ Nm (and may be equal to $2.2\times10^5$ Nm).

In some embodiments, for example in embodiments in which the fan diameter is in the range from 330 to 380 cm, the torsional strength of the gearbox support may be in the range from $4.0\times10^5$ Nm to $2.0\times10^7$ Nm and optionally in the range from $5.5\times10^5$ Nm to $7.5\times10^5$ Nm (and may be equal to $6.5\times10^5$ Nm).

Torque Transmitted Through the Gearbox Support at MOT Conditions:

In various embodiments, the torque transmitted through the gearbox support at maximum take-off conditions may be greater than or equal to $6.00\times10^4$ Nm, and optionally greater than or equal to $7.2\times10^4$ Nm.

In some embodiments, for example in embodiments in which the fan diameter is in the range from 240 to 280 cm, the torque transmitted through the gearbox support at maximum take-off conditions may be greater than or equal to $7.0\times10^4$ Nm. In some embodiments, for example in embodiments in which the fan diameter is in the range from 330 to 380 cm, the torque transmitted through the gearbox support at maximum take-off conditions may be greater than or equal to $1.8\times10^5$ Nm.

In various embodiments, the torque transmitted through the gearbox support at maximum take-off conditions may be in the range from $6.00\times10^4$ Nm to $5.00\times10^5$ Nm, and optionally in the range from $7.2\times10^4$ Nm to $4.2\times10^5$ Nm.

In some embodiments, for example in embodiments in which the fan diameter is in the range from 240 to 280 cm, the torque transmitted through the gearbox support at maximum take-off conditions may be in the range from $7.0\times10^4$ Nm to $1.9\times10^5$ Nm.

In some embodiments, for example in embodiments in which the fan diameter is in the range from 330 to 380 cm, torque transmitted through the gearbox support at maximum take-off conditions may be in the range from $1.8\times10^5$ Nm to $4.5\times10^5$ Nm.

The values in the paragraphs above may apply to any gearbox configuration (i.e. star or planetary, or other gearbox arrangements).

In various embodiments, for example in which the gearbox is in a star configuration, the torque transmitted through the gearbox support at maximum take-off conditions may be greater than or equal to $1.10\times10^5$ Nm, and optionally greater than or equal to $1.3\times10^5$ Nm.

In some embodiments, for example in embodiments in which the fan diameter is in the range from 240 to 280 cm and/or in which the gearbox is in a star configuration, the torque transmitted through the gearbox support at maximum take-off conditions may be greater than or equal to $1.2\times10^5$ Nm or greater than or equal to $1.4\times10^5$ Nm. In some embodiments, for example in embodiments in which the fan diameter is in the range from 330 to 380 cm and/or in which the gearbox is in a star configuration, the torque transmitted through the gearbox support at maximum take-off conditions may be greater than or equal to $3.0\times10^5$ Nm or is greater than or equal to $3.4\times10^5$ Nm.

In various embodiments, for example in which the gearbox is in a star configuration, the torque transmitted through the gearbox support at maximum take-off conditions may be in the range from $1.10\times10^5$ Nm to $5.00\times10^5$ Nm, and optionally in the range from $1.3\times10^5$ Nm to $4.2\times10^5$ Nm.

In some embodiments, for example in embodiments in which the fan diameter is in the range from 240 to 280 cm and/or in which the gearbox is in a star configuration, the torque transmitted through the gearbox support at maximum take-off conditions may be in the range from $1.2\times10^5$ Nm to $1.9\times10^5$ Nm and optionally in the range from $1.4\times10^5$ Nm to $1.8\times10^5$ Nm (and may be equal to $1.6\times10^5$ Nm).

In some embodiments, for example in embodiments in which the fan diameter is in the range from 330 to 380 cm and/or the gearbox is in a star configuration, torque transmitted through the gearbox support at maximum take-off conditions may be in the range from $3.0\times10^5$ Nm to $4.5\times10^5$ Nm and optionally in the range from $3.4\times10^5$ Nm to $4.2\times10^5$ Nm (and may be equal to $3.8\times10^5$ Nm).

In various embodiments, for example in which the gearbox is in a planetary configuration, the torque transmitted through the gearbox support at maximum take-off conditions may be greater than or equal to $6.00\times10^4$ Nm, and optionally greater than or equal to $7.2\times10^4$ Nm.

In some embodiments, for example in embodiments in which the fan diameter is in the range from 240 to 280 cm and/or in which the gearbox is in a planetary configuration, the torque transmitted through the gearbox support at maximum take-off conditions may be greater than or equal to $7.0\times10^4$ Nm. In some embodiments, for example in embodiments in which the fan diameter is in the range from 330 to 380 cm and/or in which the gearbox is in a planetary configuration, the torque transmitted through the gearbox support at maximum take-off conditions may be greater than or equal to $1.8\times10^5$ Nm.

In various embodiments, for example in which the gearbox is in a planetary configuration, the torque transmitted through the gearbox support at maximum take-off conditions may be in the range from $6.00\times10^4$ Nm to $3.00\times10^5$ Nm, and optionally in the range from $7.2\times10^4$ Nm to $2.6\times10^5$ Nm.

In some embodiments, for example in embodiments in which the fan diameter is in the range from 240 to 280 cm and/or in which the gearbox is in a planetary configuration, the torque transmitted through the gearbox support at maximum take-off conditions may be in the range from $7.0 \times 10^4$ Nm to $1.1 \times 10^5$ Nm.

In some embodiments, for example in embodiments in which the fan diameter is in the range from 330 to 380 cm and/or in which the gearbox is in a planetary configuration, torque transmitted through the gearbox support at maximum take-off conditions may be in the range from $1.8 \times 10^5$ Nm to $2.5 \times 10^5$ Nm.

Torque Transmitted Through the Gearbox Support at Cruise Conditions:

In various embodiments, the torque transmitted through the gearbox support at cruise conditions may be greater than or equal to $2.00 \times 10^4$ Nm, and optionally greater than or equal to $2.2 \times 10^4$ Nm.

In some embodiments, for example in embodiments in which the fan diameter is in the range from 240 to 280 cm, the torque transmitted through the gearbox support at cruise conditions may be greater than or equal to $2.2 \times 10^4$ Nm. In some embodiments, for example in embodiments in which the fan diameter is in the range from 330 to 380 cm, the torque transmitted through the gearbox support at cruise conditions may be greater than or equal to $6.8 \times 10^4$ Nm.

In various embodiments, the torque transmitted through the gearbox support at cruise conditions may be in the range from $2.00 \times 10^4$ Nm to $2.00 \times 10^5$ Nm, and optionally in the range from $2.2 \times 10^4$ Nm to $1.7 \times 10^5$ Nm.

In some embodiments, for example in embodiments in which the fan diameter is in the range from 240 to 280 cm, the torque transmitted through the gearbox support at cruise conditions may be in the range from $2.2 \times 10^4$ Nm to $6.6 \times 10^4$ Nm.

In some embodiments, for example in embodiments in which the fan diameter is in the range from 330 to 380 cm, the torque transmitted through the gearbox support at cruise conditions may be in the range from $6.8 \times 10^4$ Nm to $1.8 \times 10^5$ Nm.

The values in the paragraphs above may apply to any gearbox configuration (i.e. star or planetary, or other gearbox arrangements).

In various embodiments, for example in which the gearbox is in a star configuration, the torque transmitted through the gearbox support at cruise conditions may be greater than or equal to $4.00 \times 10^4$ Nm, and optionally greater than or equal to $4.8 \times 10^4$ Nm.

In some embodiments, for example in embodiments in which the fan diameter is in the range from 240 to 280 cm and/or in which the gearbox is in a star configuration, the torque transmitted through the gearbox support at cruise conditions may be greater than or equal to $4.5 \times 10^4$ Nm or greater than or equal to $5.0 \times 10^4$ Nm. In some embodiments, for example in embodiments in which the fan diameter is in the range from 330 to 380 cm and/or the gearbox is in a star configuration, the torque transmitted through the gearbox support at cruise conditions may be greater than or equal to $1.2 \times 10^5$ Nm.

In various embodiments, for example in which the gearbox is in a star configuration, the torque transmitted through the gearbox support at cruise conditions may be in the range from $4.00 \times 10^4$ Nm to $2.00 \times 10^5$ Nm, and optionally in the range from $4.8 \times 10^4$ Nm to $1.7 \times 10^5$ Nm.

In some embodiments, for example in embodiments in which the fan diameter is in the range from 240 to 280 cm and/or the gearbox is in a star configuration, the torque transmitted through the gearbox support at cruise conditions may be in the range from $4.5 \times 10^4$ Nm to $6.6 \times 10^4$ Nm and optionally in the range from $5.0 \times 10^4$ Nm to $6.0 \times 10^4$ Nm (and may be equal to $5.5 \times 10^4$ Nm).

In some embodiments, for example in embodiments in which the fan diameter is in the range from 330 to 380 cm and/or the gearbox is in a star configuration, torque transmitted through the gearbox support at cruise conditions may be in the range from $1.2 \times 10^5$ Nm to $1.8 \times 10^5$ Nm and optionally in the range from $1.2 \times 10^5$ Nm to $1.8 \times 10^5$ Nm (and may be equal to $1.5 \times 10^5$ Nm).

In various embodiments, for example in which the gearbox is in a planetary configuration, the torque transmitted through the gearbox support at cruise conditions may be greater than or equal to $2.00 \times 10^4$ Nm, and optionally greater than or equal to $2.2 \times 10^4$ Nm.

In some embodiments, for example in embodiments in which the fan diameter is in the range from 240 to 280 cm and/or in which the gearbox is in a planetary configuration, the torque transmitted through the gearbox support at cruise conditions may be greater than or equal to $2.2 \times 10^4$ Nm. In some embodiments, for example in embodiments in which the fan diameter is in the range from 330 to 380 cm and/or the gearbox is in a planetary configuration, the torque transmitted through the gearbox support at cruise conditions may be greater than or equal to $6.8 \times 10^4$ Nm.

In various embodiments, for example in which the gearbox is in a planetary configuration, the torque transmitted through the gearbox support at cruise conditions may be in the range from $2.00 \times 10^4$ Nm to $1.30 \times 10^5$ Nm, and optionally in the range from $2.2 \times 10^4$ Nm to $1.1 \times 10^5$ Nm.

In some embodiments, for example in embodiments in which the fan diameter is in the range from 240 to 280 cm and/or the gearbox is in a planetary configuration, the torque transmitted through the gearbox support at cruise conditions may be in the range from $2.2 \times 10^4$ Nm to $3.3 \times 10^4$ Nm.

In some embodiments, for example in embodiments in which the fan diameter is in the range from 330 to 380 cm and/or the gearbox is in a planetary configuration, torque transmitted through the gearbox support at cruise conditions may be in the range from $6.8 \times 10^4$ Nm to $1.1 \times 10^5$ Nm.

Gearbox Support Torsional Shear Stress

The gearbox support 40 has a torsional shear stress that also represents the resistance of the gearbox support 40 to a torque applied by the gearbox 30. The torsional shear stress is as defined elsewhere herein.

In various embodiments, the torsional shear stress of the gearbox support at maximum take-off conditions may be less than or equal to $4.90 \times 10^8$ N/m$^2$, and optionally less than or equal to $3.5 \times 10^8$ N/m$^2$.

In various embodiments, the torsional shear stress of the gearbox support at maximum take-off conditions may be in the range from $1.40 \times 10^8$ N/m$^2$ to $4.90 \times 10^8$ N/m$^2$, and optionally in the range from $2.0 \times 10^8$ N/m$^2$ to $3.5 \times 10^8$ N/m$^2$.

In some embodiments, for example in embodiments in which the fan diameter is in the range from 240 to 280 cm or in the range from 330 to 380 cm, the torsional shear stress of the gearbox support at maximum take-off conditions may be in the range from $2.3 \times 10^8$ N/m$^2$ to $3.7 \times 10^8$ N/m$^2$ (and may be equal to $2.5 \times 10^8$ N/m$^2$).

In various embodiments, the torsional shear stress of the gearbox support at cruise conditions may be greater than or equal to $7.00 \times 10^7$ N/m$^2$, and optionally greater than or equal to $8.2 \times 10^7$ N/m$^2$.

In some embodiments, for example in embodiments in which the fan diameter is in the range from 240 to 280 cm, the torsional shear stress of the gearbox support at cruise conditions may be greater than or equal to $8.0 \times 10^7$ N/m$^2$. In some embodiments, for example in embodiments in which the fan diameter is in the range from 330 to 380 cm, the torsional shear stress of the gearbox support at cruise conditions may be greater than or equal to $8.5 \times 10^7$ N/m$^2$ or greater than or equal to $9.0 \times 10^7$ N/m$^2$.

In various embodiments, the torsional shear stress of the gearbox support at cruise conditions may be in the range from $7.00 \times 10^7$ N/m$^2$ to $1.90 \times 10^8$ N/m$^2$, and optionally in the range from $8.2 \times 10^7$ N/m$^2$ to $1.5 \times 10^8$ N/m$^2$.

In some embodiments, for example in embodiments in which the fan diameter is in the range from 240 to 280 cm, the torsional shear stress of the gearbox support at cruise conditions may be in the range from $8.0 \times 10^7$ N/m$^2$ to $1.5 \times 10^8$ N/m$^2$ and optionally in the range from $8.0 \times 10^7$ N/m$^2$ to $9.2 \times 10^7$ N/m$^2$ (and may be equal to $8.6 \times 10^7$ N/m$^2$).

In some embodiments, for example in embodiments in which the fan diameter is in the range from 330 to 380 cm, the torsional shear stress of the gearbox support at cruise conditions may be in the range from $8.5 \times 10^7$ N/m$^2$ to $1.9 \times 10^8$ N/m$^2$ and optionally in the range from $9.0 \times 10^7$ Nm$^2$ to $1.2 \times 10^8$ N/m$^2$ (and may be equal to $9.6 \times 10^7$ N/m$^2$).

The maximum take-off conditions and cruise conditions referred to in this section may be as defined elsewhere herein.

The shear stress may be measured through the highest loaded plane section of the component (i.e. the gearbox support). It excludes the effects of stress concentrations at small radii and holes. The skilled person will understand that for the shear stress of the gearbox support defined herein since the predominant load is a torque, the effective radius also affects the measurement of the shear as well as the area.

Fan Moment of Inertia

The fan 23 has a moment of inertial IF. The moment of inertia of the fan is measured based on the total mass of the rotor forming the fan, i.e. including the total mass of the plurality of fan blades, the fan hub and any support arm or other linkages provided to connect the fan to the fan shaft. The moment of inertial therefore includes all rotating components apart from the fan shaft. The moment of inertia is the mass moment of inertia or rotational inertia of the fan with respect to rotation around the principal rotational axis 9 of the engine. Rotation of the fan will cause a gyroscopic effect meaning that the fan shaft will tend to maintain a steady direction of its axis of rotation. During manoeuvring of the aircraft to which the gas turbine engine is mounted the orientation of the axis of rotation of the fan shaft will however change. The gyroscopic effect will result in a reaction force at the fan shaft mounting structure to resist the tendency of the fan shaft to maintain its orientation. The moment of inertia of the fan will have an effect on the magnitude of the gyroscopic effect produced, and so has an impact on the design of the fan shaft and the fan shaft mounting structure as is discussed elsewhere herein.

In various embodiments, the moment of inertia of the fan may be greater than or equal to $7.40 \times 10^7$ kgmm$^2$, and optionally greater than or equal to $8.3 \times 10^7$ kgmm$^2$.

In some embodiments, for example in embodiments in which the fan diameter is in the range from 240 to 280 cm, the moment of inertia of the fan may be greater than or equal to $7.4 \times 10^7$ kgmm$^2$ or $8.6 \times 10^7$ kgmm$^2$. In some embodiments, for example in embodiments in which the fan diameter is in the range from 330 to 380 cm, the moment of inertia of the fan may be greater than or equal to $3.0 \times 10^8$ kgmm$^2$ or $4.0 \times 10^8$ kgmm$^2$.

In various embodiments, the moment of inertia of the fan may be in the range from $7.40 \times 10^7$ kgmm$^2$ to $9.00 \times 10^8$ kgmm$^2$, and optionally in the range from $8.3 \times 10^7$ kgmm$^2$ to $6.5 \times 10^8$ kgmm$^2$.

In some embodiments, for example in embodiments in which the fan diameter is in the range from 240 to 280 cm, the moment of inertia of the fan may be in the range from $7.4 \times 10^7$ kgmm$^2$ to $1.5 \times 10^8$ kgmm$^2$ and optionally in the range from $8.6 \times 10^7$ kgmm$^2$ to $9.6 \times 10^7$ kgmm$^2$ (and may be equal to $9.1 \times 10^7$ kgmm$^2$).

In some embodiments, for example in embodiments in which the fan diameter is in the range from 330 to 380 cm, the moment of inertia of the fan may be in the range from $3.0 \times 10^8$ kgmm$^2$ to $9.0 \times 10^8$ kgmm$^2$ and optionally in the range from $4.0 \times 10^8$ kgmm$^2$ to $5.0 \times 10^8$ kgmm$^2$ (and may be equal to $4.5 \times 10^8$ kgmm$^2$).

The mass of the fan may be in the range 150 kg to 1200 kg, for example in the range 150 kg to 1000 kg, 175 kg to 1000 kg, 150 kg to 250 kg or 300 kg to 500 kg.

Relative Fan and Gearbox Positions

Referring again to FIG. 7, a fan-gearbox axial distance 110 is defined as the axial distance between the axial position P of the gearbox output position (also labelled X in FIGS. 15 to 18) and the fan axial centreline Q. The fan axial centreline is defined as the axial midpoint of the fan blades forming the fan. The gearbox output position is defined as the point of connection between the fan shaft 36 and the gearbox. This may be defined differently for different types of gearbox as is described below.

In various embodiments, the fan-gearbox axial distance may be greater than or equal to 0.35 m, and optionally greater than or equal to 0.37 m.

In some embodiments, for example in embodiments in which the fan diameter is in the range from 240 to 280 cm, the fan-gearbox axial distance may be greater than or equal to 0.38 m or greater than or equal to 0.40 m. In some embodiments, for example in embodiments in which the fan diameter is in the range from 330 to 380 cm, the fan-gearbox axial distance may be greater than or equal to 0.48 m or greater than or equal to 0.50 m.

In various embodiments, the fan-gearbox axial distance may be in the range from 0.35 m to 0.8 m, and optionally in the range from 0.37 m to 0.75 m.

In some embodiments, for example in embodiments in which the fan diameter is in the range from 240 to 280 cm, the fan-gearbox axial distance may be in the range from 0.38 m to 0.65 m and optionally in the range from 0.40 m to 0.44 m (and may be equal to 0.42 m).

In some embodiments, for example in embodiments in which the fan diameter is in the range from 330 to 380 cm, the fan-gearbox axial distance may be in the range from 0.48 m to 0.8 m and optionally in the range from 0.50 m to 0.66 m (and may be equal to 0.58 m).

The fan shaft 36 is defined as the torque transfer component that extends from the output of the gearbox to the fan input. It therefore includes part or all of any gearbox output shaft and fan input shaft that may be provided between those points. For the purposes of defining the stiffness of the fan shaft 36 it is considered to extend between a fan input position and a gearbox output position, and includes all of the torque transfer components between those points. It does not therefore include any components of the gearbox (e.g. the planet carrier or connecting plate coupled to it) which transmit discrete forces, rather than the fan shaft torque. The gearbox output position therefore may be defined as the point of connection between the fan shaft 36 and the gearbox 30. The fan input position may be defined as the point of connection between the fan shaft 36 and the fan.

Referring to FIG. 12, where the gearbox is in a star configuration, the gearbox output position is defined as the point of connection 702 between the ring gear 38 and the fan shaft 36. More specifically, it is the point of connection to the annulus of the ring gear 38 (with any connection component extending from the outer surface of the annulus being considered to be part of the ring gear). Where the point of connection is formed by an interface extending in a direction having an axial component, the point of connection is considered to be the axial centreline of that interface as illustrated in FIG. 7.

The fan shaft 36 includes all torque transmitting components up to the point of connection 702 with the ring gear 38. It therefore includes any flexible portions or linkages 704 of the fan shaft 36 that may be provided, and any connection(s) 706 (e.g. spline connections) between them.

Where the gearbox 30 is in a planetary configuration, the gearbox output position is again defined as the point of connection between the fan shaft 36 and the gearbox 30. An example of this is illustrated in FIG. 13, which shows a carrier comprising a forward plate 34a and rearward plate 34b, with a plurality of pins 33 extending between them and on which the planet gears are mounted. The fan shaft 36 is connected to the forward plate 34a via a spline connection 708. In an arrangement such as this, the gearbox output position is taken as any point on the interface between the fan shaft 36 and the forward plate 34a. The forward plate 34a is considered to transmit discrete forces, rather than a single torque, and so is taken to be part of the gearbox 30 rather than the fan shaft.

FIG. 13 shows only one example of a type of connection between the fan shaft and planet carrier 34. In embodiments having different connection arrangements, the gearbox output position is still taken to be at the interface between components transmitting a torque (i.e. that are part of the fan shaft) and those transmitting discrete forces (e.g. that are part of the gearbox). The spline connection 708 is only one example of a connection that may be formed between the fan shaft and gearbox (i.e. between the fan shaft and the forward plate 34b in the presently described arrangement). In other embodiments, the interface which forms the gearbox output position may be formed by, for example, a curvic connection, a bolted joint or other toothed or mechanically dogged arrangement.

The fan input position is defined as a point on the fan shaft at the axial midpoint of the interface between the fan and the fan shaft. In the presently described arrangement, the fan 23 comprises a support arm 23a (as can be seen, for example, in FIG. 7) arranged to connect the fan 23 to the fan shaft 36. The support arm 23a is connected to the fan shaft by a spline coupling 36c that extends along the length of a portion of the fan shaft 36. The fan input position is defined as the axial midpoint of the spline coupling. The spline coupling shown is only one example of a coupling that may form the interface between the fan and fan shaft. In other embodiments, for example, a curvic connection, a bolted joint or other toothed or mechanically dogged arrangement may be used. For example, a flange coupling may be provided between the support arm 23a and the fan shaft 36. In such an embodiment, the support arm can be connected at the rear of the fan hub. In this embodiment the fan input position is the axial midpoint of the flange coupling. FIG. 14 illustrates an arrangement in which an alternative coupling is provided between the fan 23 and the fan shaft 36. Similarly to FIG. 7, the fan 23 is coupled to the fan shaft 36 via a support arm 23a. In this arrangement however, a flange coupling 36d is provided between the support arm 23a and the fan shaft 36. In this embodiment, the support arm 23a is connected at the rear of the fan hub. The flange coupling 36d may be a curvic coupling. In other embodiments, other forms of flange coupling may be provided. In the embodiment of FIG. 14, the fan input position is the axial midpoint (labelled Y) of the flange coupling.

The fan shaft 36 has a degree of flexibility characterized by its radial bending stiffness and tilt stiffness.

Fan Shaft End Stiffness at Gearbox Output:

The stiffness of the fan shaft where it couples to the gearbox 30 is defined with reference to FIGS. 15 to 18.

The radial bending stiffness of the fan shaft 36 at the output of the gearbox 30 is measured by applying a force $F_2$ to the fan shaft at the gearbox output position defined above (illustrated in FIG. 15). The fan shaft 36 is treated as a free body, and is held fixed at the position of all of bearing positions at which it is supported i.e. the first and second bearings 506a, 506b in the arrangement of FIG. 15. As a result of force $F_2$ the fan shaft 36 deforms so that the gearbox output position is displaced by a distance of $\delta_2$ (as illustrated in FIG. 16). The radial bending stiffness of the fan shaft 36 at the output of the gearbox is then given by $F_2/\delta_2$.

In various embodiments, the radial bending stiffness of the fan shaft at the output of the gearbox may be greater than or equal to $4.00 \times 10^6$ N/m, and optionally greater than or equal to $3.7 \times 10^7$ N/m.

In some embodiments, for example in embodiments in which the fan diameter is in the range from 240 to 280 cm, the radial bending stiffness of the fan shaft at the output of the gearbox may be greater than or equal to $3.7 \times 10^7$ N/m. In some embodiments, for example in embodiments in which the fan diameter is in the range from 330 to 380 cm, the radial bending stiffness of the fan shaft at the output of the gearbox may be greater than or equal to $3.9 \times 10^7$ N/m or greater than or equal to $5.0 \times 10^7$ N/m.

In various embodiments, the radial bending stiffness of the fan shaft at the output of the gearbox may be in the range from $4.00 \times 10^6$ N/m to $1.5 \times 10^9$ N/m, and optionally in the range from $3.7 \times 10^7$ N/m to $1.0 \times 10^9$ N/m.

In some embodiments, for example in embodiments in which the fan diameter is in the range from 240 to 280 cm, the radial bending stiffness of the fan shaft at the output of the gearbox may be in the range from $3.7 \times 10^7$ N/m to $5.0 \times 10^8$ N/m and optionally in the range from $3.7 \times 10^7$ N/m to $4.3 \times 10^7$ N/m (and may be equal to $4.0 \times 10^7$ N/m).

In some embodiments, for example in embodiments in which the fan diameter is in the range from 330 to 380 cm, the radial bending stiffness of the fan shaft at the output of the gearbox may be in the range from $3.9 \times 10^7$ N/m to $1.5 \times 10^9$ N/m, and optionally in the range from $5.0 \times 10^7$ N/m to $9.0 \times 10^7$ N/m (and may be equal to $7.0 \times 10^7$ N/m).

Figures 17, 18:
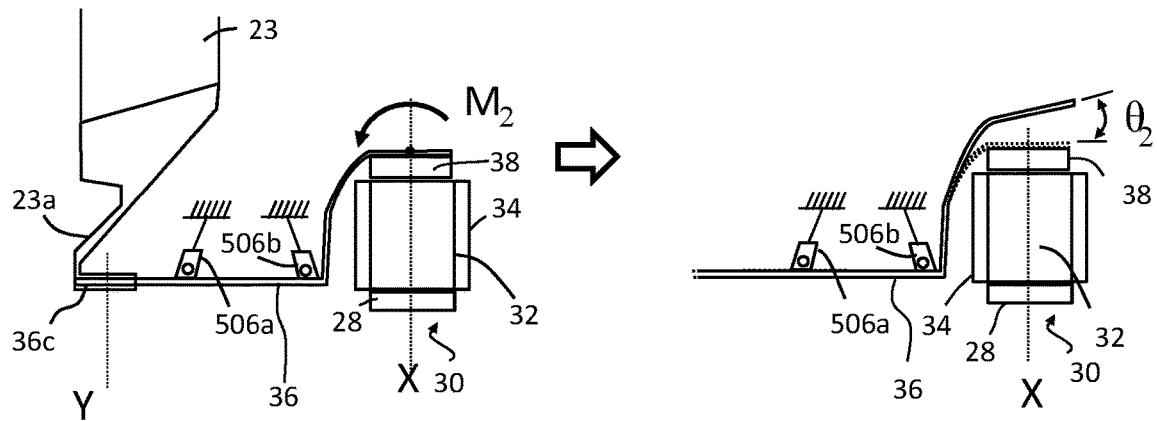
FIGS. 17 and 18 are schematic diagrams illustrating how fan shaft end tilt stiffnesses may be defined.

The tilt stiffness of the fan shaft 36 at the output of the gearbox 30 is measured by applying a moment $M_2$ to the fan shaft at the gearbox output position defined above (illustrated in FIG. 17). The fan shaft 36 is again treated as a free body, and is held fixed at the position of all of the bearing positions at which it is supported i.e. the first and second bearings 506a, 506b in the arrangement of FIG. 15. As a result of moment $M_2$ the fan shaft 36 deforms so that the gearbox output position is displaced by an angular displacement of $\theta_2$ as illustrated in FIG. 17. The tilt stiffness of the fan shaft 36 at the output of the gearbox is then given by $M_2/\theta_2$.

In various embodiments, the tilt stiffness of the fan shaft at the output of the gearbox may be greater than or equal to $7.00 \times 10^4$ Nm/rad, and optionally greater than or equal to $9.5 \times 10^5$ Nm/rad.

In some embodiments, for example in embodiments in which the fan diameter is in the range from 240 to 280 cm, the tilt stiffness of the fan shaft at the output of the gearbox may be greater than or equal to $9.5\times10^5$, and optionally may be greater than or equal to $9.5\times10^5$ Nm/rad. In some embodiments, for example in embodiments in which the fan diameter is in the range from 330 to 380 cm, the tilt stiffness of the fan shaft output of the gearbox may be greater than or equal to $1.1\times10^6$ Nm/rad and optionally may be greater than or equal to $2.0\times10^6$ Nm/rad.

In various embodiments, the tilt stiffness of the fan shaft at the output of the gearbox may be in the range from $7.00\times10^4$ Nm/rad to $7.00\times10^7$ Nm/rad, and optionally in the range from $9.5\times10^5$ Nm/rad to $3.5\times10^7$ Nm/rad.

In some embodiments, for example in embodiments in which the fan diameter is in the range from 240 to 280 cm, the tilt stiffness of the output of the gearbox may be in the range from $9.5\times10^5$ Nm/rad to $2.0\times10^7$ Nm/rad and optionally in the range from $9.5\times10^5$ Nm/rad to $2.4\times10^6$ Nm/rad (and may be equal to $1.2\times10^6$ Nm/rad).

In some embodiments, for example in embodiments in which the fan diameter is in the range from 330 to 380 cm, the tilt stiffness of the fan shaft at the output of the gearbox may be in the range from $1.1\times10^6$ Nm/rad to $7.0\times10^7$ Nm/rad, and optionally in the range from $2.0\times10^6$ Nm/rad to $5.2\times10^6$ Nm/rad (and may be equal to $3.6\times10^6$ Nm/rad).

Torque Transmission by the Gearbox

The gearbox provides a torque conversion between the toque at its input (i.e. the core shaft) and its output (i.e. the fan shaft). The torque transmitted through the gearbox is defined as the torque at the output position of the gearbox (the output position being as defined elsewhere herein). The torque transmitted through the gearbox varies over the operating cycle of the engine.

In various embodiments, the torque transmitted through the gearbox at maximum take-off conditions may be greater than or equal to $7.00\times10^4$ Nm, and optionally greater than or equal to $1.0\times10^5$ Nm.

In some embodiments, for example in embodiments in which the fan diameter is in the range from 240 to 280 cm, the torque transmitted through the gearbox at maximum take-off conditions may be greater than or equal to $1.1\times10^5$ Nm. In some embodiments, for example in embodiments in which the fan diameter is in the range from 330 to 380 cm, the torque transmitted through the gearbox at maximum take-off conditions may be greater than or equal to $1.5\times10^5$ Nm or greater than or equal to $2.0\times10^5$ Nm.

In various embodiments, the torque transmitted through the gearbox at maximum take-off conditions may be in the range from $7.00\times10^4$ Nm to $5.00\times10^5$ Nm, and optionally in the range from $1.0\times10^5$ Nm to $3.5\times10^5$ Nm.

In some embodiments, for example in embodiments in which the fan diameter is in the range from 240 to 280 cm, the torque transmitted through the gearbox at maximum take-off conditions may be in the range from $1.1\times10^5$ Nm to $1.5\times10^5$ Nm and optionally in the range from $1.1\times10^5$ Nm to $1.3\times10^5$ Nm (and may be equal to $1.2\times10^5$ Nm).

In some embodiments, for example in embodiments in which the fan diameter is in the range from 330 to 380 cm, the torque transmitted through the gearbox at maximum take-off conditions may be in the range from $1.5\times10^5$ Nm to $5.0\times10^5$ Nm and optionally in the range from $2.0\times10^5$ Nm to $3.8\times10^5$ Nm (and may be equal to $2.9\times10^5$ Nm).

In various embodiments, the torque transmitted through the gearbox at cruise conditions may be greater than or equal to $2.30\times10^4$ Nm, and optionally greater than or equal to $3.1\times10^4$ Nm.

In some embodiments, for example in embodiments in which the fan diameter is in the range from 240 to 280 cm, the torque transmitted through the gearbox at cruise conditions may be greater than or equal to $3.2\times10^4$ Nm or greater than or equal to $3.8\times10^4$ Nm. In some embodiments, for example in embodiments in which the fan diameter is in the range from 330 to 380 cm, the torque transmitted through the gearbox at cruise conditions may be greater than or equal to $7.3\times10^4$ Nm or greater than or equal to $9.8\times10^4$ Nm.

In various embodiments, the torque transmitted through the gearbox at cruise conditions may be in the range from $2.30\times10^4$ Nm to $1.80\times10^5$ Nm, and optionally in the range from $3.1\times10^4$ Nm to $1.5\times10^5$ Nm.

In some embodiments, for example in embodiments in which the fan diameter is in the range from 240 to 280 cm, the torque transmitted through the gearbox at cruise conditions may be in the range from $3.2\times10^4$ Nm to $7.2\times10^4$ Nm and optionally in the range from $3.8\times10^4$ Nm to $4.6\times10^4$ Nm (and may be equal to $4.2\times10^4$ Nm).

In some embodiments, for example in embodiments in which the fan diameter is in the range from 330 to 380 cm, torque transmitted through the gearbox at cruise conditions may be in the range from $7.3\times10^4$ Nm to $1.8\times10^5$ Nm and optionally in the range from $9.8\times10^4$ Nm to $1.4\times10^5$ Nm (and may be equal to $1.1\times10^5$ Nm).

Gearbox CSA

The cross sectional area (CSA) of the gearbox is defined as the area of the pitch circle of the ring gear. The pitch circle of a gear is an imaginary circle that rolls without slipping with the pitch circle of any other gear with which the first gear is meshed. The pitch circle passes through the points where the teeth of two gears meet as the meshed gears rotate—the pitch circle of a gear generally passes through a mid-point of the length of the teeth of the gear. The CSA of the gearbox can be found by measuring the pitch circle diameter (PCD) of the gear. The PCD can be roughly estimated by taking the average of the diameter between tips of the gear teeth and the diameter between bases of the gear teeth.

In various embodiments, the CSA of the gearbox may be greater than or equal to $2.4\times10^{-1}$ m$^2$ and optionally greater than or equal to $2.6\times10^{-1}$ m$^2$.

In some embodiments, for example in embodiments in which the fan diameter is in the range from 240 to 280 cm, the CSA of the gearbox may be greater than or equal to $2.4\times10^{-1}$ m$^2$ or greater than or equal to $2.5\times10^{-1}$ m$^2$.

In some embodiments, for example in embodiments in which the fan diameter is in the range from 330 to 380 cm, the CSA of the gearbox may be greater than or equal to $4.5\times10^{-1}$ m$^2$ or greater than or equal to $5.5\times10^{-1}$ m$^2$.

In various embodiments, the CSA of the gearbox may be in the range from $2.4\times10^{-1}$ m$^2$ to $1.10$ m$^2$, and optionally in the range from $2.6\times10^{-1}$ m$^2$ to $9.0\times10^{-1}$ m$^2$.

In some embodiments, for example in embodiments in which the fan diameter is in the range from 240 to 280 cm, the CSA of the gearbox may be in the range from $2.4\times10^{-1}$ m$^2$ to $5.0\times10^{-1}$ m$^2$ and optionally in the range from $2.5\times10^{-1}$ m$^2$ to $3.4\times10^{-1}$ m$^2$ (and may be equal to $2.9\times10^{-1}$ m$^2$).

In some embodiments, for example in embodiments in which the fan diameter is in the range from 330 to 380 cm, the CSA of the gearbox may be in the range from $4.5\times10^{-1}$ m$^2$ to $1.1$ m$^2$, and optionally in the range from $5.5\times10^{-1}$ m$^2$ to $6.4\times10^{-1}$ m$^2$ (and may be equal to $5.9\times10^{-1}$ m$^2$).

Angle Between Adjacent Planet Gears

A planet gear spacing angle in radians ($\beta$) is defined as $2\pi/N$, where N is the number of planet gears 32 provided in the gearbox. The planet gear spacing angle is illustrated in FIG. 3. The planet gearbox spacing angle corresponds to the average angle (in rad) between all the adjacent pairs of planet gears.

In various embodiments, the planet gear spacing angle ($\beta$) may be greater than or equal to $9.0 \times 10^{-1}$ rad, and optionally in the range between $9.0 \times 10^{-1}$ rad to 2.1 rad, and further optionally in the range between 1.1 rad and 1.3 rad (and may be equal to 1.26 rad)

Parameter Ratios

The inventor has discovered that the ratios (and/or products) of some properties have a considerable impact on the operation of the gearbox and its inputs/outputs/support structure. Some or all of the below may apply to any embodiment:

In various embodiments, a radial bending stiffness to moment of inertia ratio may be defined as:

$$\frac{\text{the radial bending stiffness of at least one of the fan shaft (36) at the output of the gearbox and the gearbox support (40)}}{\text{the moment of inertia of the fan (23)}}$$

In various embodiments, the radial bending stiffness to moment of inertia ratio may be greater than or equal to $2.5 \times 10^{-2}$ $Nkg^{-1}m^{-1}mm^{-2}$ (i.e. $(N/m)/(kgmm^2)$) and optionally greater than or equal to 0.05 $Nkg^{-1}m^{-1}mm^{-2}$.

In some embodiments, for example in embodiments in which the fan diameter is in the range from 240 to 280 cm, the radial bending stiffness to moment of inertia ratio may be greater than or equal to 0.05 $Nkg^{-1}m^{-1}mm^{-2}$ In some embodiments, for example in embodiments in which the fan diameter is in the range from 330 to 380 cm, the radial bending stiffness to moment of inertia ratio may be greater than or equal to 0.025 $Nkg^{-1}m^{-1}mm^{-2}$.

In various embodiments, the radial bending stiffness to moment of inertia ratio may be in the range from $2.5 \times 10{-2}$ $Nkg^{-1}m^{-1}mm^{-2}$ to 6.0 $Nkg^{-1}m^{-1}mm^{-2}$, and optionally in the range from 0.05 $Nkg^{-1}m^{-1}mm^{-2}$ to 3.0 $Nkg^{1}m^{-1}mm^{-2}$, and further optionally in the range from 0.05 $Nkg^{-1}m^{-1}mm^{-2}$ to 0.6 $Nkg^{-1}m^{-1}mm^{-2}$.

In some embodiments, for example in embodiments in which the fan diameter is in the range from 240 to 280 cm, the radial bending stiffness to moment of inertia ratio may be in the range from 0.05 $Nkg^{-1}m^{-1}mm^{-2}$ to 4.0 $Nkg^{-1}m^{-1}mm^{-2}$.

In some embodiments, for example in embodiments in which the fan diameter is in the range from 330 to 380 cm, the radial bending stiffness to moment of inertia ratio may be in the range from 0.025 $Nkg^{-1}m^{-1}mm^{-2}$ to 2.0 $Nkg^{-1}m^{-1}mm^{-2}$.

In various embodiments, in addition to or alternatively to the radial bending stiffness to moment of inertia ratio, a product of the parameters making up that ratio may be defined. This product (referred to as the radial bending stiffness to moment of inertia product) may be defined as:

$$(\text{the radial bending stiffness of at least one of the fan shaft (36) at the output of the gearbox and the gearbox support (40)}) \times (\text{the moment of inertia of the fan (23)})$$

In various embodiments, the radial bending stiffness to moment of inertia product may be greater than or equal to $2.0 \times 10^{14}$ $Nkgmm^2m^{-1}$ (i.e. $(N/m) \cdot (kgmm^2)$), and optionally greater than or equal to $4.0 \times 10^{14}$ $Nkgmm^2m^{-1}$, and further optionally greater than or equal to $2.0 \times 10^{15}$ $Nkgmm^2m^{-1}$.

In some embodiments, for example in embodiments in which the fan diameter is in the range from 240 to 280 cm, the radial bending stiffness to moment of inertia product may be greater than or equal to $1.5 \times 10^{15}$ $Nkgmm^2m^{-1}$. In some embodiments, for example in embodiments in which the fan diameter is in the range from 330 to 380 cm, the radial bending stiffness to moment of inertia product may be greater than or equal to $2.0 \times 10^{15}$ $Nkgmm^2m^{-1}$.

In various embodiments, the radial bending stiffness to moment of inertia product may be in the range from $2.0 \times 10^{14}$ $Nkgmm^2m^{-1}$ to $1.4 \times 10^{18}$ $Nkgmm^2m^{-1}$, and optionally in the range from $4.0 \times 10^{14}$ $Nkgmm^2m^{-1}$ to $7.0 \times 10^{17}$ $Nkgmm^2m^{-1}$, and further optionally in the range from $2.0 \times 10^{15}$ $Nkgmm^2m^{-1}$ to $7.0 \times 10^{17}$ $Nkgmm^2m^{-1}$.

In some embodiments, for example in embodiments in which the fan diameter is in the range from 240 to 280 cm, the radial bending stiffness to moment of inertia product may be in the range from $1.5 \times 10^{15}$ $Nkgmm^2m^{-1}$ to $1.3 \times 10^{17}$ $Nkgmm^2m^{-1}$.

In some embodiments, for example in embodiments in which the fan diameter is in the range from 330 to 380 cm, the radial bending stiffness to moment of inertia product may be in the range from $2.0 \times 10^{15}$ $Nkgmm^2m^{-1}$ to $1.4 \times 10^{18}$ $Nkgmm^2m^{-1}$.

In various embodiments, a fan shaft radial bending stiffness to moment of inertia ratio may be defined as:

$$\frac{\text{the radial bending stiffness of the fan shaft (36) at the output of the gearbox}}{\text{the moment of inertia of the fan (23)}}$$

In various embodiments, the fan shaft radial bending stiffness to moment of inertia ratio may be greater than or equal to $2.5 \times 10^{-2}$ $Nkg^{-1}m^{-1}mm^{-2}$ (i.e. $(N/m)/(kgmm^2)$), and optionally greater than or equal to 0.05 $(N/m)/(kgmm^2)$.

In some embodiments, for example in embodiments in which the fan diameter is in the range from 240 to 280 cm, the fan shaft radial bending stiffness to moment of inertia ratio may be greater than or equal to 0.05 $Nkg^{-1}m\ mm^{-2}$ or greater than or equal to 0.4 $Nkg^{-1}m^{-1}mm^{-2}$. In some embodiments, for example in embodiments in which the fan diameter is in the range from 330 to 380 cm, the fan shaft radial bending stiffness to moment of inertia ratio may be greater than or equal to 0.025 $Nkg^{-1}m^{-1}mm^{-2}$ or optionally greater than or equal to 0.06 $Nkg^{-1}m^{-1}mm^{-2}$.

In various embodiments, the fan shaft radial bending stiffness to moment of inertia ratio may be in the range from $2.5 \times 10^{-2}$ $Nkg^{-1}m^{-1}mm^{-2}$ to 6.0 $Nkg^{-1}m^{-1}mm^2$, and optionally in the range from 0.05 $Nkg^{-1}m^{-1}mm^{-2}$ to 3.0 $Nkg^{-1}m^{-1}mm^{-2}$, and further optionally in the range from 0.05 $Nkg^{-1}m^{-1}mm^{-2}$ to 0.6 $Nkg^{-1}\ m^{-1}mm^{-2}$.

In some embodiments, for example in embodiments in which the fan diameter is in the range from 240 to 280 cm, the fan shaft radial bending stiffness to moment of inertia ratio may be in the range from 0.05 $Nkg^{-1}m^{-1}mm^{-2}$ to 0.6 $Nkg^{-1}m^{-1}mm^{-2}$ and optionally in the range from 0.4 $Nkg^{-1}m^{-1}mm^{-2}$ to 0.5 $Nkg^{-1}m^{-1}mm^{-2}$ (and may be equal to 0.44 $Nkg^{-1}m^{-1}mm^{-2}$).

In some embodiments, for example in embodiments in which the fan diameter is in the range from 330 to 380 cm, the fan shaft radial bending stiffness to moment of inertia ratio may be in the range from 0.025 $Nkg^{-1}m^{-1}mm^{-2}$ to 0.6 $Nkg^{-1}m^{-1}mm^{-2}$, and optionally in the range from 0.06 $Nkg^{-1}m^{-1}mm^{-2}$ to 0.26 $Nkg^{-1}m^{-1}mm^{-2}$ (and may be equal to 0.16 $Nkg^{-1}m^{-1}mm^{-2}$).

In various embodiments, in addition to or alternatively to the fan shaft radial bending stiffness to moment of inertia ratio, a product of the parameters making up that ratio may be defined. This product (referred to as the fan shaft radial bending stiffness to moment of inertia product) may be defined as:

$$\text{the radial bending stiffness of the fan shaft (36) at the output of the gearbox} \times \text{the moment of inertia of the fan (23)}$$

In various embodiments, the fan shaft radial bending stiffness to moment of inertia product may be greater than or equal to $3.0 \times 10^{14}$ Nkgmm$^2$m$^{-1}$ (i.e. (N/m)·(kgmm$^2$)), and optionally greater than or equal to $6.0 \times 10^{14}$ Nkgmm$^2$m$^{-1}$, and further optionally greater than or equal to $2.0 \times 10^{15}$ Nkgmm$^2$m$^{-1}$.

In some embodiments, for example in embodiments in which the fan diameter is in the range from 240 to 280 cm, the fan shaft radial bending stiffness to moment of inertia product may be greater than or equal to $2.0 \times 10^{15}$ Nkgmm$^2$m$^{-1}$. In some embodiments, for example in embodiments in which the fan diameter is in the range from 330 to 380 cm, the fan shaft radial bending stiffness to moment of inertia product may be greater than or equal to $2.3 \times 10^{15}$ Nkgmm$^2$m$^{-1}$.

In various embodiments, the fan shaft radial bending stiffness to moment of inertia product may be in the range from $3.0 \times 10^{14}$ Nkgmm$^2$m- to $1.4 \times 10^{18}$ Nkgmm$^2$m$^{-1}$, and optionally in the range from $6.0 \times 10^{14}$ Nkgmm$^2$m$^{-1}$ to $7.0 \times 10^{17}$ Nkgmm$^2$m$^{-1}$, and further optionally in the range from $2.0 \times 10^{15}$ Nkgmm$^2$m$^{-1}$ to $7.0 \times 10^{17}$ Nkgmm$^2$m$^{-1}$.

In some embodiments, for example in embodiments in which the fan diameter is in the range from 240 to 280 cm, the fan shaft radial bending stiffness to moment of inertia product may be in the range from $2.0 \times 10^{15}$ Nkgmm$^2$m$^{-1}$ to $7.5 \times 10^{16}$ Nkgmm$^2$m$^{-1}$.

In some embodiments, for example in embodiments in which the fan diameter is in the range from 330 to 380 cm, the fan shaft radial bending stiffness to moment of inertia product may be in the range from $2.3 \times 10^{15}$ Nkgmm$^2$m$^{-1}$ to $1.4 \times 10^{18}$ Nkgmm$^2$m$^{-1}$.

In various embodiments, a gearbox support radial bending stiffness to moment of inertia ratio may be defined as $$\frac{\text{the radial bending stiffness of the gearbox support (40)}}{\text{the moment of inertia of the fan (23)}}$$

In various embodiments, the gearbox support radial bending stiffness to moment of inertia ratio may be greater than or equal to $3.0 \times 10^{-2}$ Nkg$^{-1}$m$^{-1}$mm$^{-2}$ (i.e. (N/m)/(kgmm$^2$)), and optionally greater than or equal to 0.06 Nkg$^{-1}$m$^{-1}$mm$^{-2}$.

In some embodiments, for example in embodiments in which the fan diameter is in the range from 240 to 280 cm, the gearbox support radial bending stiffness to moment of inertia ratio may be greater than or equal to 0.06 Nkg$^{-1}$m$^{-1}$mm$^{-2}$ or greater than or equal to 0.25 Nkg$^{-1}$m$^{-1}$mm$^{-2}$. In some embodiments, for example in embodiments in which the fan diameter is in the range from 330 to 380 cm, the gearbox support radial bending stiffness to moment of inertia ratio may be greater than or equal to 0.03 Nkg$^{-1}$m$^{-1}$mm$^{-2}$ or greater than or equal to 0.06 Nkg$^{-1}$m$^{-1}$mm$^{-2}$ In various embodiments, the gearbox support radial bending stiffness to moment of inertia ratio may be in the range from $3.0 \times 10^{-2}$ Nkg$^{-1}$m mm$^{-2}$ to 4.0 Nkg$^{-1}$m$^{-1}$mm$^{-2}$, and optionally in the range from 0.06 Nkg$^{-1}$m$^{-1}$mm$^{-2}$ to 2.0 Nkg$^{-1}$m$^{-1}$mm$^{-2}$, and further optionally in the range from 0.06 Nkg$^{-1}$m$^{-1}$mm$^{-2}$ to 0.48 Nkg$^{-1}$m$^{-1}$mm$^{-2}$.

In some embodiments, for example in embodiments in which the fan diameter is in the range from 240 to 280 cm, the gearbox support radial bending stiffness to moment of inertia ratio may be in the range from 0.06 Nkg$^{-1}$m$^{-1}$mm$^{-2}$ to 4.0 Nkg$^{-1}$m$^{-1}$mm$^{-2}$ and optionally in the range from 0.25 Nkg$^{-1}$m$^{-1}$mm$^{-2}$ to 0.45 Nkg$^{-1}$m$^{-1}$mm$^{-2}$ (and may be equal to 0.35 Nkg$^{-1}$m$^{-1}$mm$^{-2}$).

In some embodiments, for example in embodiments in which the fan diameter is in the range from 330 to 380 cm, the gearbox support radial bending stiffness to moment of inertia ratio may be in the range from 0.03 Nkg$^{-1}$m$^{-1}$mm$^2$ to 2.0 Nkg$^{-1}$m$^{-1}$mm$^2$, and optionally in the range from 0.06 Nkg$^{-1}$m$^{-1}$mm$^{-2}$ to 0.6 Nkg$^{-1}$m$^{-1}$mm$^{-2}$ (and may be equal to 0.1 Nkg$^{-1}$m$^{-1}$mm$^{-2}$).

In various embodiments, in addition to or alternatively to the gearbox support radial bending stiffness to moment of inertia ratio, a product of the parameters making up that ratio may be defined. This product (referred to as the gearbox support radial bending stiffness to moment of inertia product) may be defined as:

$$\text{the radial bending stiffness of the gearbox support (40)} \times \text{the moment of inertia of the fan (23)}$$

In various embodiments, the gearbox support radial bending stiffness to moment of inertia product may be greater than or equal to $2.0 \times 10^{14}$ Nkgmm$^2$m$^{-1}$ (i.e. (N/m)·(kgmm$^2$)), and optionally greater than or equal to $4.0 \times 10^{14}$ Nkgmm$^2$m$^{-1}$ or further optionally greater than or equal to $2.0 \times 10^{15}$ Nkgmm$^2$m$^{-1}$.

In some embodiments, for example in embodiments in which the fan diameter is in the range from 240 to 280 cm, the gearbox support radial bending stiffness to moment of inertia product may be greater than or equal to $1.5 \times 10^{15}$ Nkgmm$^2$m$^{-1}$. In some embodiments, for example in embodiments in which the fan diameter is in the range from 330 to 380 cm, the gearbox support radial bending stiffness to moment of inertia product may be greater than or equal to $2.0 \times 10^{15}$ Nkgmm$^2$m$^{-1}$.

In various embodiments, the gearbox support radial bending stiffness to moment of inertia product may be in the range from $2.0 \times 10^{14}$ Nkgmm$^2$m$^{-1}$ to $3.0 \times 10^{17}$ Nkgmm$^2$m$^{-1}$, and optionally in the range from $4.0 \times 10^{14}$ Nkgmm$^2$m$^{-1}$ to $1.3 \times 10^{17}$ Nkgmm$^2$m$^{-1}$, and yet further optionally in the range from $2.0 \times 10^{15}$ Nkgmm$^2$m$^{-1}$ to $1.3 \times 10^{17}$ Nkgmm$^2$m$^{-1}$.

In some embodiments, for example in embodiments in which the fan diameter is in the range from 240 to 280 cm, the gearbox support radial bending stiffness to moment of inertia product may be in the range from $1.5 \times 10^{15}$ Nkgmm$^2$m$^{-1}$ to $1.3 \times 10^{17}$ Nkgmm$^2$m$^{-1}$.

In some embodiments, for example in embodiments in which the fan diameter is in the range from 330 to 380 cm, the gearbox support radial bending stiffness to moment of inertia product may be in the range from $2.0 \times 10^{15}$ Nkgmm$^2$m$^{-1}$ to $3.0 \times 10^{17}$ Nkgmm$^2$m$^{-1}$.

In various embodiments, a tilt stiffness to moment of inertia ratio may be defined as:

$$\frac{\text{the tilt stiffness of at least one of the fan shift (36) at the output of the gearbox and the gearbox support (40)}}{\text{the moment of inertia of the fan (23)}}$$

In various embodiments, the tilt stiffness to moment of inertia ratio may be greater than or equal to $4.0 \times 10^{-4}$ Nmrad$^{-1}$kg$^{-1}$mm$^2$ (i.e. (Nm/rad)/(kgmm$^2$)), and optionally greater than or equal to $1.0 \times 10^{-3}$ Nmrad$^{-1}$kg$^{-1}$mm$^{-2}$.

In some embodiments, for example in embodiments in which the fan diameter is in the range from 240 to 280 cm, the tilt stiffness to moment of inertia ratio may be greater than or equal to $1.0\times10^{-3}$ Nmrad$^{-1}$kg$^{-1}$mm$^{-2}$. In some embodiments, for example in embodiments in which the fan diameter is in the range from 330 to 380 cm, the tilt stiffness to moment of inertia ratio may be greater than or equal to $4.0\times10^{-4}$ Nmrad$^{-1}$kg$^{-1}$mm$^{-2}$ In various embodiments, the tilt stiffness to moment of inertia ratio may be in the range from $4.0\times10^{-4}$ Nmrad$^{-1}$kg$^{-1}$mm$^{-2}$ to $2.7\times10^{-1}$ Nmrad$^{-1}$kg$^{-1}$mm$^2$, and optionally in the range from $1.0\times10^{-3}$ Nmrad$^{-1}$kg$^{-1}$mm$^{-2}$ to 0.1 Nmrad$^{-1}$kg$^{-1}$mm$^{-2}$, and further optionally in the range from $1.0\times10^{-3}$ Nmrad$^{-1}$kg$^{-1}$mm$^{-2}$ to $1.5\times10^{-2}$ Nmrad$^{-1}$kg$^{-1}$mm$^{-2}$.

In some embodiments, for example in embodiments in which the fan diameter is in the range from 240 to 280 cm, the tilt stiffness to moment of inertia ratio may be in the range from $1.0\times10^{-3}$ Nmrad$^{-1}$kg$^{-1}$mm$^{-2}$ to $1.45\times10^{-2}$ Nmrad$^{-1}$kg$^{-1}$mm$^{-2}$.

In some embodiments, for example in embodiments in which the fan diameter is in the range from 330 to 380 cm, the tilt stiffness to moment of inertia ratio may be in the range from $4.0\times10^{-4}$ Nmrad$^{-1}$kg$^{-1}$mm$^2$ to $3.0\times10^{-2}$ Nmrad$^{-1}$kg$^{-1}$mm$^{-2}$.

In various embodiments, in addition to or alternatively to the tilt stiffness to moment of inertia ratio, a product of the parameters making up that ratio may be defined. This product (referred to as the tilt stiffness to moment of inertia product) may be defined as:

(the tilt stiffness of at least one of the fan shaft (36) at the output of the gearbox and the gearbox support (40))×(the moment of inertia of the fan (23))

In various embodiments, the tilt stiffness to moment of inertia product may be greater than or equal to $3.0\times10^{12}$ Nmrad$^{-1}$kgmm$^2$ (i.e. (Nm/rad)·(kgmm$^2$)), and optionally greater than or equal to $6.0\times10^{12}$ Nmrad$^{-1}$kgmm$^2$, and further optionally greater than or equal to $2.5\times10^{13}$ Nmrad$^{-1}$kgmm$^2$.

In some embodiments, for example in embodiments in which the fan diameter is in the range from 240 to 280 cm, the tilt stiffness to moment of inertia product may be greater than or equal to $2.0\times10^{13}$ Nmrad$^{-1}$kgmm$^2$. In some embodiments, for example in embodiments in which the fan diameter is in the range from 330 to 380 cm, the tilt stiffness to moment of inertia product may be greater than or equal to $2.5\times10^{13}$ Nmrad$^{-1}$kgmm$^2$.

In various embodiments, the tilt stiffness to moment of inertia product may be in the range from $3.0\times10^{12}$ Nmrad$^{-1}$kgmm$^2$ to $6.0\times10^{16}$ Nmrad$^{-1}$kgmm$^2$, and optionally in the range from $6.0\times10^{12}$ Nmrad$^{-1}$kgmm$^2$ to $3.0\times10^{16}$ Nmrad$^{-1}$kgmm$^2$, and further optionally in the range from $2.5\times10^{13}$ Nmrad$^{-1}$kgmm$^2$ to $3.0\times10^{16}$ Nmrad$^{-1}$kgmm$^2$.

In some embodiments, for example in embodiments in which the fan diameter is in the range from 240 to 280 cm, the tilt stiffness to moment of inertia product may be in the range from $2.0\times10^{13}$ Nmrad$^{-1}$kgmm$^2$ to $4.0\times10^{15}$ Nmrad$^{-1}$kgmm$^2$.

In some embodiments, for example in embodiments in which the fan diameter is in the range from 330 to 380 cm, the tilt stiffness to moment of inertia product may be in the range from $2.5\times10^{13}$ Nmrad$^{-1}$kgmm$^2$ to $6.0\times10^{16}$ Nmrad$^{-1}$kgmm$^2$.

In various embodiments, a fan shaft tilt stiffness to moment of inertia ratio may be defined as:

$$\frac{\text{the tilt stiffness of the fan shaft (36) at the output of the gearbox}}{\text{the moment of inertia of the fan (23)}}$$

In various embodiments, the fan shaft tilt stiffness to moment of inertia ratio may be greater than or equal to $4.0\times10^{-4}$ Nmrad$^{-1}$kg$^{-1}$mm$^{-2}$ (i.e. (Nm/rad)/(kgmm$^2$)), and optionally greater than or equal to $1.0\times10^{-3}$ Nmrad$^{-1}$kg$^{-1}$mm$^{-2}$.

In some embodiments, for example in embodiments in which the fan diameter is in the range from 240 to 280 cm, the fan shaft tilt stiffness to moment of inertia ratio may be greater than or equal to $1.0\times10^{-3}$ Nmrad$^{-1}$kg mm or greater than or equal to $3.0\times10^{-3}$ Nmrad$^{-1}$kg$^{-1}$mm$^2$. In some embodiments, for example in embodiments in which the fan diameter is in the range from 330 to 380 cm, the fan shaft tilt stiffness to moment of inertia ratio may be greater than or equal to $4.0\times10^{-4}$ Nmrad$^{-1}$kg$^{-1}$mm$^{-2}$ or greater than or equal to $0.7\times10^{-3}$ Nmrad$^{-1}$kg$^{-1}$mm$^{-2}$.

In various embodiments, the fan shaft tilt stiffness to moment of inertia ratio may be in the range from $4.0\times10^{-4}$ Nmrad$^{-1}$kg$^{-1}$mm$^{-2}$ to 0.27 Nmrad$^{-1}$kg$^{-1}$mm$^{-2}$, and optionally in the range from $1.0\times10^3$ Nmrad$^{-1}$kg$^{-1}$mm$^{-2}$ to 0.1 Nmrad$^{-1}$kg$^{-1}$mm$^{-2}$, and further optionally in the range from $1.0\times10^3$ Nmrad$^{-1}$kg$^{-1}$mm$^{-2}$ to $1.5\times10^{-2}$ Nmrad$^{-1}$kg$^{-1}$mm$^{-2}$.

In some embodiments, for example in embodiments in which the fan diameter is in the range from 240 to 280 cm, the fan shaft tilt stiffness to moment of inertia ratio may be in the range from $1.0\times10^{-3}$ Nmrad$^{-1}$kg$^{-1}$mm$^{-2}$ to $1.45\times10^{-2}$ Nmrad$^{-1}$kg$^{-1}$mm$^2$ and optionally in the range from $3.0\times10^{-3}$ Nmrad$^{-1}$kg$^{-1}$mm$^{-2}$ to $2.3\times10^{-2}$ Nmrad$^{-1}$kg$^{-1}$mm$^{-2}$ (and may be equal to $1.3\times10^{-2}$ Nmrad$^{-1}$kg$^{-1}$mm$^2$).

In some embodiments, for example in embodiments in which the fan diameter is in the range from 330 to 380 cm, the fan shaft tilt stiffness to moment of inertia ratio may be in the range from $4.0\times10^{-4}$ Nmrad$^{-1}$kg$^{-1}$mm$^{-2}$ to $1.4\times10^{-2}$ Nmrad$^{-1}$kg$^{-1}$mm$^{-2}$, and optionally in the range from $7.0\times10^{-3}$ Nmrad$^{-1}$kg$^{-1}$mm$^{-2}$ to $9.0\times10^{-3}$ Nmrad$^{-1}$kg mm$^{-2}$ (and may be equal to $8.0\times10^{-3}$ Nmrad$^{-1}$kg$^{-1}$mm$^2$).

In various embodiments, in addition to or alternatively to the fan shaft tilt stiffness to moment of inertia ratio, a product of the parameters making up that ratio may be defined. This product (referred to as the fan shaft tilt stiffness to moment of inertia product) may be defined as:

the tilt stiffness of the fan shaft (36) at the output of the gearbox×the moment of inertia of the fan (23)

In various embodiments, the fan shaft tilt stiffness to moment of inertia product may be greater than or equal to $5.0\times10^{12}$ Nmrad$^{-1}$kgmm$^2$ (i.e. (Nm/rad)·(kgmm$^2$)), and optionally greater than or equal to $1.0\times10^{13}$ Nmrad$^{-1}$kgmm$^2$ or greater than or equal to $6.0\times10^{13}$ Nmrad$^{-1}$kgmm$^2$.

In some embodiments, for example in embodiments in which the fan diameter is in the range from 240 to 280 cm, the fan shaft tilt stiffness to moment of inertia product may be greater than or equal to $6.0\times10^{13}$ Nmrad$^{-1}$kgmm$^2$. In some embodiments, for example in embodiments in which the fan diameter is in the range from 330 to 380 cm, the fan shaft tilt stiffness to moment of inertia product may be greater than or equal to $1.0\times10^{14}$ Nmrad$^{-1}$kgmm$^2$.

In various embodiments, the fan shaft tilt stiffness to moment of inertia product may be in the range from $5.0\times10^{12}$ Nmrad$^{-1}$kgmm$^2$ to $6.0\times10^{16}$ Nmrad$^{-1}$kgmm$^2$, and optionally in the range from $1.0\times10^{13}$ Nmrad$^{-1}$kgmm$^2$ to $3.0 \times 10^{16}$ Nmrad$^{-1}$kgmm$^2$, and further optionally in the range from $6.0 \times 10^{13}$ Nmrad$^{-1}$kgmm$^2$ to $3.0 \times 10^{16}$ Nmrad$^{-1}$kgmm$^2$.

In some embodiments, for example in embodiments in which the fan diameter is in the range from 240 to 280 cm, the fan shaft tilt stiffness to moment of inertia product may be in the range from $6.0 \times 10^{13}$ Nmrad$^{-1}$kgmm$^2$ to $3.0 \times 10^{15}$ Nmrad$^{-1}$kgmm$^2$.

In some embodiments, for example in embodiments in which the fan diameter is in the range from 330 to 380 cm, the fan shaft tilt stiffness to moment of inertia product may be in the range from $1.0 \times 10^{14}$ Nmrad$^{-1}$kgmm$^2$ to $6.0 \times 10^{16}$ Nmrad$^{-1}$kgmm$^2$.

In various embodiments, a gearbox support tilt stiffness to moment of inertia ratio may be defined as:

$$\frac{\text{the tilt stiffness of the gearbox support (40)}}{\text{the moment of inertia of the fan (23)}}$$

In various embodiments, the gearbox support tilt stiffness to moment of inertia ratio may be greater than or equal to $1.0 \times 10^{-3}$ Nmrad$^{-1}$kg$^{-1}$mm$^{-2}$ (i.e. (Nm/rad)/(kgmm$^2$)), and optionally greater than or equal to $2.0 \times 10^{-3}$ Nmrad$^{-1}$kg$^{-1}$mm$^{-2}$.

In some embodiments, for example in embodiments in which the fan diameter is in the range from 240 to 280 cm, the gearbox support tilt stiffness to moment of inertia ratio may be greater than or equal to $2.0 \times 10^{-3}$ Nmrad$^{-1}$kg$^{-1}$mm$^{-2}$ or greater than or equal to $5.0 \times 10^{-3}$ Nmrad$^{-1}$kg$^{-1}$mm$^{-2}$. In some embodiments, for example in embodiments in which the fan diameter is in the range from 330 to 380 cm, the gearbox support tilt stiffness to moment of inertia ratio may be greater than or equal to $1.0 \times 10^{-3}$ Nmrad$^{-1}$kg$^{-1}$mm$^{-2}$ or greater than or equal to $2.6 \times 10^{-3}$ Nmrad$^{-1}$kg$^{-1}$mm$^{-2}$.

In various embodiments, the gearbox support tilt stiffness to moment of inertia ratio may be in the range from $1.0 \times 10^{-3}$ Nmrad$^{-1}$kg$^{-1}$mm$^2$ to $7.0 \times 10^{-2}$ Nmrad$^{-1}$kg$^{-1}$mm$^2$, and optionally in the range from $2.0 \times 10^3$ Nmrad$^{-1}$kg$^{-1}$mm$^2$ to $3.0 \times 10^{-2}$ Nmrad$^{-1}$kg$^{-1}$mm$^2$, and further optionally in the range from $2.0 \times 10^{-3}$ Nmrad$^{-1}$kg$^{-1}$mm$^{-2}$ to $7.0 \times 10^{-3}$ Nmrad$^{-1}$kg$^{-1}$mm$^{-2}$.

In some embodiments, for example in embodiments in which the fan diameter is in the range from 240 to 280 cm, the gearbox support tilt stiffness to moment of inertia ratio may be in the range from $2.0 \times 10^{-3}$ Nmrad$^{-1}$kg mm$^{-2}$ to $7.2 \times 10^3$ Nmrad$^{-1}$kg$^{-1}$mm$^{-2}$ and optionally in the range from $5.0 \times 10^{-3}$ Nmrad$^{-1}$kg$^{-1}$mm$^2$ to $7.0 \times 10^{-3}$ Nmrad$^{-1}$kg$^{-1}$mm$^{-2}$ (and may be equal to $6.0 \times 10^{-3}$ Nmrad$^{-1}$kg$^{-1}$mm$^{-2}$).

In some embodiments, for example in embodiments in which the fan diameter is in the range from 330 to 380 cm, the gearbox support tilt stiffness to moment of inertia ratio may be in the range from $1.0 \times 10^{-3}$ Nmrad$^{-1}$kg$^{-1}$mm$^{-2}$ to $3.0 \times 10^{-2}$ Nmrad$^{-1}$kg$^{-1}$mm$^2$, and optionally in the range from $2.6 \times 10^3$ Nmrad$^{-1}$kg$^{-1}$mm$^2$ to $4.6 \times 10^3$ Nmrad$^{-1}$kg$^{-1}$mm$^{-2}$ (and may be equal to $3.6 \times 10^3$ Nmrad$^{-1}$kg$^{-1}$mm$^{-2}$).

In various embodiments, in addition to or alternatively to the gearbox support tilt stiffness to moment of inertia ratio, a product of the parameters making up that ratio may be defined. This product (referred to as the gearbox support tilt stiffness to moment of inertia product) may be defined as:

$$\text{the tilt stiffness of gearbox support (40)} \times \text{the moment of inertia of the fan (23)}$$

In various embodiments, the gearbox support tilt stiffness to moment of inertia product may be greater than or equal to $3.0 \times 10^{12}$ Nmrad$^{-1}$kgmm$^2$ (i.e. (Nm/rad)·(kgmm$^2$)), and optionally greater than or equal to $6.0 \times 10^{12}$ Nmrad$^{-1}$kgmm$^2$, and further optionally greater than or equal to $2.5 \times 10^{13}$ Nmrad$^{-1}$kgmm$^2$.

In some embodiments, for example in embodiments in which the fan diameter is in the range from 240 to 280 cm, the gearbox support tilt stiffness to moment of inertia product may be greater than or equal to $2.0 \times 10^{13}$ Nmrad$^{-1}$kgmm$^2$. In some embodiments, for example in embodiments in which the fan diameter is in the range from 330 to 380 cm, the gearbox support tilt stiffness to moment of inertia product may be greater than or equal to $2.5 \times 10^{13}$ Nmrad$^{-1}$kgmm$^2$.

In various embodiments, the gearbox support tilt stiffness to moment of inertia product may be in the range from $3.0 \times 10^{12}$ Nmrad$^{-1}$kgmm$^2$ to $9.0 \times 10^{15}$ Nmrad$^{-1}$kgmm$^2$, and optionally in the range from $6.0 \times 10^{12}$ Nmrad$^{-1}$kgmm$^2$ to $4.0 \times 10^{15}$ Nmrad$^{-1}$kgmm$^2$, and further optionally in the range from $2.5 \times 10^{13}$ Nmrad$^{-1}$kgmm$^2$ to $4.0 \times 10^{15}$ Nmrad$^{-1}$kgmm$^2$.

In some embodiments, for example in embodiments in which the fan diameter is in the range from 240 to 280 cm, the gearbox support tilt stiffness to moment of inertia product may be in the range from $2.0 \times 10^{13}$ Nmrad$^{-1}$kgmm$^2$ to $4.0 \times 10^{15}$ Nmrad$^{-1}$kgmm$^2$.

In some embodiments, for example in embodiments in which the fan diameter is in the range from 330 to 380 cm, the gearbox support tilt stiffness to moment of inertia product may be in the range from $2.5 \times 10^{13}$ Nmrad$^{-1}$kgmm$^2$ to $9.0 \times 10^{15}$ Nmrad$^{-1}$kgmm$^2$.

In various embodiments, a product of the fan-gearbox axial distance multiplied by the moment of inertia of the fan may be defined.

In various embodiments, the product of the fan-gearbox axial distance and the moment of inertia of the fan may be greater than or equal to $1.9 \times 10^7$ kgmm$^2$m, and optionally greater than or equal to $2.9 \times 10^7$ kgmm$^2$m.

In some embodiments, for example in embodiments in which the fan diameter is in the range from 240 to 280 cm, the product of the fan-gearbox axial distance and the moment of inertia of the fan may be greater than or equal to $2.0 \times 10^7$ kgmm$^2$m. In some embodiments, for example in embodiments in which the fan diameter is in the range from 330 to 380 cm, the product of the fan-gearbox axial distance and the moment of inertia of the fan may be greater than or equal to $1.2 \times 10^8$ kgmm$^2$m.

In various embodiments, the product of the fan-gearbox axial distance and the moment of inertia of the fan may be in the range from $1.9 \times 10^7$ kgmm$^2$m to $6.2 \times 10^8$ kgmm$^2$m, and optionally in the range from $2.9 \times 10^7$ kgmm$^2$m to $3.9 \times 10^8$ kgmm$^2$m.

In some embodiments, for example in embodiments in which the fan diameter is in the range from 240 to 280 cm, the product of the fan-gearbox axial distance and the moment of inertia of the fan may be in the range from $2.0 \times 10^7$ kgmm$^2$m to $8.0 \times 10^7$ kgmm$^2$m.

In some embodiments, for example in embodiments in which the fan diameter is in the range from 330 to 380 cm, the product of the fan-gearbox axial distance and the moment of inertia of the fan may be in the range from $1.2 \times 10^8$ kgmm$^2$m to $6.2 \times 10^8$ kgmm$^2$m.

In various embodiments, a ratio given by the fan-gearbox axial distance divided by the moment of inertia of the fan may also be defined.

In various embodiments, the fan-gearbox axial distance divided by the moment of inertia of the fan may be less than or equal to $8.8 \times 10^{-9}$ m/kgmm² (i.e. mkg⁻¹mm⁻²), and optionally less than or equal to $6.2 \times 10^{-9}$ m/kgmm².

In some embodiments, for example in embodiments in which the fan diameter is in the range from 240 to 280 cm, the fan-gearbox axial distance divided by the moment of inertia of the fan may be less than or equal to $6.5 \times 10^{-9}$ m/kgmm² or less than or equal to $5.2 \times 10^{-9}$ m/kgmm². In some embodiments, for example in embodiments in which the fan diameter is in the range from 330 to 380 cm, the fan-gearbox axial distance divided by the moment of inertia of the fan may be less than or equal to $2.8 \times 10^{-9}$ m/kgmm² or less than or equal to $1.8 \times 10^{-9}$ m/kgmm².

In various embodiments, the fan-gearbox axial distance divided by the moment of inertia of the fan may be in the range from $5.3 \times 10^{-10}$ m/kgmm² to $8.8 \times 10^{-9}$ m/kgmm², and optionally in the range from $8.8 \times 10^{-10}$ m/kgmm² to $6.2 \times 10^{-9}$ m/kgmm².

In some embodiments, for example in embodiments in which the fan diameter is in the range from 240 to 280 cm, the fan-gearbox axial distance divided by the moment of inertia of the fan may be in the range from $2.1 \times 10^{-9}$ m/kgmm² to $6.5 \times 10^{-9}$ m/kgmm² and optionally in the range from $4.0 \times 10^{-9}$ m/kgmm² to $5.2 \times 10^{-9}$ m/kgmm² (and may be equal to $4.6 \times 10^{-9}$ m/kgmm²).

In some embodiments, for example in embodiments in which the fan diameter is in the range from 330 to 380 cm, the fan-gearbox axial distance divided by the moment of inertia of the fan may be in the range from $5.3 \times 10^{-10}$ m/kgmm² to $2.8 \times 10^{-9}$ m/kgmm², and optionally in the range from $8.0 \times 10^{-10}$ m/kgmm² to $1.8 \times 10^{-9}$ m/kgmm² (and may be equal to $1.3 \times 10^{-9}$ m/kgmm²).

In various embodiments, a first gearbox support strength ratio may be defined as $$\frac{\text{the torsional strength of the gearbox (40)}}{\text{radial bending stiffness of the gearbox (40)} \times \text{the cross sectional area of the gearbox}}$$

In various embodiments, the first gearbox support strength ratio may be greater than or equal to $7.0 \times 10^3$, and optionally greater than or equal to $1.0 \times 10^{-2}$ or greater than or equal to $2.0 \times 10^{-2}$.

In various embodiments, the first gearbox support strength ratio may be in the range from $7.0 \times 10^{-3}$ to $2.5 \times 10^{-1}$, and optionally in the range from $1.0 \times 10^{-2}$ to $1.0 \times 10^{-1}$, in the range from $7.0 \times 10^{-3}$ to $2.0 \times 10^{-2}$ or in the range from $2.0 \times 10^{-2}$ to $2.5 \times 10^{-1}$.

In some embodiments, for example in embodiments in which the fan diameter is in the range from 240 to 280 cm or in the range from 330 to 380 cm, the first gearbox support strength ratio may be in the range from $1.9 \times 10^{-2}$ to $2.9 \times 10^{-2}$ (and may be equal to $2.4 \times 10^{-2}$).

In various embodiments, a second gearbox support strength may be defined as:

$$\frac{\text{the torsional strength of the gearbox support (40)}}{\text{tilt stiffness of the gearbox support (40)} \times \text{the planet gear spacing angle } (\beta)}$$

In various embodiments, the second gearbox support strength ratio may be greater than or equal to $1.0 \times 10^{-1}$, and optionally greater than or equal to $1.5 \times 10^{-1}$, greater than or equal to $1.0 \times 10^{-1}$ or greater than or equal to $2.5 \times 10^{-1}$.

In various embodiments, the second gearbox support strength ratio may be in the range from $1.0 \times 10^{-1}$ to 3.5, and optionally in the range from $1.5 \times 10^{-1}$ to 1.7, in the range from $1.0 \times 10^{-1}$ to $2.5 \times 10^{-1}$ or in the range from $2.5 \times 10^{-1}$ to 3.5.

In some embodiments, for example in embodiments in which the fan diameter is in the range from 240 to 280 cm or in the range from 330 to 380 cm, the second gearbox support strength ratio may be in the range from $2.8 \times 10^{-1}$ to $3.8 \times 10^{-1}$ (and may be equal to $3.3 \times 10^{-1}$).

In various embodiments, a first gearbox support shear stress ratio, may be defined as:

$$\frac{\text{the torsional shear stress of the gearbox support (40) at } MTO}{\text{radial bending stiffness of the gearbox support (40)}}$$

In various embodiments, the first gearbox support shear stress ratio may be less than or equal to $4.9 \times 10^1$ m⁻¹, and optionally less than or equal to 20 m⁻¹.

In some embodiments, for example in embodiments in which the fan diameter is in the range from 240 to 280 cm, the first gearbox support shear stress ratio may be less than or equal to 35 m⁻¹ or less than or equal to 10.0 m⁻¹. In some embodiments, for example in embodiments in which the fan diameter is in the range from 330 to 380 cm, the first gearbox support shear stress ratio may be less than or equal to 12 m⁻¹ or less than or equal to 6.0 m⁻¹.

In various embodiments, the first gearbox support shear stress ratio may be in the range from 0.35 m⁻¹ to $4.9 \times 10^1$ m⁻¹ and optionally in the range from 0.70 m⁻¹ to 20 m⁻¹.

In some embodiments, for example in embodiments in which the fan diameter is in the range from 240 to 280 cm, the first gearbox support shear stress ratio may be in the range from 0.70 m⁻¹ to 35 m⁻¹ and optionally in the range from 6.0 m⁻¹ to 10.0 m⁻¹ (and may be equal to 7.8 m⁻¹).

In some embodiments, for example in embodiments in which the fan diameter is in the range from 330 to 380 cm, the first gearbox support shear stress ratio may be in the range from 0.50 m⁻¹ to 12 m⁻¹, and optionally in the range from 3.0 m⁻¹ to 6.0 m⁻¹ (and may be equal to 5.4 m⁻¹).

In various embodiments a second gearbox support shear stress ratio may be defined as:

$$\frac{\text{the torsional shear stresss of the gearbox support (40) at maximum take off conditions}}{\text{tilt stiffness of the gearbox support (40)}}$$

In various embodiments, the second gearbox support shear stress ratio may be less than or equal to $4.1 \times 10^3$ rad/m³, and optionally less than or equal to $1.4 \times 10^3$ rad/m³.

In some embodiments, for example in embodiments in which the fan diameter is in the range from 240 to 280 cm, the second gearbox support shear stress ratio may be less than or equal to $2.9 \times 10^3$ rad/m³ or less than or equal to $6.5 \times 10^2$ rad/m³. In some embodiments, for example in embodiments in which the fan diameter is in the range from 330 to 380 cm, the second gearbox support shear stress ratio may be less than or equal to $7.0 \times 10^2$ rad/m³ or less than or equal to $2.5 \times 10^2$ rad/m³.

In various embodiments, the second gearbox support shear stress ratio may be in the range from 6.6 rad/m³ to $4.1 \times 10^3$ rad/m³, and optionally in the range from $1.25 \times 10^1$ rad/m³ to $1.4 \times 10^3$ rad/m³.

In some embodiments, for example in embodiments in which the fan diameter is in the range from 240 to 280 cm, the second gearbox support shear stress ratio may be in the range from $2.9 \times 10^1$ rad/m$^3$ to $2.9 \times 10^3$ rad/m$^3$ and optionally in the range from $2.5 \times 10^2$ rad/m$^3$ to $6.5 \times 10^2$ rad/m$^3$ (and may be equal to $4.5 \times 10^2$ rad/m$^3$).

In some embodiments, for example in embodiments in which the fan diameter is in the range from 330 to 380 cm, the second gearbox support shear stress ratio may be in the range from $1.0 \times 10^1$ rad/m$^3$ to $7.0 \times 10^2$ rad/m$^3$, and optionally in the range from 50 rad/m$^3$ to $2.5 \times 10^2$ rad/m$^3$ (and may be equal to $1.5 \times 10^2$ rad/m$^3$).

In various embodiments, a flight cycle ratio may be defined as:

$$\frac{\text{the torsional shear stress of the gearbox support (40)}}{\text{the torsional shear stress of the gearbox support (40)}} \\ \text{at maximum take off conditions} \\ \text{at cruise conditions}$$

In various embodiments, the flight cycle ratio may be less than or equal to 3.20, and optionally less than or equal to 2.95, optionally less than or equal to 2.9 (or 2.90), optionally less than or equal to 2.85, or optionally less than or equal to 2.75.

In some embodiments, for example in embodiments in which the fan diameter is in the range from 240 to 280 cm, the flight cycle ratio may be less than or equal to 3.2 or less than or equal to 3.0. In some embodiments, for example in embodiments in which the fan diameter is in the range from 330 to 380 cm, the flight cycle ratio may be less than or equal to 2.8 or less than or equal to 2.7.

In various embodiments, the flight cycle ratio may be in the range from 2.10 to 3.20, and optionally in the range from 2.3 to 2.9.

In some embodiments, for example in embodiments in which the fan diameter is in the range from 240 to 280 cm, the flight cycle ratio may be in the range from 2.3 to 3.2 and optionally in the range from 2.8 to 3.0 (and may be equal to 2.9).

In some embodiments, for example in embodiments in which the fan diameter is in the range from 330 to 380 cm, the flight cycle ratio may be in the range from 2.1 to 2.8, and optionally in the range from 2.3 to 2.7 (and may be equal to 2.6).

In various embodiments, in addition to or alternatively to the flight cycle ratio, a product of the parameters making up that ratio may be defined. This product (referred to as the flight cycle product) may be defined as:

$$\text{the torsional shear stress of the gearbox support (40)} \\ \text{at maximum take off conditions} \times \text{the torsional} \\ \text{shear stress of the gearbox support (40) at} \\ \text{cruise conditions}$$

In various embodiments, the flight cycle product may be greater than or equal to $1.00 \times 10^{16}$ (N/m$^2$)$^2$, and optionally greater than or equal to $2.05 \times 10^{16}$ (N/m$^2$)$^2$.

In some embodiments, for example in embodiments in which the fan diameter is in the range from 240 to 280 cm, the flight cycle product may be greater than or equal to $2.0 \times 10^{16}$ (N/m$^2$)$^2$. In some embodiments, for example in embodiments in which the fan diameter is in the range from 330 to 380 cm, the flight cycle product may be greater than or equal to $2.2 \times 10^{16}$ (N/m$^2$)$^2$.

In various embodiments, the flight cycle product may be in the range from $1.00 \times 10^{16}$ (N/m$^2$)$^2$ to $7.50 \times 10^{16}$ (N/m$^2$)$^2$, and optionally in the range from $2.05 \times 10^{16}$ (N/m$^2$)$^2$ to $4.9 \times 10^{16}$ (N/m$^2$)$^2$.

In some embodiments, for example in embodiments in which the fan diameter is in the range from 240 to 280 cm, the flight cycle product may be in the range from $2.0 \times 10^{16}$ (N/m$^2$)$^2$ to $4.9 \times 10^{16}$ (N/m$^2$)$^2$.

In some embodiments, for example in embodiments in which the fan diameter is in the range from 330 to 380 cm, the flight cycle product may be in the range from $2.2 \times 10^{16}$ (N/m$^2$)$^2$ to $6.2 \times 10^{16}$ (N/m$^2$)$^2$.

In various embodiments, a first torque transmission ratio may be defined as:

$$\frac{\text{the torque transmitted through the gearbox (30)}}{\text{the torque transmitted through the gearbox (30)}} \\ \text{at maximum takeoff conditions} \\ \text{at cruise conditions}$$

In various embodiments, the first torque transmission ratio may be less than or equal to 3.2, and optionally less than or equal to 2.95, optionally less than or equal to 2.9 (or 2.90), optionally less than or equal to 2.85 or optionally less than or equal to 2.75.

In some embodiments, for example in embodiments in which the fan diameter is in the range from 240 to 280 cm, the first torque transmission ratio may be less than or equal to 3.2 or less than or equal to 3.0. In some embodiments, for example in embodiments in which the fan diameter is in the range from 330 to 380 cm, the first torque transmission ratio may be less than or equal to 2.8 or less than or equal to 2.7.

In various embodiments, the first torque transmission ratio may be in the range from 2.1 to 3.2, and optionally in the range from 2.3 to 2.9.

In some embodiments, for example in embodiments in which the fan diameter is in the range from 240 to 280 cm, the first torque transmission ratio may be in the range from 2.3 to 3.2 and optionally in the range from 2.8 to 3.0 (and may be equal to 2.9).

In some embodiments, for example in embodiments in which the fan diameter is in the range from 330 to 380 cm, the first torque transmission ratio may be in the range from 2.1 to 2.8, and optionally in the range from 2.5 to 2.7 (and may be equal to 2.6).

In various embodiments, in addition to or alternatively to the first torque transmission ratio, a product of the parameters making up that ratio may be defined. This product (referred to as the first torque transmission product) may be defined as:

$$\text{the torque transmitted through the gearbox (30) at} \\ \text{maximum take off conditions} \times \text{the torque trans-} \\ \text{mitted through the gearbox (30) at cruise condi-} \\ \text{tions}$$

In various embodiments, the first torque transmission product may be greater than or equal to $2.1 \times 10^9$ (Nm)$^2$, and optionally greater than or equal to $3.5 \times 10^9$ (Nm)$^2$.

In some embodiments, for example in embodiments in which the fan diameter is in the range from 240 to 280 cm, the first torque transmission product may be greater than or equal to $4.0 \times 10^9$ (Nm)$^2$. In some embodiments, for example in embodiments in which the fan diameter is in the range from 330 to 380 cm, the first torque transmission product may be greater than or equal to $9.0 \times 10^9$ (Nm)$^2$.

In various embodiments, the first torque transmission product may be in the range from $2.1 \times 10^9$ (Nm)$^2$ to $9.0 \times 10^{10}$ (Nm)$^2$, and optionally in the range from $3.5 \times 10^9$ (Nm)$^2$ to $5.2 \times 10^{10}$ (Nm)$^2$.

In some embodiments, for example in embodiments in which the fan diameter is in the range from 240 to 280 cm, the first torque transmission product may be in the range from $4.0 \times 10^9$ (Nm)$^2$ to $9.0 \times 10^9$ (Nm)$^2$.

In some embodiments, for example in embodiments in which the fan diameter is in the range from 330 to 380 cm, the first torque transmission product may be in the range from $9.0 \times 10^9$ (Nm)$^2$ to $9.0 \times 10^{10}$ (Nm)$^2$.

In various embodiments, a second torque transmission ratio may be defined as:

$$\frac{\text{the torque transmitted through the gearbox support (40)}}{\text{the torque transmitted through the gearbox support (40)}} \frac{\text{at maximum take off conditions}}{\text{at cruise conditions}}$$

In various embodiments, the second torque transmission ratio may be less than or equal to 3.2, and optionally less than or equal to 2.95, or optionally less than or equal to 2.9 (or 2.90), optionally less than or equal to 2.85, or optionally less than or equal to 2.75.

In some embodiments, for example in embodiments in which the fan diameter is in the range from 240 to 280 cm, the second torque transmission ratio may be less than or equal to 3.2 or less than or equal to 3.0. In some embodiments, for example in embodiments in which the fan diameter is in the range from 330 to 380 cm, the second torque transmission ratio may be greater than or equal to 2.8 or less than or equal to 2.7.

In various embodiments, the second torque transmission ratio may be in the range from 2.1 to 3.2, and optionally in the range from 2.3 to 2.9.

In some embodiments, for example in embodiments in which the fan diameter is in the range from 240 to 280 cm, the second torque transmission ratio may be in the range from 2.3 to 3.2 and optionally in the range from 2.8 to 3.0 (and may be equal to 2.9).

In some embodiments, for example in embodiments in which the fan diameter is in the range from 330 to 380 cm, the second torque transmission ratio may be in the range from 2.1 to 2.8, and optionally in the range from 2.3 to 2.7 (and may be equal to 2.6).

In various embodiments, in addition to or alternatively to the second torque transmission ratio, a product of the parameters making up that ratio may be defined. This product (referred to as the second torque transmission product) may be defined as:

$$\text{the torque transmitted through the gearbox support} \\ \text{(40) at maximum take off conditions} \times \text{the torque} \\ \text{transmitted through the gearbox support (40) at} \\ \text{cruise conditions}$$

In various embodiments, the second torque transmission product may be greater than or equal to $4.1 \times 10^9$ (Nm)$^2$, and optionally greater than or equal to $6.1 \times 10^9$ (Nm)$^2$.

In some embodiments, for example in embodiments in which the fan diameter is in the range from 240 to 280 cm, the second torque transmission product may be greater than or equal to $4.1 \times 10^9$ (Nm)$^2$. In some embodiments, for example in embodiments in which the fan diameter is in the range from 330 to 380 cm, the second torque transmission product may be greater than or equal to $1.1 \times 10^{10}$ (Nm)$^2$.

In various embodiments, the second torque transmission product may be in the range from $4.1 \times 10^9$ (Nm)$^2$ to $9.0 \times 10^{10}$ (Nm)$^2$, and optionally in the range from $6.1 \times 10^9$ (Nm)$^2$ to $8.0 \times 10^{10}$ (Nm)$^2$.

In some embodiments, for example in embodiments in which the fan diameter is in the range from 240 to 280 cm, the second torque transmission product may be in the range from $4.1 \times 10^9$ (Nm)$^2$ to $3.9 \times 10^{10}$.

In some embodiments, for example in embodiments in which the fan diameter is in the range from 330 to 380 cm, the second torque transmission product may be in the range from $1.1 \times 10^{10}$ (Nm)$^2$ to $9.0 \times 10^{10}$ (Nm)$^2$.

In the ratios defined above the maximum take-off and cruise conditions are as defined anywhere herein.

Figure 19:
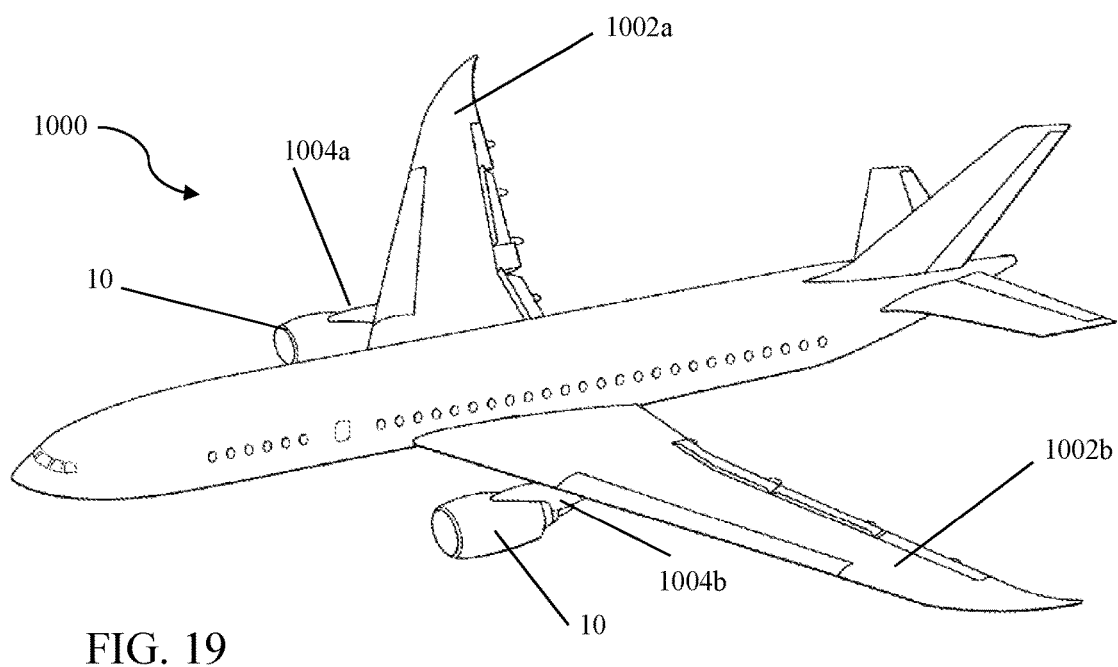
FIG. 19 shows an aircraft having a gas turbine engine attached to each wing.

FIG. 19 illustrates an example aircraft 1000 having a gas turbine engine 10 attached to each wing 1002a, 1002b thereof. Each gas turbine engine 10 is attached via a respective pylon 1004a, 1004b. The gas turbines 10 may be that of any embodiment described herein. The aircraft shown in FIG. 19 is to be understood as the aircraft for which the gas turbine engine 10 of any embodiment or aspect disclosed herein has been designed to be attached. The aircraft 1000 has a cruise condition corresponding to the cruise conditions defined elsewhere herein and a max take-off condition corresponding to the MTO conditions defined elsewhere herein.

Figure 20:
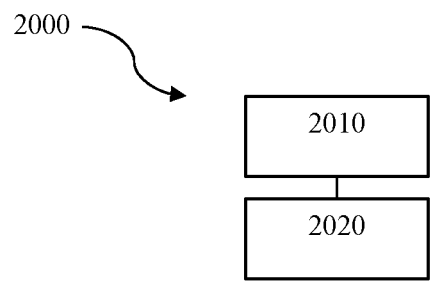
FIG. 20 shows a method of operating a gas turbine engine on an aircraft.

The present disclosure also relates to a method 2000 of operating a gas turbine engine on an aircraft (e.g. the aircraft of FIG. 19). The method 2000 is illustrated in FIG. 20. The method 2000 comprises operating 2010 the gas turbine engine 10 described elsewhere herein to provide propulsion for the aircraft to which it is mounted under maximum take-off conditions. The method further comprises operating 2020 the gas turbine engine to provide propulsion during cruise conditions. The gas turbine engine is operated such that any of the parameters or ratios defined herein are within the specified ranges. Cruise conditions and max-take off conditions are as defined elsewhere herein.

The torque on the core shaft 26 may be referred to as the input torque, as this is the torque which is input to the gearbox 30. The torque supplied by the turbine 19 to the core shaft (i.e. the torque on the core shaft) at cruise conditions may be greater than or equal to 10,000 Nm, and optionally greater than or equal to 11,000 Nm. In some embodiments, for example in embodiments in which the fan diameter is in the range from 240 to 280 cm, the torque on the core shaft 26 at cruise conditions may be greater than or equal to 10,000 or 11,000 Nm (and optionally may be equal to 12,760 Nm). In some embodiments, for example in embodiments in which the fan diameter is in the range from 330 to 380 cm, the torque on the core shaft 26 at cruise conditions may be greater than or equal to 25,000 Nm, and optionally greater than or equal to 30,000 Nm (and optionally may be equal to 34,000 Nm).

The torque on the core shaft at cruise conditions may be in the range from 10,000 to 50,000 Nm, and optionally from 11,000 to 45,000 Nm. In some embodiments, for example in embodiments in which the fan diameter is in the range from 240 to 280 cm, the torque on the core shaft 26 at cruise conditions may be in the range from 10,000 to 15,000 Nm, and optionally from 11,000 to 14,000 Nm (and optionally may be equal to 12,760 Nm). In some embodiments, for example in embodiments in which the fan diameter is in the range from 330 to 380 cm, the torque on the core shaft 26 at cruise conditions may be in the range from 25,000 Nm to 50,000 Nm, and optionally from 30,000 to 40,000 Nm (and optionally may be equal to 34,000 Nm).

Under maximum take-off (MTO) conditions, the torque on the core shaft 26 may be greater than or equal to 28,000 Nm, and optionally greater than or equal to 30,000 Nm. In some embodiments, for example in embodiments in which the fan diameter is in the range from 240 to 280 cm, the torque on the core shaft 26 under MTO conditions may be greater than or equal to 28,000, and optionally greater than or equal to 35,000 Nm (and optionally may be equal to 36,300 Nm). In some embodiments, for example in embodiments in which the fan diameter is in the range from 330 to 380 cm, the torque on the core shaft 26 under MTO conditions may greater than or equal to 70,000 Nm, and optionally greater than or equal to 80,000 or 82,000 Nm (and optionally may be equal to 87,000 Nm).

Under maximum take-off (MTO) conditions, the torque on the core shaft 26 may be in the range from 28,000 Nm to 135,000 Nm, and optionally in the range from 30,000 to 110,000 Nm. In some embodiments, for example in embodiments in which the fan diameter is in the range from 240 to 280 cm, the torque on the core shaft 26 under MTO conditions may be in the range from 28,000 to 50,000 Nm, and optionally from 35,000 to 38,000 Nm (and optionally may be equal to 36,300 Nm). In some embodiments, for example in embodiments in which the fan diameter is in the range from 330 to 380 cm, the torque on the core shaft 26 under MTO conditions may be in the range from 70,000 Nm to 135,000 Nm, and optionally from 80,000 to 90,000 Nm or 82,000 to 92,000 Nm (and optionally may be equal to 87,000 Nm).

Torque has units of [force]×[distance] and may be expressed in units of Newton metres (N·m), and is defined in the usual way as would be understood by the skilled person.

Figure 21:
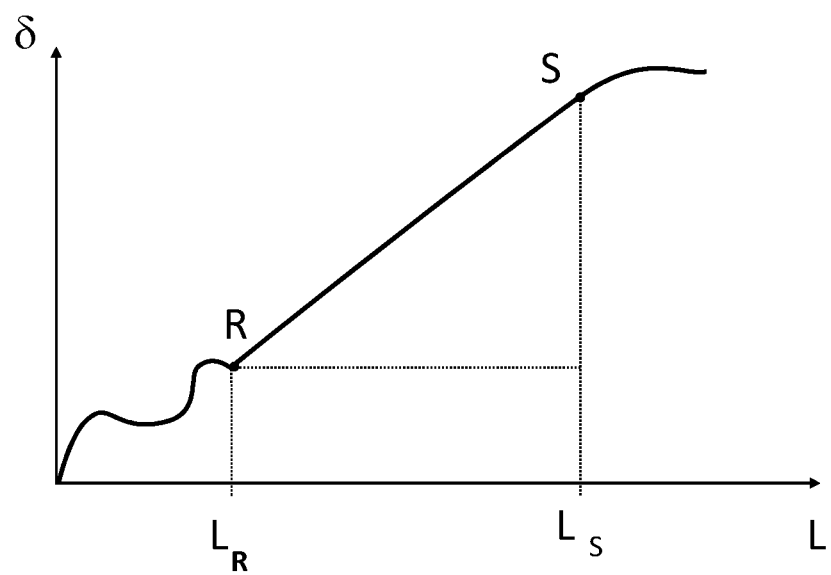
FIG. 21 shows a graph of applied load against displacement to illustrate measurement of the stiffness of a component.

FIG. 21 illustrates how the stiffnesses defined herein may be measured. FIG. 21 shows a plot of the displacement $\delta$ resulting from the application of a load L (e.g. a force, moment or torque) applied to a component for which the stiffness is being measured. At levels of load from zero to $L_R$ there is a non-linear region in which displacement is caused by motion of the component (or relative motion of separate parts of the component) as it is loaded, rather than deformation of the component; for example moving within clearance between parts. At levels of load above $L_S$ the elastic limit of the component has been exceeded and the applied load no longer causes elastic deformation—plastic deformation or failure of the component may occur instead. Between points R and S the applied load and resulting displacement have a linear relationship. The stiffnesses defined herein may be determined by measuring the gradient of the linear region between points R and S (with the stiffness being the inverse of that gradient). The gradient may be found for as large a region of the linear region as possible to increase the accuracy of the measurement by providing a larger displacement to measure. For example, the gradient may be found by applying a load equal to or just greater than $L_R$ and equal to or just less than $L_S$. Although the displacement is referred to as $\delta$ in this description, the skilled person would appreciate that equivalent principles would apply to a linear or angular displacement.

The stiffnesses defined herein, unless otherwise stated, are for the corresponding component(s) when the engine is off (i.e. at zero speed/on the bench). The stiffness generally does not vary over the operating range of the engine; the stiffness at cruise conditions of the aircraft to which the engine is used (those cruise conditions being as defined elsewhere herein) may therefore be the same as for when the engine is not in use. However, where the stiffness varies over the operating range of the engine, the stiffnesses defined herein are to be understood as being values for when the engine is at room temperature and unmoving. Values for component strength (e.g. the torsional strength of the gearbox support) as given herein are also at room temperature unless otherwise stated.

Anything described herein with reference to a planetary type gearbox can apply equally to a star type gearbox unless otherwise stated or where it is apparent that a feature is specific to a particular gearbox type.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft comprising:
   an engine core comprising a turbine, a compressor, and a core shaft connecting the turbine to the compressor;
   a fan located upstream of the engine core, the fan comprising a plurality of fan blades;
   a gearbox that is configured to receive an input from the core shaft, and output drive to a fan shaft via an output of the gearbox so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and
   a gearbox support arranged to at least partially support the gearbox within the engine,
   wherein:
   a moment of inertia of the fan is in a range from $7.40 \times 10^7$ kgmm$^2$ to $9.00 \times 10^8$ kgmm$^2$;
   at least one radial bending stiffness to moment of inertia ratio selected from the group consisting of:
   a first ratio of:

$$\frac{\text{a radial bending stiffness of the fan shaft at the output of the gearbox}}{\text{the moment of inertia of the fan}},$$

and a second ratio of:

$$\frac{\text{a radial bending stiffness of the gearbox support}}{\text{the moment of inertia of the fan}}$$

is in a range from $2.5 \times 10^{-2}$ Nkg$^{-1}$m$^{-1}$mm$^{-2}$ to 6.0 Nkg$^{-1}$m$^{-1}$mm$^{-2}$, and
the fan has a mass in a range of 150 kg to 1200 kg.

2. The gas turbine engine according to claim 1, wherein the at least one radial bending stiffness to moment of inertia ratio is in a range from 0.05 Nkg$^{-1}$m$^{-1}$mm$^{-2}$ to 3.0 Nkg$^{-1}$m$^{-1}$mm$^{-2}$.

3. The gas turbine engine according to claim 1, wherein:
   a) the first ratio of the radial bending stiffness of the fan shaft at the output of the gearbox to the moment of inertia of the fan is in a range from 0.05 Nkg$^{-1}$m$^{-1}$mm$^{-2}$ to 3.0 Nkg$^{-1}$m$^{-1}$mm$^{-2}$; and/or b) the second ratio of the radial bending stiffness of the gearbox support to the moment of inertia of the fan is in a range from $3.0 \times 10^{-2}$ Nkg$^{-1}$m$^{-1}$mm$^{-2}$ to 4.0 Nkg$^{-1}$m$^{-1}$mm$^{-2}$.

4. The gas turbine engine according to claim 1, wherein:
   a) the radial bending stiffness of the fan shaft at the output of the gearbox is in a range from $3.7 \times 10^7$ N/m to $1.0 \times 10^9$ N/m; and/or
   b) the radial bending stiffness of the gearbox support is in a range from $2.0 \times 10^7$ N/m to $3.0 \times 10^8$ N/m.

5. The gas turbine engine according to claim 1, wherein:
   a) a diameter of the fan is in a range from 240 cm to 280 cm, and the at least one radial bending stiffness to moment of inertia ratio is in a range from 0.05 Nkg$^{-1}$m$^{-1}$mm$^{-2}$ to 4.0 Nkg$^{-1}$m$^{-1}$mm$^{-2}$; or
   b) the diameter of the fan is in a range from 330 cm to 380 cm and the at least one radial bending stiffness to moment of inertia ratio is in a range from 0.025 Nkg$^{-1}$m$^{-1}$mm$^{-2}$ to 2.0 Nkg$^{-1}$m$^{-1}$mm$^{-2}$.

6. The gas turbine engine according to claim 1, wherein at least one product selected from the group consisting of:
   a first product of:

(the radial bending stiffness of the fan shaft at the output of the gearbox)×(the moment of inertia of the fan), and a second product of:

(the radial bending stiffness of the gearbox support)×(the moment of inertia of the fan)

is in a range from $2.0 \times 10^{14}$ Nkgmm$^2$m$^{-1}$ to $1.4 \times 10^{18}$ Nkgmm$^2$m$^{-1}$.

7. The gas turbine engine according to claim 1, wherein at least one tilt stiffness to moment of inertia ratio selected from the group consisting of:
   a first tilt stiffness ratio of:

$$\frac{\text{a tilt stiffness of the fan shaft at the output of the gearbox}}{\text{the moment of inertia of the fan}}, \text{ and}$$

a second tilt stiffness ratio of:

$$\frac{\text{a tilt stiffness of the gearbox support}}{\text{the moment of inertia of the fan}}$$

is in a range from $4.0 \times 10^4$ Nmrad$^{-1}$kg$^{-1}$mm$^{-2}$ to $2.7 \times 10^{-1}$ Nmrad$^{-1}$kg$^{-1}$mm$^{-2}$.

8. The gas turbine engine according to claim 1, wherein the moment of inertia of the fan is in a range from $8.3 \times 10^7$ kgmm$^2$ to $6.5 \times 10^8$ kgmm$^2$.

9. The gas turbine engine according to claim 1, wherein either:
   a) the plurality of fan blades are formed from a metallic material; or
   b) the plurality of fan blades are formed at least partly from an organic matrix composite.

10. The gas turbine engine according to claim 1, wherein: the fan shaft connects the output of the gearbox to the fan;
    a gearbox output position is defined as a point of connection between the fan shaft and the gearbox;
    the fan has an axial centreline;
    a fan-gearbox axial distance is defined as an axial distance between an axial position of the gearbox output position and the axial centreline of the fan; and
    the fan-gearbox axial distance multiplied by the moment of inertia of the fan is in a range from $1.9 \times 10^7$ kgmm$^2$m to $6.2 \times 10^8$ kgmm$^2$m.

11. The gas turbine engine according to claim 1, wherein:
    i) the gearbox has a gear ratio of 3.2 to 4.5; and/or
    ii) the gas turbine engine is configured to have a specific thrust from 70 to 90 NKg$^{-1}$; and/or
    iii) the gas turbine engine is configured to have a bypass ratio at cruise conditions of 12.5 to 18; and/or
    iv) the fan has a fan diameter greater than 240 cm and less than or equal to 380 cm; and/or
    v) the mass of the fan is between 150 kg and 250 kg; and/or
    vi) the fan has a fan pressure ratio at cruise conditions of between 1.40 and 1.43.

12. A gas turbine engine for an aircraft comprising:
    an engine core comprising a turbine, a compressor, and a core shaft connecting the turbine to the compressor;
    a fan located upstream of the engine core, the fan comprising a plurality of fan blades;
    a gearbox that is configured to receive an input from the core shaft, and output drive to a fan shaft via an output of the gearbox so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and
    a gearbox support arranged to at least partially support the gearbox within the engine,
    wherein:
    a moment of inertia of the fan is in a range from $7.40 \times 10^7$ kgmm$^2$ to $9.00 \times 10^8$ kgmm$^2$; and
    at least one tilt stiffness to moment of inertia ratio selected from the group consisting of:
    a first ratio of:

$$\frac{\text{a tilt stiffness of the fan shaft at the output of the gearbox}}{\text{the moment of inertia of the fan}}, \text{ and}$$

a second ratio of:

$$\frac{\text{a tilt stiffness of the gearbox support}}{\text{the moment of inertia of the fan}}$$

is in a range from $4.0 \times 10^4$ Nmrad$^{-1}$kg$^{-1}$mm$^{-2}$ to $2.7 \times 10^{-1}$ Nmrad$^{-1}$kg$^{-1}$mm$^2$.

13. The gas turbine engine according to claim 12, wherein the at least one tilt stiffness to moment of inertia ratio is in a range from $1.0 \times 10^{-3}$ Nmrad$^{-1}$kg$^{-1}$mm$^{-2}$ to 0.1 Nmrad$^{-1}$kg$^{-1}$mm$^{-2}$.

14. The gas turbine engine according to claim 12, wherein:
    a) the first ratio of the tilt stiffness of the fan shaft at the output of the gearbox to the moment of inertia of the fan is in a range from $1.0 \times 10^{-3}$ Nmrad$^{-1}$kg$^{-1}$mm$^{-2}$ to 0.1 Nmrad$^{-1}$kg$^{-1}$mm$^{-2}$; and/or
    b) the second ratio of the tilt stiffness of the gearbox support to the moment of inertia of the fan is in a range from $1.0 \times 10^{-3}$ Nmrad$^{-1}$kg$^{-1}$mm-2 to $7.0 \times 10^2$ Nmrad$^{-1}$kg$^{-1}$mm$^{-2}$.

15. The gas turbine engine according to claim 12, wherein:

a) the tilt stiffness of the fan shaft at the output of the gearbox is in a range from $7.00 \times 10^4$ Nm/rad to $7.00 \times 10^7$ Nm/rad; and/or b) the tilt stiffness of the gearbox support is in a range from $1.2 \times 10^5$ Nm/rad to $2.1 \times 10^7$ Nm/rad.

16. The gas turbine engine according to claim 12, wherein at least one radial bending stiffness to moment of inertia ratio selected from the group consisting of:

a first ratio of:

$$\frac{\text{a radial bending stiffness of the fan shaft at the output of the gearbox}}{\text{the moment of inertia of the fan}}$$

a second ratio of:

$$\frac{\text{a radial bending stiffness of the gearbox support}}{\text{the moment of inertia of the fan}}$$

is in range from $2.5 \times 10^{-2}$ $Nkg^{-1}m^{-1}mm^{-2}$ to $6.0$ $Nkg^{-1}m^{-1}mm^{-2}$.

17. The gas turbine engine according to claim 12, wherein:

a) a diameter of the fan is in a range from 240 cm to 280 cm, and the at least one tilt stiffness to moment of inertia ratio is in a range from $1.0 \times 10^{-3}$ $Nmrad^{-1}kg^{-1}mm^{-2}$ to $1.45 \times 10^{-2}$ $Nmrad^{-1}kg^{-1}mm^{-2}$; or a) the diameter of the fan is in a range from 330 cm to 380 cm, and the at least one tilt stiffness to moment of inertia ratio is in a range from $4.0 \times 10^4$ $Nmrad^{-1}kg^{-1}mm^{-2}$ to $3.0 \times 10^{-2}$ $Nmrad^{-1}kg^{-1}mm^{-2}$.

18. The gas turbine engine according to claim 12, wherein at least one product selected from the group consisting of:

a first product of:

(the tilt stiffness of the fan shaft at the output of the gearbox)×(the moment of inertia of the fan), and a second product of:

(the tilt stiffness of the gearbox support)×(the moment of inertia of the fan)

is in a range from $3.0 \times 10^{12}$ $Nmrad^{-1}kgmm^2$ to $6.0 \times 10^{16}$ $Nmrad^{-1}kgmm^2$.

19. A method of operating a gas turbine engine for an aircraft, the gas turbine engine comprising:

an engine core comprising a turbine, a compressor, and a core shaft connecting the turbine to the compressor;

a fan located upstream of the engine core, the fan comprising a plurality of fan blades, the fan having a moment of inertia in a range from $7.40 \times 10^7$ $kgmm^2$ to $9.00 \times 10^8$ $kgmm^2$;

a gearbox that is configured to receive an input from the core shaft, and output drive to a fan shaft via an output of the gearbox so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a gearbox support arranged to at least partially support the gearbox within the engine, wherein:

a) at least one radial bending stiffness to moment of inertia ratio selected from the group consisting of:

i) a first ratio of:

$$\frac{\text{a radial bending stiffness of the fan shaft at the output of the gearbox}}{\text{the moment of inertia of the fan}}, \text{ and}$$

ii) a second ratio of:

$$\frac{\text{a radial bending stiffness of the fan shaft at the output of the gearbox}}{\text{the moment of inertia of the fan}},$$

and is in a range from $2.5 \times 10^{-2}$ $Nkg^{-1}m^{-1}mm^{-2}$ to $6.0$ $Nkg^{-1}m^{-1}mm^{-2}$; and/or b) at least one tilt stiffness to moment of inertia ratio selected from the group consisting of:

i) a first ratio of:

$$\frac{\text{a tilt stiffness of the fan shaft at the output of the gearbox}}{\text{the moment of inertia of the fan}}, \text{ and}$$

ii) a second ratio of:

$$\frac{\text{a tilt stiffness of the gearbox support}}{\text{the moment of inertia of the fan}}$$

is in a range from $4.0 \times 10^4$ $Nmrad^{-1}kg^{-1}mm^{-2}$ to $2.7 \times 10^1$ $Nmrad^{-1}kg^{-1}mm^{-2}$, the method comprising operating the gas turbine engine to provide propulsion for the aircraft under cruise conditions.

20. The method of claim 19, further comprising driving the gearbox with an input torque:

i) in a range from 10,000 Nm to 50,000 Nm at cruise; and/or ii) in a range from 28,000 Nm to 135,000 Nm at max-take off conditions.

* * * * *